US012432695B2

(12) United States Patent
Li et al.

(10) Patent No.: US 12,432,695 B2
(45) Date of Patent: Sep. 30, 2025

(54) RESOURCE MANAGEMENT FOR 5G eV2X

(71) Applicant: InterDigital Patent Holdings, Inc., Wilmington, DE (US)

(72) Inventors: Qing Li, Princeton Junction, NJ (US); Pascal M. Adjakple, Great Neck, NY (US); Guodong Zhang, Woodbury, NY (US); Lakshmi R. Iyer, King of Prussia, PA (US); Mohamed Awadin, Plymouth Meeting, PA (US); Yifan Li, Consohohocken, PA (US); Allan Y. Tsai, Boonton, NJ (US); Joseph M. Murray, Schwenksville, PA (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 138 days.

(21) Appl. No.: 17/265,919

(22) PCT Filed: Jul. 8, 2019

(86) PCT No.: PCT/US2019/040828
§ 371 (c)(1),
(2) Date: Feb. 4, 2021

(87) PCT Pub. No.: WO2020/033088
PCT Pub. Date: Feb. 13, 2020

(65) Prior Publication Data
US 2021/0219268 A1 Jul. 15, 2021

Related U.S. Application Data

(60) Provisional application No. 62/790,731, filed on Jan. 10, 2019, provisional application No. 62/737,648, (Continued)

(51) Int. Cl.
*H04W 72/02* (2009.01)
*H04B 17/318* (2015.01)
(Continued)

(52) U.S. Cl.
CPC .......... *H04W 72/02* (2013.01); *H04B 17/318* (2015.01); *H04L 1/1819* (2013.01);
(Continued)

(58) Field of Classification Search
CPC ......... H04W 72/02; H04W 4/40; H04W 4/44; H04W 28/26; H04B 17/318
See application file for complete search history.

(56) References Cited

U.S. PATENT DOCUMENTS 9,693,338 B2    6/2017  Zhao et al.
2014/0094183 A1*  4/2014  Gao ...................... H04W 72/51
                                          455/450

(Continued)

FOREIGN PATENT DOCUMENTS

CN    104685816 A    6/2015
CN    106165524 A    11/2016

(Continued)

OTHER PUBLICATIONS

Intel Corporation: "Discussion on sensing aspects to support V2V communication with different transmission periodicity," 3GPP Draft; RI-165073 Intel-V2V Period, 3rd Generation Partnership Project (3GPP), Mobile Competence Centre; 650, Route Deslucioles ; F-06921 Sophia-Antipolis Cedex; France • vol. RAN WGI, no. Nanjing, China; May 23, 2016-May 27, 2016, May 14, 2016.

(Continued)

*Primary Examiner* — Charles C Jiang
*Assistant Examiner* — Ryan C Kavleski
(74) *Attorney, Agent, or Firm* — Flaster Greenberg, P.C.

(57) ABSTRACT

Methods and systems are disclosed for resource management on Sidelink for vehicle to everything (V2X) scenarios. Example methods and systems for a Resource Structure on Sidelink are disclosed. Control and data channels may be Frequency Division Multiplexed (FDMed) or Time Division (Continued)

Multiplexed (TDMed) with an Orthogonal Frequency Division Multiplexing (OFDM) waveform. Example methods and systems for a Resource Configuration on Sidelink are disclosed. The resource configuration may be statically configured or may be locally configured. Example methods and systems for Assisted Resource Allocation are disclosed. Assisted Sensing may be performed by a group lead or RSU and local scheduling may be performed by a group lead or RSU.

14 Claims, 47 Drawing Sheets

Related U.S. Application Data filed on Sep. 27, 2018, provisional application No. 62/716,674, filed on Aug. 9, 2018.

(51) Int. Cl.
| | |
|---|---|
| *H04L 1/1812* | (2023.01) |
| *H04W 24/10* | (2009.01) |
| *H04W 28/26* | (2009.01) |
| *H04W 72/0446* | (2023.01) |
| *H04W 72/0453* | (2023.01) |
| *H04W 72/20* | (2023.01) |
| *H04W 80/02* | (2009.01) |

(52) U.S. Cl.
CPC ........... *H04W 24/10* (2013.01); *H04W 28/26* (2013.01); *H04W 72/0446* (2013.01); *H04W 72/0453* (2013.01); *H04W 72/20* (2023.01); *H04W 80/02* (2013.01)

(56) References Cited

U.S. PATENT DOCUMENTS

| | | |
|---|---|---|
| 2015/0103664 A1 | 4/2015 | Shan et al. |
| 2016/0295624 A1 | 10/2016 | Novlan et al. |
| 2017/0188391 A1* | 6/2017 | Rajagopal ......... H04W 74/0816 |
| 2019/0132818 A1* | 5/2019 | Yasukawa ............. H04W 72/02 |
| 2019/0174547 A1* | 6/2019 | Khoryaev ............... H04L 47/11 |
| 2019/0208441 A1* | 7/2019 | Wang ..................... H04W 24/10 |
| 2019/0223046 A1* | 7/2019 | Lee ......................... H04W 72/02 |
| 2019/0380132 A1* | 12/2019 | Hu .......................... H04W 4/70 |
| 2021/0266921 A1* | 8/2021 | Wang ................ H04W 74/0808 |

FOREIGN PATENT DOCUMENTS

| | | | |
|---|---|---|---|
| EP | 3445107 A1 | 2/2019 | |
| RU | 2643349 C1 | 2/2018 | |
| WO | 2012/159270 A1 | 11/2012 | |
| WO | 2017/179286 A1 | 10/2017 | |
| WO | 2018021803 A1 | 2/2018 | |
| WO | WO 2018/038565 A1 | 3/2018 | |
| WO | 2018/081979 A1 | 5/2018 | |
| WO | 2018/121621 A1 | 7/2018 | |
| WO | 2018/148034 A1 | 8/2018 | |
| WO | WO-2019091649 A1 * | 5/2019 | ............. H04L 67/12 |

OTHER PUBLICATIONS

Bonjorn et al., "Enhanced 5G V2X services using sidelink device-to-device communications", 17th Annual Mediterranean Ad Hoc Networking Workshop (Med-Hoc-Net), 2018, pp. 116-122.

Third Generation Partnership Project, "Technical Specification Group Services and System Aspects; Enhancement of 3GPP support for V2X scenarios; Stage 1 (Release 15)", 3GPP TS 22.186 V15.3.0 Jun. 2018, 16 pages.

Third Generation Partnership Project, "Technical Specification Group Services and System Aspects; Study on enhancement of 3GPP Support for 5G V2X Services (Release 15)", 3GPP TR 22.886 V15.2.0, Jun. 2018, 58 pages.

Third Generation Partnership Project, "Technical Specification Group Radio Access Network; Evolved Universal Terrestrial Radio Access (E-UTRA); Physical layer procedure (Release 15)" 3GPP TS 36.213 V15.2.0, Jun. 2018, 541 pages.

Third Generation Partnership Project, "Discussion on Latency Reduction for V2X Phase 2", 3GPP TSG RAN WG1 Meeting #92bis, R1-1804206, Apr. 16-20, 2018, 3 pages.

Third Generation Partnership Project (3GPP), "Discussion on details of sensing with semi-persistent transmission", 3GPP TSG RAN WG1 Meeting #84bis, R1-163176, Apr. 11-15, 2016, 6 pages.

\* cited by examiner

C. Aperiodic Resource Selection with Resource Reservation for Blind Retransmission

RESOURCE MANAGEMENT FOR 5G eV2X

CROSS-REFERENCE TO RELATED APPLICATIONS

This application is the National Stage of International Patent Application No. PCT/US2019/040828, filed Jul. 8, 2019, which claims the benefit of U.S. Provisional Application No. 62/716,674, filed Aug. 9, 2018; U.S. Provisional Application No. 62/737,648, filed Sep. 27, 2018 and United States Provisional Application No. 62/790,731, filed Jan. 10, 2019, the disclosures of which are incorporated herein by reference in their entireties.

BACKGROUND

As Vehicle-to-everything (V2X) applications make significant progress, transmission of short messages about a vehicles' own status data for basic safety may need to be extended with the transmission of larger messages containing raw sensor data, vehicles' intention data, coordination, confirmation of future maneuver, etc. For these advanced applications, the expected requirements to meet the needed data rate, latency, reliability, communication range and speed are made more stringent.

For enhanced V2X (eV2X) services, 3GPP has identified 25 examples use cases and the related requirements (see 3GPP TR 22.886 Study on enhancement of 3GPP Support for 5G V2X Services, Release 15, V15.2.0). A set of the normative requirements is also specified with the use cases being categorized into four use case groups: vehicles platooning, extended sensors, advanced driving and remote driving (see 3GPP TS 22.186 Enhancement of 3GPP support for V2X scenarios (Stage 1), Release 15, V15.3.0). The detailed description of performance requirements for each use case group are specified in TS 22.186.

SUMMARY

Methods and systems are disclosed for resource management on sidelink for vehicle to everything (V2X) scenarios. Example methods and systems for a Resource Structure on Sidelink are disclosed. Control and data channels may be Frequency Division Multiplexed (Famed) or Time Division Multiplexed (Timed) with an Orthogonal Frequency Division Multiplexing (OFDM) waveform. Example methods and systems for a Resource Configuration on Sidelink are disclosed. The resource configuration may be statically configured or may be locally semi-persistent or dynamically configured. Example methods and systems for Assisted Resource Allocation are disclosed. Assisted Sensing may be performed by a special device or User Equipment (UE) such as a group lead or Roadside Unit (RSU) or a scheduling UE and local scheduling may be performed by a special device or User Equipment (UE) such as a group lead or RSU or a scheduling UE. Example methods and systems for a scheduler allocation scheme for both with network control and without network control are disclosed. Example methods and systems for a resource allocation mode switching scheme for both with network control and without network control are disclosed. Example methods and systems for slot or subframe structures with resource allocations of control and data channels for different communications are disclosed. Example methods and systems for a sensing scheme for both periodic and aperiodic data transmissions are disclosed. Example methods and systems for sensing based resource selection and congestion control transmission scheme are disclosed.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

The following detailed description is better understood when read in conjunction with the appended drawings. For the purposes of illustration, examples are shown in the drawings; however, the subject matter is not limited to specific elements and instrumentalities disclosed. In the drawings.

DETAILED DESCRIPTION OF ILLUSTRATIVE EMBODIMENTS

Example Communication System and Networks

The 3rd Generation Partnership Project (3GPP) develops technical standards for cellular telecommunications network technologies, including radio access, the core transport network, and service capabilities-including work on codecs, security, and quality of service. Recent radio access technology (RAT) standards include WCDMA (commonly referred as 3G), LTE (commonly referred as 4G), LTE-Advanced standards, and New Radio (NR), which is also referred to as "5G". 3GPP NR standards development is expected to continue and include the definition of next generation radio access technology (new RAT), which is expected to include the provision of new flexible radio access below 7 GHZ, and the provision of new ultra-mobile broadband radio access above 7 GHz. The flexible radio access is expected to consist of a new, non-backwards compatible radio access in new spectrum below 7 GHz, and it is expected to include different operating modes that may be multiplexed together in the same spectrum to address a broad set of 3GPP NR use cases with diverging requirements. The ultra-mobile broadband is expected to include cmWave and mmWave spectrum that will provide the opportunity for ultra-mobile broadband access for, e.g., indoor applications and hotspots. In particular, the ultra-mobile broadband is expected to share a common design framework with the flexible radio access below 7 GHz, with cmWave and mmWave specific design optimizations.

3GPP has identified a variety of use cases that NR is expected to support, resulting in a wide variety of user experience requirements for data rate, latency, and mobility. The use cases include the following general categories: enhanced mobile broadband (eMBB) ultra-reliable low-latency Communication (URLLC), massive machine type communications (mMTC), network operation (e.g., network slicing, routing, migration and interworking, energy savings), and enhanced vehicle-to-everything (eV2X) communications, which may include any of Vehicle-to-Vehicle Communication (V2V), Vehicle-to-Infrastructure Communication (V2I), Vehicle-to-Network Communication (V2N), Vehicle-to-Pedestrian Communication (V2P), and vehicle communications with other entities. Specific service and applications in these categories include, e.g., monitoring and sensor networks, device remote controlling, bi-directional remote controlling, personal cloud computing, video streaming, wireless cloud-based office, first responder connectivity, automotive ecall, disaster alerts, real-time gaming, multi-person video calls, autonomous driving, augmented reality, tactile internet, virtual reality, home automation, robotics, and aerial drones to name a few. All of these use cases and others are contemplated herein.

Figure 1A:
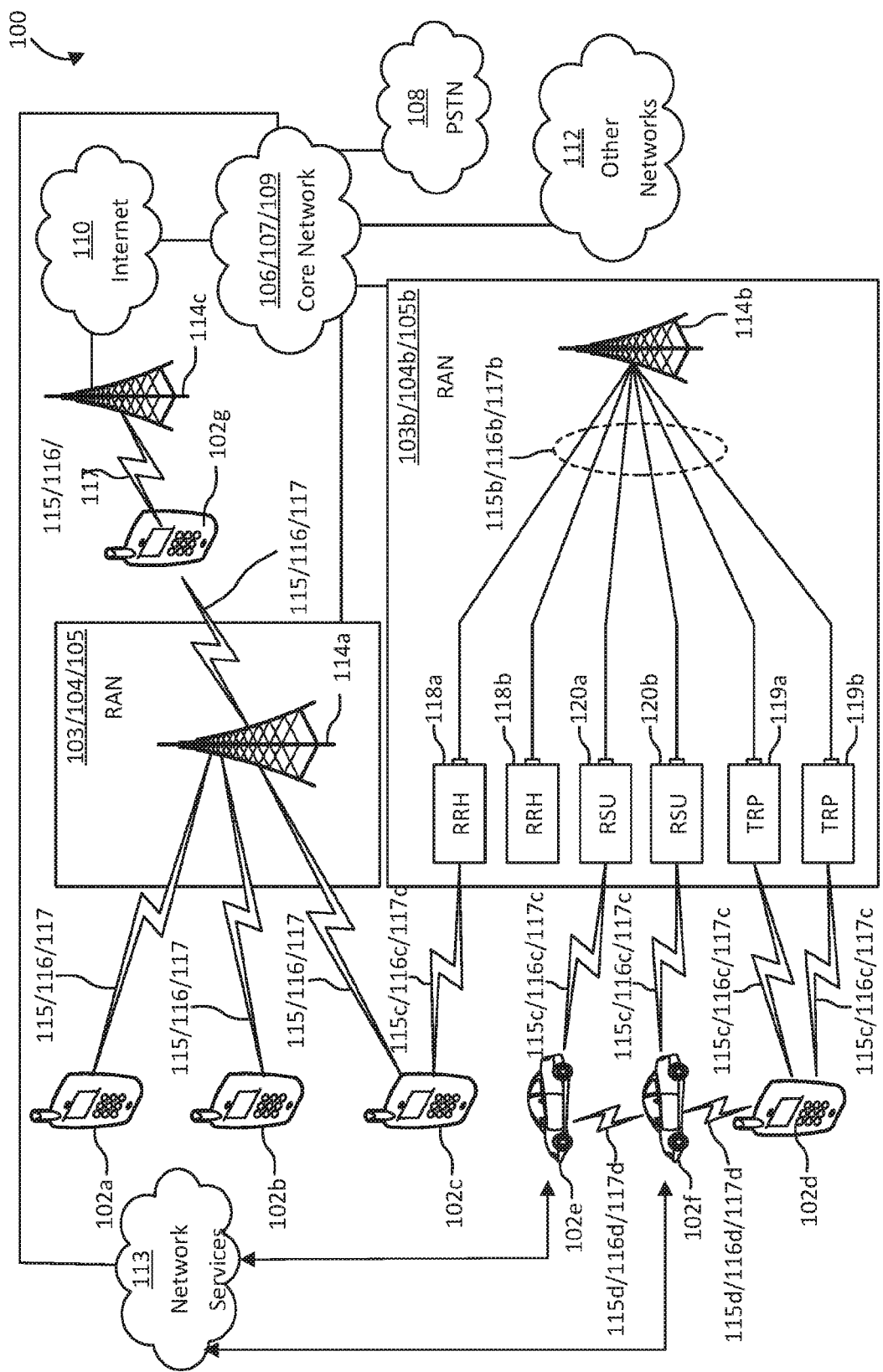
FIG. 1A illustrates an example communications system.

FIG. 1A illustrates an example communications system 100 in which the systems, methods, and apparatuses described and claimed herein may be used. The communications system 100 may include wireless transmit/receive units (WTRUs) 102a, 102b, 102c, 102d, 102e, 102f, and/or 102g, which generally or collectively may be referred to as WTRU 102 or WTRUs 102. The communications system 100 may include, a radio access network (RAN) 103/104/105/103b/104b/105b, a core network 106/107/109, a public switched telephone network (PSTN) 108, the Internet 110, other networks 112, and Network Services 113. 113. Network Services 113 may include, for example, a V2X server, V2X functions, a ProSe server, ProSe functions, IoT services, video streaming, and/or edge computing, etc.

It will be appreciated that the concepts disclosed herein may be used with any number of WTRUs, base stations, networks, and/or network elements. Each of the WTRUs 102 may be any type of apparatus or device configured to operate and/or communicate in a wireless environment. In the example of FIG. 1A, each of the WTRUs 102 is depicted in FIGS. 1A-1E as a hand-held wireless communications apparatus. It is understood that with the wide variety of use cases contemplated for wireless communications, each WTRU may comprise or be included in any type of apparatus or device configured to transmit and/or receive wireless signals, including, by way of example only, user equipment (UE), a mobile station, a fixed or mobile subscriber unit, a pager, a cellular telephone, a personal digital assistant (PDA), a smartphone, a laptop, a tablet, a netbook, a notebook computer, a personal computer, a wireless sensor, consumer electronics, a wearable device such as a smart watch or smart clothing, a medical or eHealth device, a robot, industrial equipment, a drone, a vehicle such as a car, bus or truck, a train, or an airplane, and the like.

The communications system 100 may also include a base station 114a and a base station 114b. In the example of FIG. 1A, each base stations 114a and 114b is depicted as a single element. In practice, the base stations 114a and 114b may include any number of interconnected base stations and/or network elements. Base stations 114a may be any type of device configured to wirelessly interface with at least one of the WTRUs 102a, 102b, and 102c to facilitate access to one or more communication networks, such as the core network 106/107/109, the Internet 110, Network Services 113, and/or the other networks 112. Similarly, base station 114b may be any type of device configured to wiredly and/or wirelessly interface with at least one of the Remote Radio Heads (RRHs) 118a, 118b, Transmission and Reception Points (TRPs) 119a, 119b, and/or Roadside Units (RSUs) 120a and 120b to facilitate access to one or more communication networks, such as the core network 106/107/109, the Internet 110, other networks 112, and/or Network Services 113. RRHs 118a, 118b may be any type of device configured to wirelessly interface with at least one of the WTRUs 102, e.g., WTRU 102c, to facilitate access to one or more communication networks, such as the core network 106/107/109, the Internet 110, Network Services 113, and/or other networks 112.

TRPs 119a, 119b may be any type of device configured to wirelessly interface with at least one of the WTRU 102d, to facilitate access to one or more communication networks, such as the core network 106/107/109, the Internet 110, Network Services 113, and/or other networks 112. RSUs 120a and 120b may be any type of device configured to wirelessly interface with at least one of the WTRU 102e or 102f, to facilitate access to one or more communication networks, such as the core network 106/107/109, the Internet 110, other networks 112, and/or Network Services 113. By way of example, the base stations 114a, 114b may be a Base Transceiver Station (BTS), a Node-B, an eNode B, a Home Node B, a Home eNode B, a Next Generation Node-B (gNode B), a satellite, a site controller, an access point (AP), a wireless router, and the like.

The base station 114a may be part of the RAN 103/104/105, which may also include other base stations and/or network elements (not shown), such as a Base Station Controller (BSC), a Radio Network Controller (RNC), relay nodes, etc. Similarly, the base station 114b may be part of the RAN 103b/104b/105b, which may also include other base stations and/or network elements (not shown), such as a BSC, a RNC, relay nodes, etc. The base station 114a may be configured to transmit and/or receive wireless signals within a particular geographic region, which may be referred to as a cell (not shown). Similarly, the base station 114b may be configured to transmit and/or receive wired and/or wireless signals within a particular geographic region, which may be referred to as a cell (not shown). The cell may further be divided into cell sectors. For example, the cell associated with the base station 114a may be divided into three sectors. Thus, for example, the base station 114a may include three transceivers, e.g., one for each sector of the cell. The base station 114a may employ Multiple-Input Multiple Output (MIMO) technology and, therefore, may utilize multiple transceivers for each sector of the cell, for instance.

The base station 114a may communicate with one or more of the WTRUs 102a, 102b, 102c, and 102g over an air interface 115/116/117, which may be any suitable wireless communication link (e.g., Radio Frequency (RF), microwave, infrared (IR), ultraviolet (UV), visible light, cmWave, mmWave, etc.). The air interface 115/116/117 may be established using any suitable Radio Access Technology (RAT).

The base station 114b may communicate with one or more of the RRHs 118a and 118b, TRPs 119a and 119b, and/or RSUs 120a and 120b, over a wired or air interface 115b/116b/117b, which may be any suitable wired (e.g., cable, optical fiber, etc.) or wireless communication link (e.g., RF, microwave, IR, UV, visible light, cmWave, mmWave, etc.). The air interface 115b/116b/117b may be established using any suitable RAT.

The RRHs 118a, 118b, TRPs 119a, 119b and/or RSUs 120a, 120b, may communicate with one or more of the WTRUs 102c, 102d, 102e, 102f over an air interface 115c/116c/117c, which may be any suitable wireless communication link (e.g., RF, microwave, IR, ultraviolet UV, visible light, cmWave, mmWave, etc.) The air interface 115c/116c/117c may be established using any suitable RAT.

The WTRUs 102 may communicate with one another over a direct air interface 115d/116d/117d, such as Sidelink communication which may be any suitable wireless communication link (e.g., RF, microwave, IR, ultraviolet UV, visible light, cmWave, mmWave, etc.) The air interface 115d/116d/117d may be established using any suitable RAT.

The communications system 100 may be a multiple access system and may employ one or more channel access schemes, such as CDMA, TDMA, FDMA, OFDMA, SC-FDMA, and the like. For example, the base station 114a in the RAN 103/104/105 and the WTRUs 102a, 102b, 102c, or RRHs 118a, 118b, TRPs 119a, 119b and/or RSUs 120a and 120b in the RAN 103b/104b/105b and the WTRUs 102c, 102d, 102e, and 102f, may implement a radio technology such as Universal Mobile Telecommunications System (UMTS) Terrestrial Radio Access (UTRA), which may establish the air interface 115/116/117 and/or 115c/116c/117c respectively using Wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

The base station 114a in the RAN 103/104/105 and the WTRUs 102a, 102b, 102c, and 102g, or RRHs 118a and 118b, TRPs 119a and 119b, and/or RSUs 120a and 120b in the RAN 103b/104b/105b and the WTRUs 102c, 102d, may implement a radio technology such as Evolved UMTS Terrestrial Radio Access (E-UTRA), which may establish the air interface 115/116/117 or 115c/116c/117c respectively using Long Term Evolution (LTE) and/or LTE-Advanced (LTE-A), for example. The air interface 115/116/117 or 115c/116c/117c may implement 3GPP NR technology. The LTE and LTE-A technology may include LTE D2D and/or V2X technologies and interfaces (such as Sidelink communications, etc.) Similarly, the 3GPP NR technology may include NR V2X technologies and interfaces (such as Sidelink communications, etc.)

The base station 114a in the RAN 103/104/105 and the WTRUs 102a, 102b, 102c, and 102g or RRHs 118a and 118b, TRPs 119a and 119b, and/or RSUs 120a and 120b in the RAN 103b/104b/105b and the WTRUs 102c, 102d, 102e, and 102f may implement radio technologies such as IEEE 802.16 (e.g., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114c in FIG. 1A may be a wireless router, Home Node B, Home eNode B, or access point, for example, and may utilize any suitable RAT for facilitating wireless connectivity in a localized area, such as a place of business, a home, a vehicle, a train, an aerial, a satellite, a manufactory, a campus, and the like. The base station 114c and the WTRUs 102, e.g., WTRU 102e, may implement a radio technology such as IEEE 802.11 to establish a Wireless Local Area Network (WLAN). Similarly, the base station 114c and the WTRUs 102, e.g., WTRU 102d, may implement a radio technology such as IEEE 802.15 to establish a wireless personal area network (WPAN). The base station 114c and the WTRUs 102, e.g., WRTU 102e, may utilize a cellular-based RAT (e.g., WCDMA, CDMA2000, GSM, LTE, LTE-A, NR, etc.) to establish a picocell or femtocell. As shown in FIG. 1A, the base station 114c may have a direct connection to the Internet 110. Thus, the base station 114c may not be required to access the Internet 110 via the core network 106/107/109.

The RAN 103/104/105 and/or RAN 103b/104b/105b may be in communication with the core network 106/107/109, which may be any type of network configured to provide voice, data, messaging, authorization and authentication, applications, and/or Voice Over Internet Protocol (VOIP) services to one or more of the WTRUs 102. For example, the core network 106/107/109 may provide call control, billing services, mobile location-based services, pre-paid calling, Internet connectivity, packet data network connectivity, Ethernet connectivity, video distribution, etc., and/or perform high-level security functions, such as user authentication.

Although not shown in FIG. 1A, it will be appreciated that the RAN 103/104/105 and/or RAN 103b/104b/105b and/or the core network 106/107/109 may be in direct or indirect communication with other RANs that employ the same RAT as the RAN 103/104/105 and/or RAN 103b/104b/105b or a different RAT. For example, in addition to being connected to the RAN 103/104/105 and/or RAN 103b/104b/105b, which may be utilizing an E-UTRA radio technology, the core network 106/107/109 may also be in communication with another RAN (not shown) employing a GSM or NR radio technology.

The core network 106/107/109 may also serve as a gateway for the WTRUs 102 to access the PSTN 108, the Internet 110, and/or other networks 112. The PSTN 108 may include circuit-switched telephone networks that provide Plain Old Telephone Service (POTS). The Internet 110 may include a global system of interconnected computer networks and devices that use common communication protocols, such as the Transmission Control Protocol (TCP), User Datagram Protocol (UDP), and the internet protocol (IP) in the TCP/IP internet protocol suite. The other networks 112 may include wired or wireless communications networks owned and/or operated by other service providers. For example, the networks 112 may include any type of packet data network (e.g., an IEEE 802.3 Ethernet network) or another core network connected to one or more RANs, which may employ the same RAT as the RAN 103/104/105 and/or RAN 103b/104b/105b or a different RAT.

Some or all of the WTRUs 102a, 102b, 102c, 102d, 102e, and 102f in the communications system 100 may include multi-mode capabilities, e.g., the WTRUs 102a, 102b, 102c, 102d, 102e, and 102f may include multiple transceivers for communicating with different wireless networks over different wireless links. For example, the WTRU 102g shown in FIG. 1A may be configured to communicate with the base station 114a, which may employ a cellular-based radio technology, and with the base station 114c, which may employ an IEEE 802 radio technology.

Although not shown in FIG. 1A, it will be appreciated that a User Equipment may make a wired connection to a gateway. The gateway maybe a Residential Gateway (RG). The RG may provide connectivity to a Core Network 106/107/109. It will be appreciated that many of the ideas contained herein may equally apply to UEs that are WTRUs and UEs that use a wired connection to connect to a network. For example, the ideas that apply to the wireless interfaces 115, 116, 117 and 115c/116c/117c may equally apply to a wired connection.

Figure 1B:
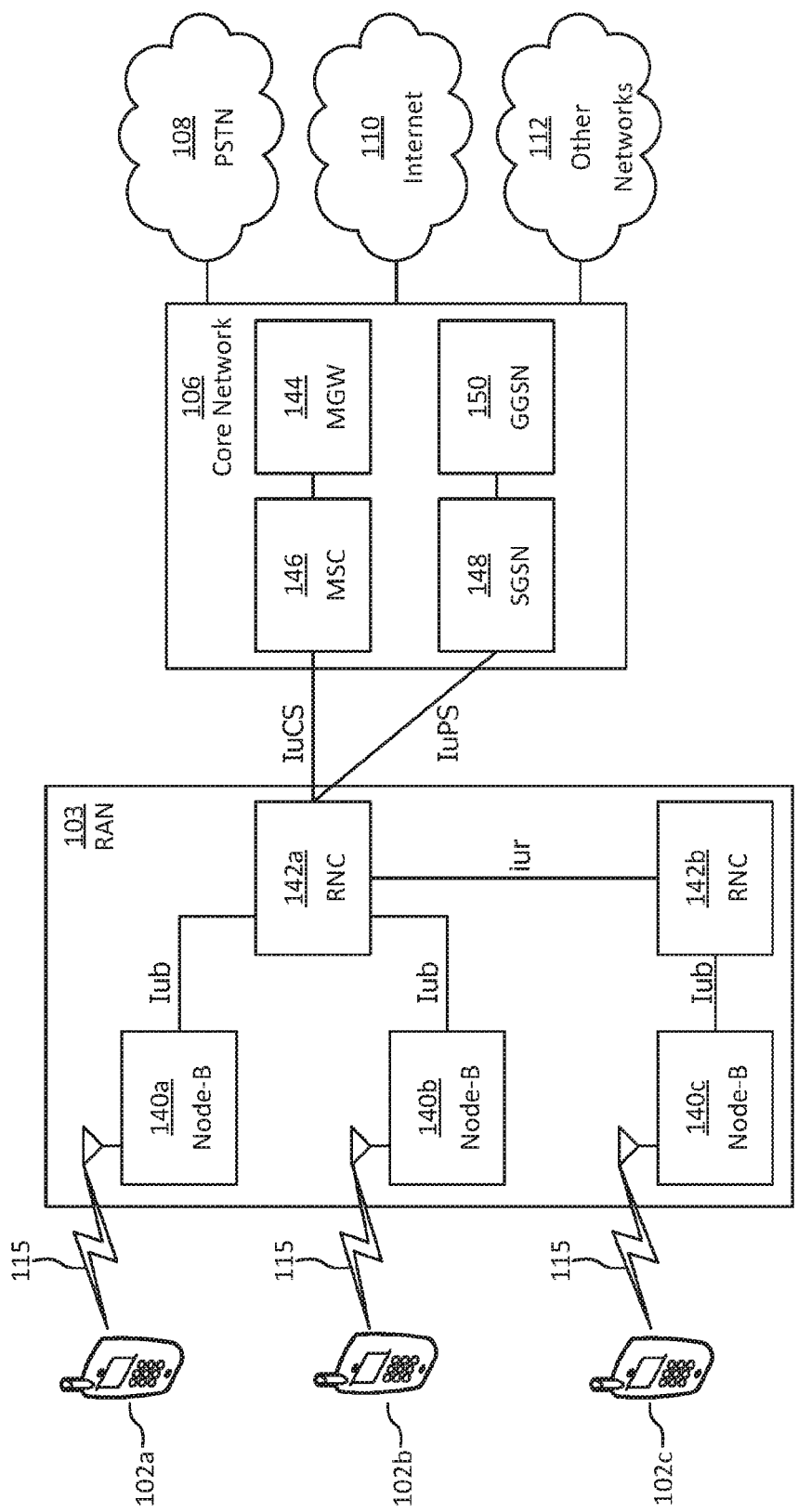
FIGS. 1B, 1C, and 1D are system diagrams of example RANs and core networks.

FIG. 1B is a system diagram of an example RAN 103 and core network 106. As noted above, the RAN 103 may employ a UTRA radio technology to communicate with the WTRUs 102a, 102b, and 102c over the air interface 115. The RAN 103 may also be in communication with the core network 106. As shown in FIG. 1B, the RAN 103 may include Node-Bs 140a, 140b, and 140c, which may each include one or more transceivers for communicating with the WTRUs 102a, 102b, and 102c over the air interface 115. The Node-Bs 140a, 140b, and 140c may each be associated with a particular cell (not shown) within the RAN 103. The RAN 103 may also include RNCs 142a, 142b. It will be appreciated that the RAN 103 may include any number of Node-Bs and Radio Network Controllers (RNCs.)

As shown in FIG. 1B, the Node-Bs 140a, 140b may be in communication with the RNC 142a. Additionally, the Node-B 140c may be in communication with the RNC 142b. The Node-Bs 140a, 140b, and 140c may communicate with the respective RNCs 142a and 142b via an Iub interface. The RNCs 142a and 142b may be in communication with one another via an Iur interface. Each of the RNCs 142a and 142b may be configured to control the respective Node-Bs 140a, 140b, and 140c to which it is connected. In addition, each of the RNCs 142a and 142b may be configured to carry out or support other functionality, such as outer loop power control, load control, admission control, packet scheduling, handover control, macro-diversity, security functions, data encryption, and the like.

The core network 106 shown in FIG. 1B may include a media gateway (MGW) 144, a Mobile Switching Center (MSC) 146, a Serving GPRS Support Node (SGSN) 148, and/or a Gateway GPRS Support Node (GGSN) 150. While each of the foregoing elements are depicted as part of the core network 106, it will be appreciated that any one of these elements may be owned and/or operated by an entity other than the core network operator.

The RNC 142a in the RAN 103 may be connected to the MSC 146 in the core network 106 via an IuCS interface. The MSC 146 may be connected to the MGW 144. The MSC 146 and the MGW 144 may provide the WTRUs 102a, 102b, and 102c with access to circuit-switched networks, such as the PSTN 108, to facilitate communications between the WTRUs 102a, 102b, and 102c, and traditional land-line communications devices.

The RNC 142a in the RAN 103 may also be connected to the SGSN 148 in the core network 106 via an IuPS interface. The SGSN 148 may be connected to the GGSN 150. The SGSN 148 and the GGSN 150 may provide the WTRUs 102a, 102b, and 102c with access to packet-switched networks, such as the Internet 110, to facilitate communications between and the WTRUs 102a, 102b, and 102c, and IP-enabled devices.

The core network 106 may also be connected to the other networks 112, which may include other wired or wireless networks that are owned and/or operated by other service providers.

Figure 1C:
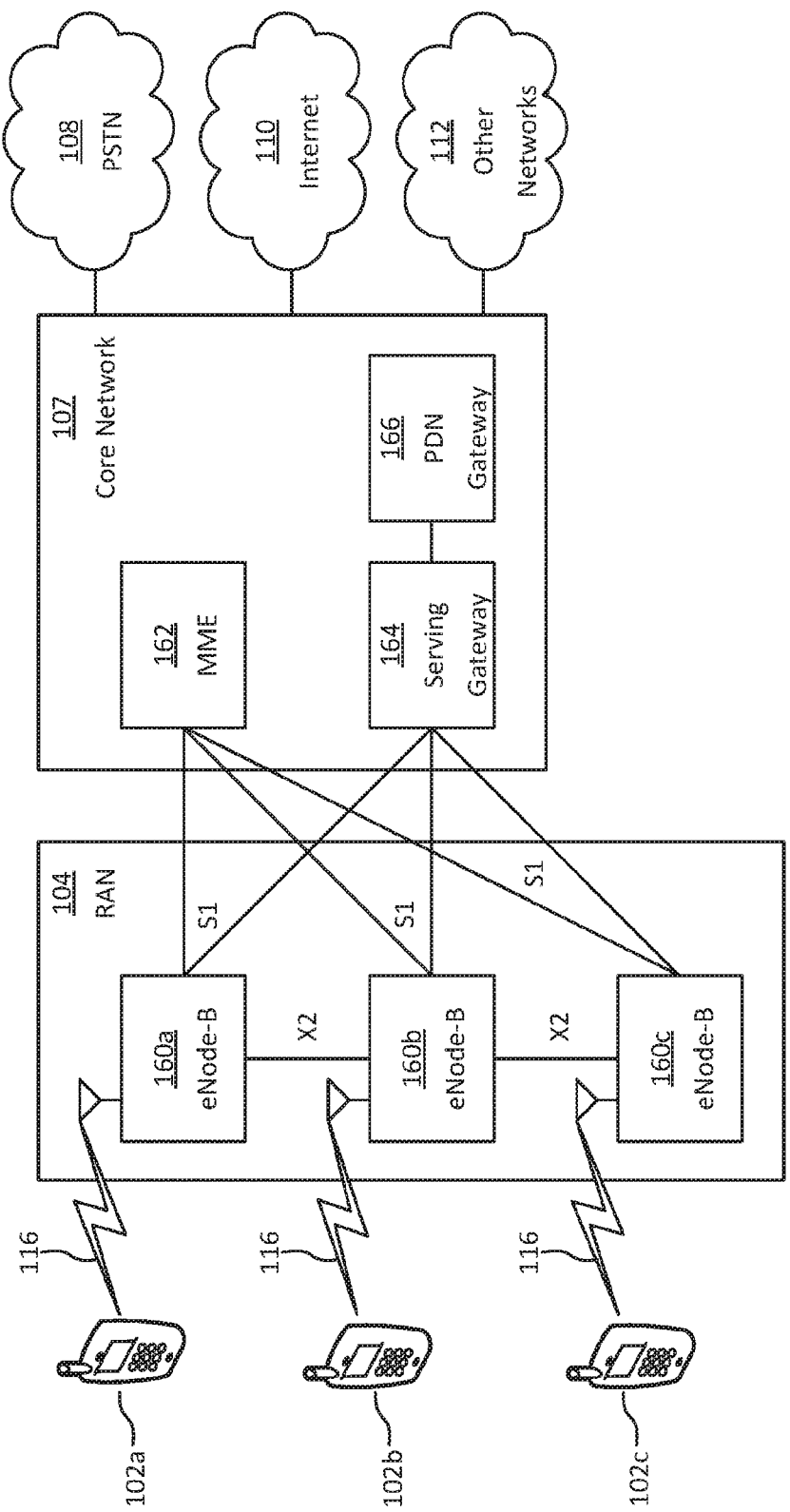

FIG. 1C is a system diagram of an example RAN 104 and core network 107. As noted above, the RAN 104 may employ an E-UTRA radio technology to communicate with the WTRUs 102a, 102b, and 102c over the air interface 116. The RAN 104 may also be in communication with the core network 107.

The RAN 104 may include eNode-Bs 160a, 160b, and 160c, though it will be appreciated that the RAN 104 may include any number of eNode-Bs. The eNode-Bs 160a, 160b, and 160c may each include one or more transceivers for communicating with the WTRUs 102a, 102b, and 102c over the air interface 116. For example, the eNode-Bs 160a, 160b, and 160c may implement MIMO technology. Thus, the eNode-B 160a, for example, may use multiple antennas to transmit wireless signals to, and receive wireless signals from, the WTRU 102a.

Each of the eNode-Bs 160a, 160b, and 160c may be associated with a particular cell (not shown) and may be configured to handle radio resource management decisions, handover decisions, scheduling of users in the uplink and/or downlink, and the like. As shown in FIG. 1C, the eNode-Bs 160a, 160b, and 160c may communicate with one another over an X2 interface.

The core network 107 shown in FIG. 1C may include a Mobility Management Gateway (MME) 162, a serving gateway 164, and a Packet Data Network (PDN) gateway 166. While each of the foregoing elements are depicted as part of the core network 107, it will be appreciated that any one of these elements may be owned and/or operated by an entity other than the core network operator.

The MME 162 may be connected to each of the eNode-Bs 160a, 160b, and 160c in the RAN 104 via an SI interface and may serve as a control node. For example, the MME 162 may be responsible for authenticating users of the WTRUs 102a, 102b, and 102c, bearer activation/deactivation, selecting a particular serving gateway during an initial attach of the WTRUs 102a, 102b, and 102c, and the like. The MME 162 may also provide a control plane function for switching between the RAN 104 and other RANs (not shown) that employ other radio technologies, such as GSM or WCDMA.

The serving gateway 164 may be connected to each of the eNode-Bs 160a, 160b, and 160c in the RAN 104 via the SI interface. The serving gateway 164 may generally route and forward user data packets to/from the WTRUs 102a, 102b, and 102c. The serving gateway 164 may also perform other functions, such as anchoring user planes during inter-eNode B handovers, triggering paging when downlink data is available for the WTRUs 102a, 102b, and 102c, managing and storing contexts of the WTRUs 102a, 102b, and 102c, and the like.

The serving gateway 164 may also be connected to the PDN gateway 166, which may provide the WTRUs 102a, 102b, and 102c with access to packet-switched networks, such as the Internet 110, to facilitate communications between the WTRUs 102a, 102b, 102c, and IP-enabled devices.

The core network 107 may facilitate communications with other networks. For example, the core network 107 may provide the WTRUs 102a, 102b, and 102c with access to circuit-switched networks, such as the PSTN 108, to facilitate communications between the WTRUs 102a, 102b, and 102c and traditional land-line communications devices. For example, the core network 107 may include, or may communicate with, an IP gateway (e.g., an IP Multimedia Subsystem (IMS) server) that serves as an interface between the core network 107 and the PSTN 108. In addition, the core network 107 may provide the WTRUs 102a, 102b, and 102c with access to the networks 112, which may include other wired or wireless networks that are owned and/or operated by other service providers.

Figure 1D:
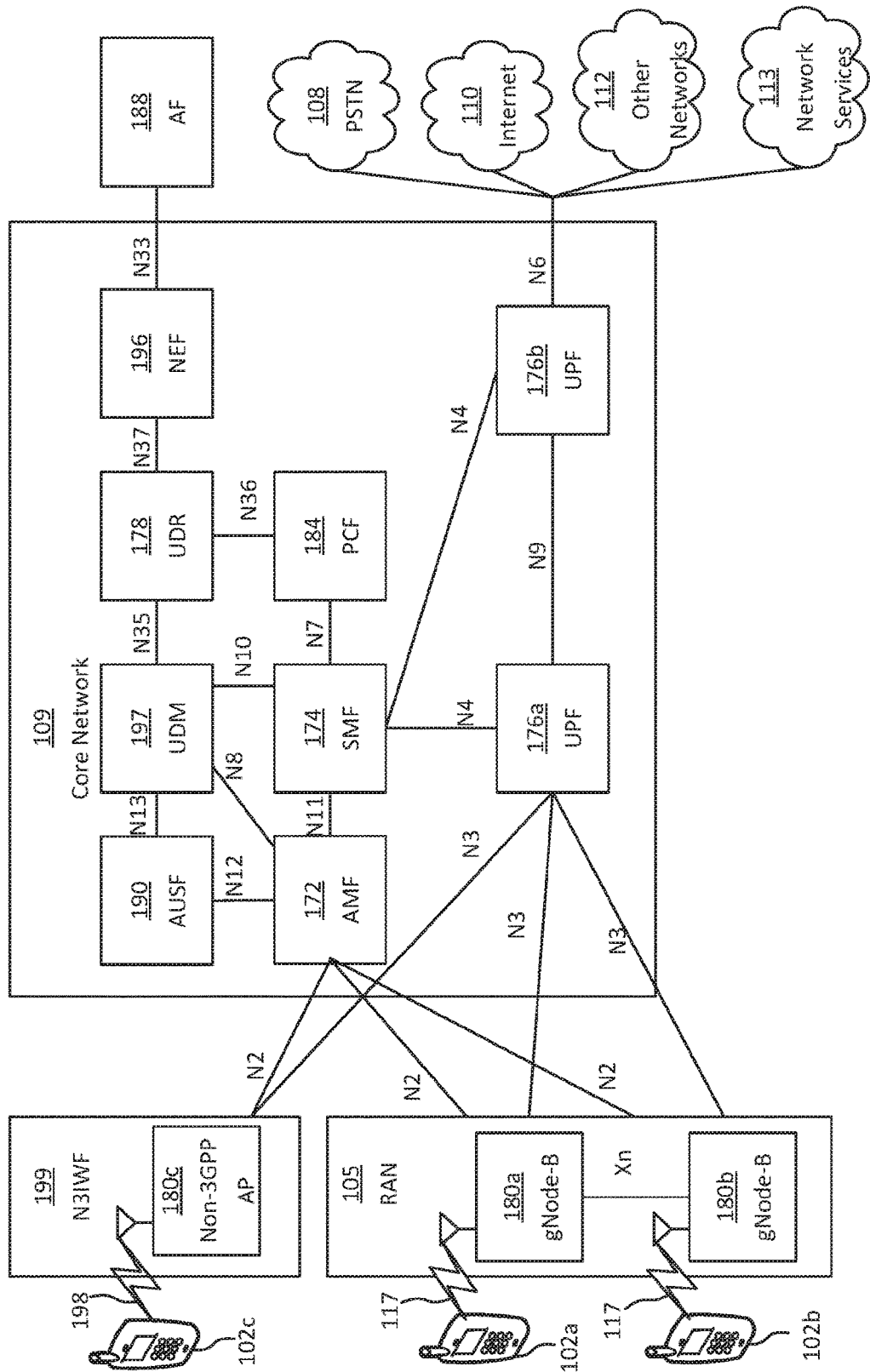

FIG. 1D is a system diagram of an example RAN 105 and core network 109. The RAN 105 may employ an NR radio technology to communicate with the WTRUs 102a and 102b over the air interface 117. The RAN 105 may also be in communication with the core network 109. A Non-3GPP Interworking Function (N3IWF) 199 may employ a non-3GPP radio technology to communicate with the WTRU 102c over the air interface 198. The N3IWF 199 may also be in communication with the core network 109.

The RAN 105 may include gNode-Bs 180a and 180b. It will be appreciated that the RAN 105 may include any number of gNode-Bs. The gNode-Bs 180a and 180b may each include one or more transceivers for communicating with the WTRUs 102a and 102b over the air interface 117. When integrated access and backhaul connection are used, the same air interface may be used between the WTRUs and gNode-Bs, which may be the core network 109 via one or multiple gNBs. The gNode-Bs 180a and 180b may implement MIMO, MU-MIMO, and/or digital beamforming technology. Thus, the gNode-B 180a, for example, may use multiple antennas to transmit wireless signals to, and receive wireless signals from, the WTRU 102a. It should be appreciated that the RAN 105 may employ of other types of base stations such as an eNode-B. It will also be appreciated the RAN 105 may employ more than one type of base station. For example, the RAN may employ eNode-Bs and gNode-Bs.

The N3IWF 199 may include a non-3GPP Access Point 180c. It will be appreciated that the N3IWF 199 may include any number of non-3GPP Access Points. The non-3GPP Access Point 180c may include one or more transceivers for communicating with the WTRUs 102c over the air interface 198. The non-3GPP Access Point 180c may use the 802.11 protocol to communicate with the WTRU 102c over the air interface 198.

Each of the gNode-Bs 180a and 180b may be associated with a particular cell (not shown) and may be configured to handle radio resource management decisions, handover decisions, scheduling of users in the uplink and/or downlink, and the like. As shown in FIG. 1D, the gNode-Bs 180a and 180b may communicate with one another over an Xn interface, for example.

The core network 109 shown in FIG. 1D may be a 5G core network (5GC). The core network 109 may offer numerous communication services to customers who are interconnected by the radio access network. The core network 109 comprises a number of entities that perform the functionality of the core network. As used herein, the term "core network entity" or "network function" refers to any entity that performs one or more functionalities of a core network. It is understood that such core network entities may be logical entities that are implemented in the form of computer-executable instructions (software) stored in a memory of, and executing on a processor of, an apparatus configured for wireless and/or network communications or a computer system, such as system 90 illustrated in Figure x1G.

In the example of FIG. 1D, the 5G Core Network 109 may include an access and mobility management function (AMF) 172, a Session Management Function (SMF) 174, User Plane Functions (UPFs) 176a and 176b, a User Data Management Function (UDM) 197, an Authentication Server Function (AUSF) 190, a Network Exposure Function (NEF) 196, a Policy Control Function (PCF) 184, a Non-3GPP Interworking Function (N3IWF) 199, a User Data Repository (UDR) 178. While each of the foregoing elements are depicted as part of the 5G core network 109, it will be appreciated that any one of these elements may be owned and/or operated by an entity other than the core network operator. It will also be appreciated that a 5G core network may not consist of all of these elements, may consist of additional elements, and may consist of multiple instances of each of these elements. FIG. 1D shows that network functions directly connect to one another, however, it should be appreciated that they may communicate via routing agents such as a diameter routing agent or message buses.

In the example of FIG. 1D, connectivity between network functions is achieved via a set of interfaces, or reference points. It will be appreciated that network functions could be modeled, described, or implemented as a set of services that are invoked, or called, by other network functions or services. Invocation of a Network Function service may be achieved via a direct connection between network functions, an exchange of messaging on a message bus, calling a software function, etc.

The AMF 172 may be connected to the RAN 105 via an N2 interface and may serve as a control node. For example, the AMF 172 may be responsible for registration management, connection management, reachability management, access authentication, access authorization. The AMF may be responsible forwarding user plane tunnel configuration information to the RAN 105 via the N2 interface. The AMF 172 may receive the user plane tunnel configuration information from the SMF via an N11 interface. The AMF 172 may generally route and forward NAS packets to/from the WTRUs 102a, 102b, and 102c via an N1 interface. The N1 interface is not shown in FIG. 1D.

The SMF 174 may be connected to the AMF 172 via an N11 interface. Similarly the SMF may be connected to the PCF 184 via an N7 interface, and to the UPFs 176a and 176b via an N4 interface. The SMF 174 may serve as a control node. For example, the SMF 174 may be responsible for Session Management, IP address allocation for the WTRUs 102a, 102b, and 102c, management and configuration of traffic steering rules in the UPF 176a and UPF 176b, and generation of downlink data notifications to the AMF 172.

The UPF 176a and UPF 176b may provide the WTRUs 102a, 102b, and 102c with access to a Packet Data Network (PDN), such as the Internet 110, to facilitate communications between the WTRUs 102a, 102b, and 102c and other devices. The UPF 176a and UPF 176b may also provide the WTRUs 102a, 102b, and 102c with access to other types of packet data networks. For example, Other Networks 112 may be Ethernet Networks or any type of network that exchanges packets of data. The UPF 176a and UPF 176b may receive traffic steering rules from the SMF 174 via the N4 interface. The UPF 176a and UPF 176b may provide access to a packet data network by connecting a packet data network with an N6 interface or by connecting to each other and to other UPFs via an N9 interface. In addition to providing access to packet data networks, the UPF 176 may be responsible packet routing and forwarding, policy rule enforcement, quality of service handling for user plane traffic, downlink packet buffering.

The AMF 172 may also be connected to the N3IWF 199, for example, via an N2 interface. The N3IWF facilitates a connection between the WTRU 102c and the 5G core network 170, for example, via radio interface technologies that are not defined by 3GPP. The AMF may interact with the N3IWF 199 in the same, or similar, manner that it interacts with the RAN 105.

The PCF 184 may be connected to the SMF 174 via an N7 interface, connected to the AMF 172 via an N15 interface, and to an Application Function (AF) 188 via an N5 interface. The N15 and N5 interfaces are not shown in FIG. 1D. The PCF 184 may provide policy rules to control plane nodes such as the AMF 172 and SMF 174, allowing the control plane nodes to enforce these rules. The PCF 184 may send policies to the AMF 172 for the WTRUs 102a, 102b, and 102c so that the AMF may deliver the policies to the WTRUs 102a, 102b, and 102c via an N1 interface. Policies may then be enforced, or applied, at the WTRUs 102a, 102b, and 102c.

The UDR 178 may act as a repository for authentication credentials and subscription information. The UDR may connect to network functions, so that network function can add to, read from, and modify the data that is in the repository. For example, the UDR 178 may connect to the PCF 184 via an N36 interface. Similarly, the UDR 178 may connect to the NEF 196 via an N37 interface, and the UDR 178 may connect to the UDM 197 via an N35 interface.

The UDM 197 may serve as an interface between the UDR 178 and other network functions. The UDM 197 may authorize network functions to access of the UDR 178. For example, the UDM 197 may connect to the AMF 172 via an N8 interface, the UDM 197 may connect to the SMF 174 via an N10 interface. Similarly, the UDM 197 may connect to the AUSF 190 via an N13 interface. The UDR 178 and UDM 197 may be tightly integrated.

The AUSF 190 performs authentication related operations and connects to the UDM 178 via an N13 interface and to the AMF 172 via an N12 interface.

The NEF 196 exposes capabilities and services in the 5G core network 109 to Application Functions (AF) 188. Exposure may occur on the N33 API interface. The NEF may connect to an AF 188 via an N33 interface and it may connect to other network functions in order to expose the capabilities and services of the 5G core network 109.

Application Functions 188 may interact with network functions in the 5G Core Network 109. Interaction between the Application Functions 188 and network functions may be via a direct interface or may occur via the NEF 196. The Application Functions 188 may be considered part of the 5G Core Network 109 or may be external to the 5G Core Network 109 and deployed by enterprises that have a business relationship with the mobile network operator.

Network Slicing is a mechanism that could be used by mobile network operators to support one or more 'virtual' core networks behind the operator's air interface. This involves 'slicing' the core network into one or more virtual networks to support different RANs or different service types running across a single RAN. Network slicing enables the operator to create networks customized to provide optimized solutions for different market scenarios which demands diverse requirements, e.g. in the areas of functionality, performance and isolation.

3GPP has designed the 5G core network to support Network Slicing. Network Slicing is a good tool that network operators can use to support the diverse set of 5G use cases (e.g., massive IoT, critical communications, V2X, and enhanced mobile broadband) which demand very diverse and sometimes extreme requirements. Without the use of network slicing techniques, it is likely that the network architecture would not be flexible and scalable enough to efficiently support a wider range of use cases need when each use case has its own specific set of performance, scalability, and availability requirements. Furthermore, introduction of new network services should be made more efficient.

Referring again to FIG. 1D, in a network slicing scenario, a WTRU 102a, 102b, or 102c may connect to an AMF 172, via an N1 interface. The AMF may be logically part of one or more slices. The AMF may coordinate the connection or communication of WTRU 102a, 102b, or 102c with one or more UPF 176a and 176b, SMF 174, and other network functions. Each of the UPFs 176a and 176b, SMF 174, and other network functions may be part of the same slice or different slices. When they are part of different slices, they may be isolated from each other in the sense that they may utilize different computing resources, security credentials, etc.

The core network 109 may facilitate communications with other networks. For example, the core network 109 may include, or may communicate with, an IP gateway, such as an IP Multimedia Subsystem (IMS) server, that serves as an interface between the 5G core network 109 and a PSTN 108. For example, the core network 109 may include, or communicate with a short message service (SMS) service center that facilities communication via the short message service. For example, the 5G core network 109 may facilitate the exchange of non-IP data packets between the WTRUs 102a, 102b, and 102c and servers or applications functions 188. In addition, the core network 170 may provide the WTRUs 102a, 102b, and 102c with access to the networks 112, which may include other wired or wireless networks that are owned and/or operated by other service providers.

The core network entities described herein and illustrated in FIGS. 1A, 1C, 1D, and 1E are identified by the names given to those entities in certain existing 3GPP specifications, but it is understood that in the future those entities and functionalities may be identified by other names and certain entities or functions may be combined in future specifications published by 3GPP, including future 3GPP NR specifications. Thus, the particular network entities and functionalities described and illustrated in FIGS. 1A, 1B, 1C, 1D, and 1E are provided by way of example only, and it is understood that the subject matter disclosed and claimed herein may be embodied or implemented in any similar communication system, whether presently defined or defined in the future.

Figure 1E:
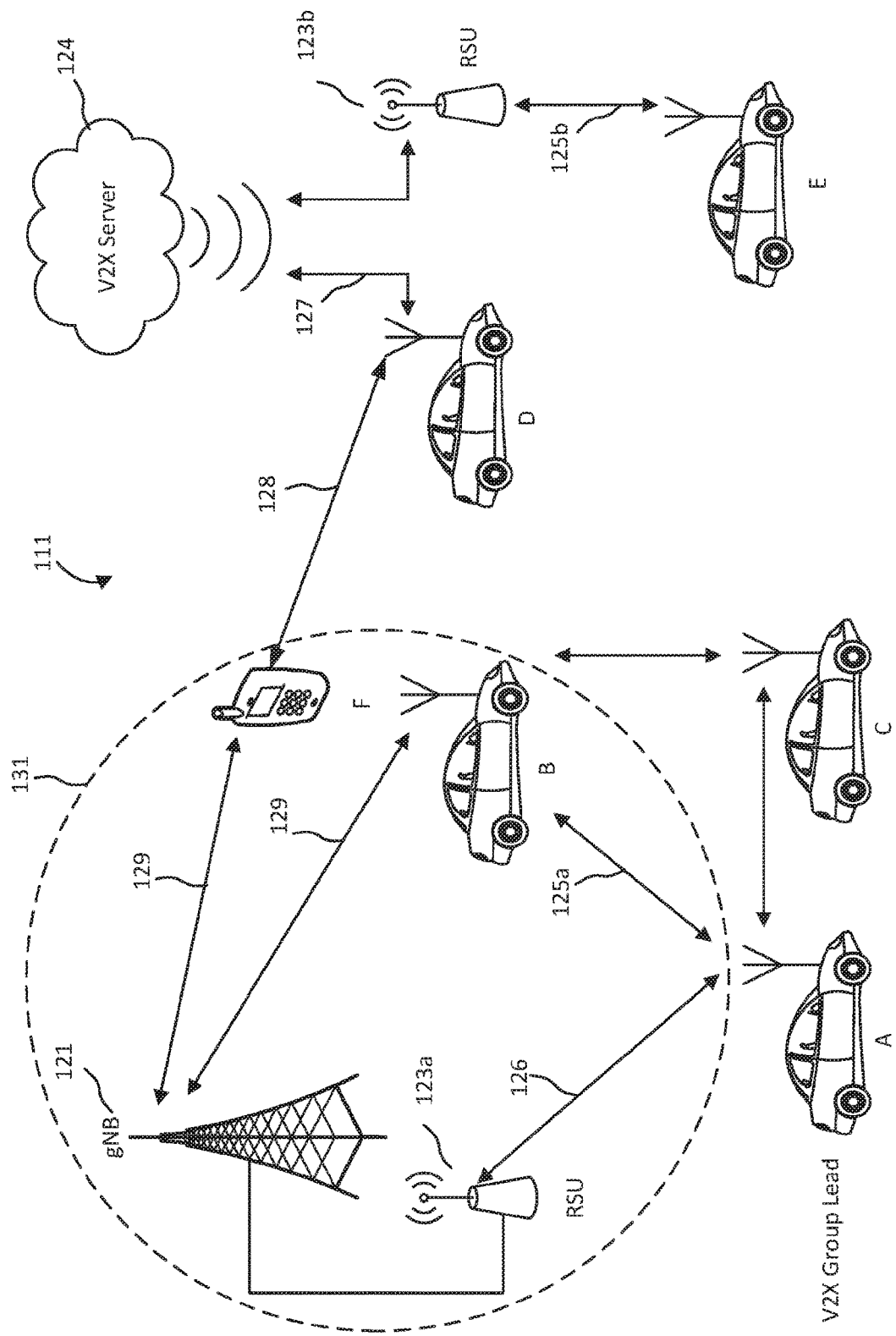
FIG. 1E illustrates another example communications system.

FIG. 1E illustrates an example communications system 111 in which the systems, methods, apparatuses described herein may be used. Communications system 111 may include Wireless Transmit/Receive Units (WTRUs) A, B, C, D, E, F, a base station gNB 121, a V2X server 124, and Road Side Units (RSUs) 123a and 123b. In practice, the concepts presented herein may be applied to any number of WTRUs, base station gNBs, V2X networks, and/or other network elements. One or several or all WTRUs A, B, C, D, E, and F may be out of range of the access network coverage 131. WTRUs A, B, and C form a V2X group, among which WTRU A is the group lead and WTRUs B and C are group members.

WTRUS A, B, C, D, E, and F may communicate with each other over a Uu interface 129 via the gNB 121 if they are within the access network coverage 131. In the example of FIG. 1E, WTRUs B and F are shown within access network coverage 131. WTRUs A, B, C, D, E, and F may communicate with each other directly via a Sidelink interface (e.g., PC5 or NR PC5) such as interface 125a, 125b, or 128, whether they are under the access network coverage 131 or out of the access network coverage 131. For instance, in the example of FIG. 1E, WRTU D, which is outside of the access network coverage 131, communicates with WTRU F, which is inside the coverage 131.

WTRUS A, B, C, D, E, and F may communicate with RSU 123a or 123b via a Vehicle-to-Network (V2N) 133 or Sidelink interface 125b. WTRUs A, B, C, D, E, and F may communicate to a V2X Server 124 via a Vehicle-to-Infrastructure (V2I) interface 127. WTRUs A, B, C, D, E, and F may communicate to another UE via a Vehicle-to-Person (V2P) interface 128.

Figure 1F:
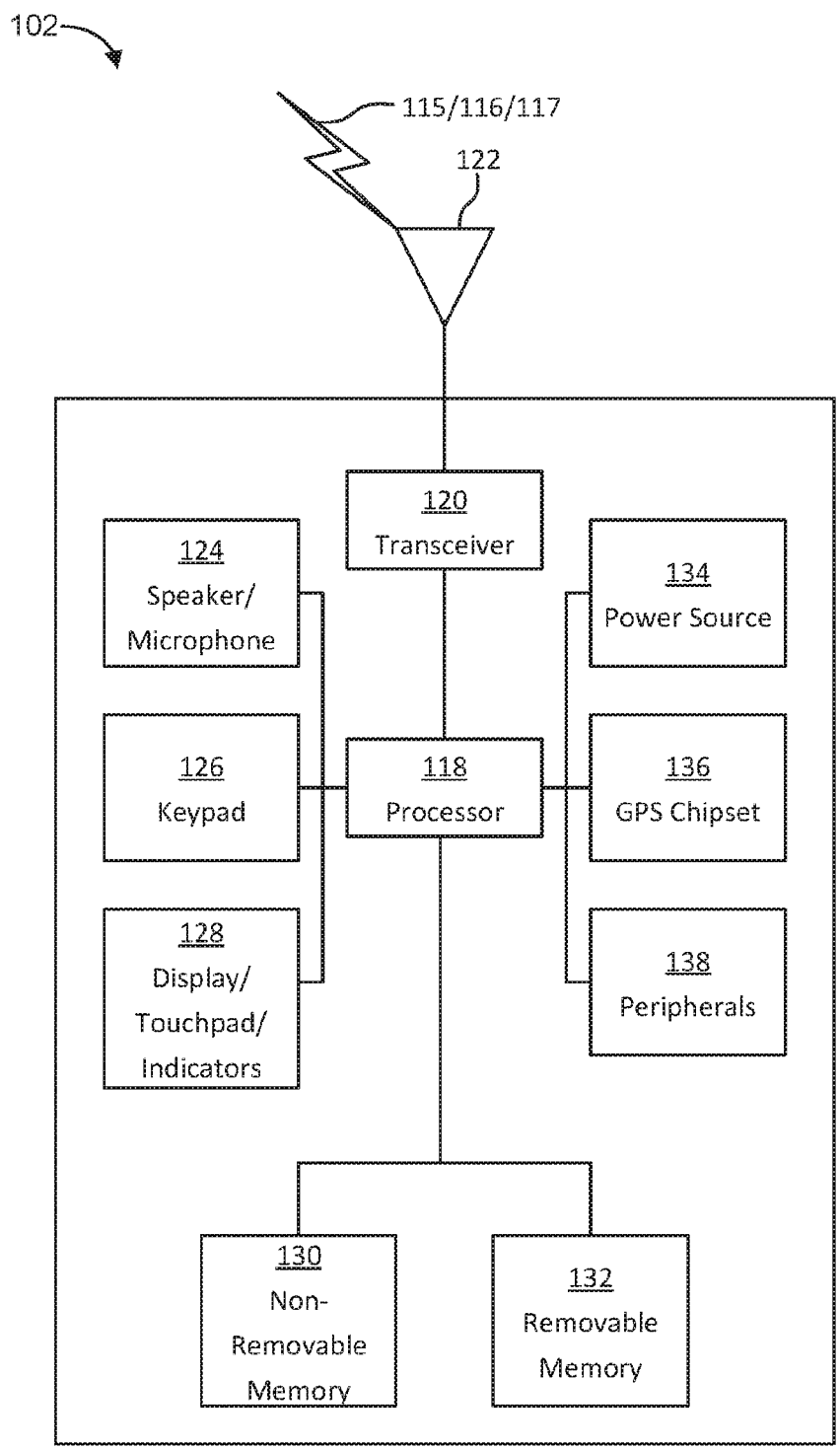
FIG. 1F is a block diagram of an example apparatus or device, such as a WTRU.

FIG. 1F is a block diagram of an example apparatus or device WTRU 102 that may be configured for wireless communications and operations in accordance with the systems, methods, and apparatuses described herein, such as a WTRU 102 of FIG. 1A, 1B, 1C, 1D, or 1E. As shown in FIG. 1F, the example WTRU 102 may include a processor 118, a transceiver 120, a transmit/receive element 122, a speaker/microphone 124, a keypad 126, a display/touchpad/indicators 128, non-removable memory 130, removable memory 132, a power source 134, a global positioning system (GPS) chipset 136, and other peripherals 138. It will be appreciated that the WTRU 102 may include any sub-combination of the foregoing elements. Also, the base stations 114a and 114b, and/or the nodes that base stations 114a and 114b may represent, such as but not limited to transceiver station (BTS), a Node-B, a site controller, an access point (AP), a home node-B, an evolved home node-B (eNodeB), a home evolved node-B (HeNB), a home evolved node-B gateway, a next generation node-B (gNode-B), and proxy nodes, among others, may include some or all of the elements depicted in FIG. 1F and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1F depicts the processor 118 and the transceiver 120 as separate components, it will be appreciated that the processor 118 and the transceiver 120 may be integrated together in an electronic package or chip.

The transmit/receive element 122 of a UE may be configured to transmit signals to, or receive signals from, a base station (e.g., the base station 114a of FIG. 1A) over the air interface 115/116/117 or another UE over the air interface 115d/116d/117d. For example, the transmit/receive element 122 may be an antenna configured to transmit and/or receive RF signals. The transmit/receive element 122 may be an emitter/detector configured to transmit and/or receive IR, UV, or visible light signals, for example. The transmit/receive element 122 may be configured to transmit and receive both RF and light signals. It will be appreciated that the transmit/receive element 122 may be configured to transmit and/or receive any combination of wireless or wired signals.

In addition, although the transmit/receive element 122 is depicted in FIG. 1F as a single element, the WTRU 102 may include any number of transmit/receive elements 122. More specifically, the WTRU 102 may employ MIMO technology. Thus, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, for example NR and IEEE 802.11 or NR and E-UTRA, or to communicate with the same RAT via multiple beams to different RRHs, TRPs, RSUs, or nodes.

The processor 118 of the WTRU 102 may be coupled to, and may receive user input data from, the speaker/microphone 124, the keypad 126, and/or the display/touchpad/indicators 128 (e.g., a liquid crystal display (LCD) display unit or organic light-emitting diode (OLED) display unit. The processor 118 may also output user data to the speaker/microphone 124, the keypad 126, and/or the display/touchpad/indicators 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. The processor 118 may access information from, and store data in, memory that is not physically located on the WTRU 102, such as on a server that is hosted in the cloud or in an edge computing platform or in a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries, solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114a, 114b) and/or determine its location based on the timing of the signals being received from two or more nearby base stations. It will be appreciated that the WTRU 102 may acquire location information by way of any suitable location-determination method.

The processor 118 may further be coupled to other peripherals 138, which may include one or more software and/or hardware modules that provide additional features, functionality, and/or wired or wireless connectivity. For example, the peripherals 138 may include various sensors such as an accelerometer, biometrics (e.g., finger print) sensors, an e-compass, a satellite transceiver, a digital camera (for photographs or video), a universal serial bus (USB) port or other interconnect interfaces, a vibration device, a television transceiver, a hands free headset, a Bluetooth® module, a frequency modulated (FM) radio unit, a digital music player, a media player, a video game player module, an Internet browser, and the like.

The WTRU 102 may be included in other apparatuses or devices, such as a sensor, consumer electronics, a wearable device such as a smart watch or smart clothing, a medical or eHealth device, a robot, industrial equipment, a drone, a vehicle such as a car, truck, train, or an airplane. The WTRU 102 may connect to other components, modules, or systems of such apparatuses or devices via one or more interconnect interfaces, such as an interconnect interface that may comprise one of the peripherals 138.

Figure 1G:
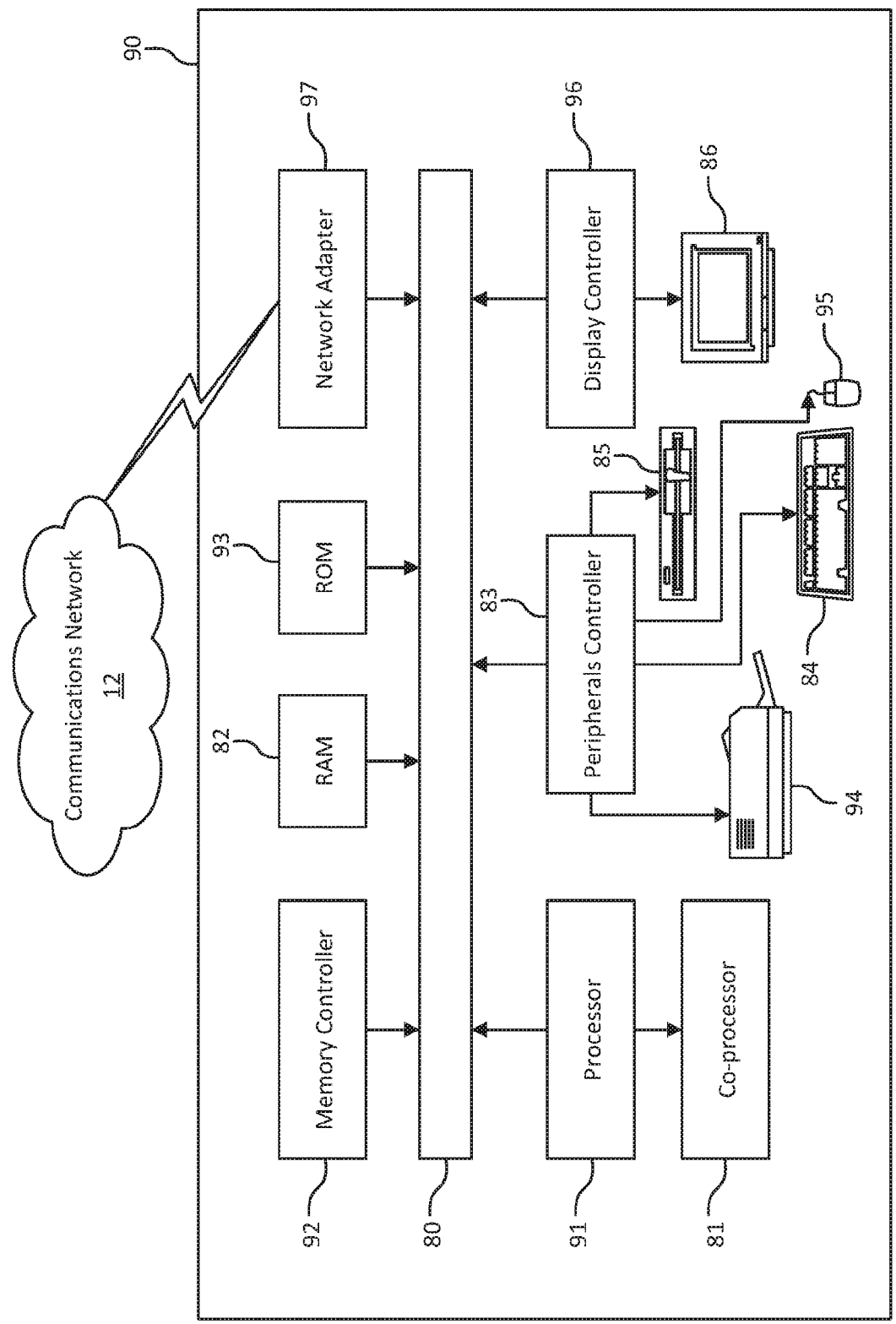
FIG. 1G is a block diagram of an exemplary computing system.

FIG. 1G is a block diagram of an exemplary computing system 90 in which one or more apparatuses of the communications networks illustrated in FIGS. 1A, 1C, 1D and 1E may be embodied, such as certain nodes or functional entities in the RAN 103/104/105, Core Network 106/107/109, PSTN 108, Internet 110, Other Networks 112, or Network Services 113. Computing system 90 may comprise a computer or server and may be controlled primarily by computer readable instructions, which may be in the form of software, wherever, or by whatever means such software is stored or accessed. Such computer readable instructions may be executed within a processor 91, to cause computing system 90 to do work. The processor 91 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 91 may perform signal coding, data processing, power control, input/output processing, and/or any other functionality that enables the computing system 90 to operate in a communications network. Coprocessor 81 is an optional processor, distinct from main processor 91, that may perform additional functions or assist processor 91. Processor 91 and/or coprocessor 81 may receive, generate, and process data related to the methods and apparatuses disclosed herein.

In operation, processor 91 fetches, decodes, and executes instructions, and transfers information to and from other resources via the computing system's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memories coupled to system bus 80 include random access memory (RAM) 82 and read only memory (ROM) 93. Such memories include circuitry that allows information to be stored and retrieved. ROMs 93 generally contain stored data that cannot easily be modified. Data stored in RAM 82 may be read or changed by processor 91 or other hardware devices. Access to RAM 82 and/or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode may access only memory mapped by its own process virtual address space; it cannot access memory within another process's virtual address space unless memory sharing between the processes has been set up.

In addition, computing system 90 may contain peripherals controller 83 responsible for communicating instructions from processor 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. The visual output may be provided in the form of a graphical user interface (GUI). Display 86 may be implemented with a CRT-based video display, an LCD-based flat-panel display, gas plasma-based flat-panel display, or a touch-panel. Display controller 96 includes electronic components required to generate a video signal that is sent to display 86.

Further, computing system 90 may contain communication circuitry, such as for example a wireless or wired network adapter 97, that may be used to connect computing system 90 to an external communications network or devices, such as the RAN 103/104/105, Core Network 106/107/109, PSTN 108, Internet 110, WTRUs 102, or Other Networks 112 of FIGS. 1A, 1B, 1C, 1D, and 1E, to enable the computing system 90 to communicate with other nodes or functional entities of those networks. The communication circuitry, alone or in combination with the processor 91, may be used to perform the transmitting and receiving steps of certain apparatuses, nodes, or functional entities described herein.

It is understood that any or all of the apparatuses, systems, methods and processes described herein may be embodied in the form of computer executable instructions (e.g., program code) stored on a computer-readable storage medium which instructions, when executed by a processor, such as processors 118 or 91, cause the processor to perform and/or implement the systems, methods and processes described herein. Specifically, any of the steps, operations, or functions described herein may be implemented in the form of such computer executable instructions, executing on the processor of an apparatus or computing system configured for wireless and/or wired network communications. Computer readable storage media includes volatile and nonvolatile, removable and non-removable media implemented in any non-transitory (e.g., tangible or physical) method or technology for storage of information, but such computer readable storage media do not include signals. Computer readable storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible or physical medium which may be used to store the desired information and which may be accessed by a computing system.

BRIEF INTRODUCTION

In Release 14 of LTE V2X, basic requirements for V2X service have been supported for road safety service (e.g., to support low latency and reliable exchange of messages among vehicles and the infrastructure to enhance safety and efficiency) to enhance the system level performance under high density while meeting the latency requirements of Vehicle-to-Vehicle (V2V). Two configurations of resource pools are specified for scheduling assignments on Physical Sidelink Control Channel (PSCCH) and associated Data transmissions on Physical Sidelink Shared Channel (PSSCH) (see 3GPP TS 36.213 Physical layer procedures, Release 15, V15.2.0).

To satisfy the latency requirements and to accommodate high Doppler spreads and high density of vehicles for V2X communications, Sidelink transmission modes 3 and mode 4 have been specified in TS36.213.

Mode 4 uses a new PC5 interface, which offers direct LTE Sidelink (SL) between two vehicular UEs. Mode 4 employs distributed UE scheduling based on sensing with semi-persistent transmission. V2V traffic from a device is mostly periodic small data in nature, which is utilized to sense congestion on a resource and estimate future congestion on that resource. Based on the estimation, resources are reserved.

On the other hand, Mode 3 uses the centralized eNB scheduler. The vehicular UE and eNB use the Uu interface to schedule the communications on Sidelink, e.g., PC5 interface.

Figure 2:
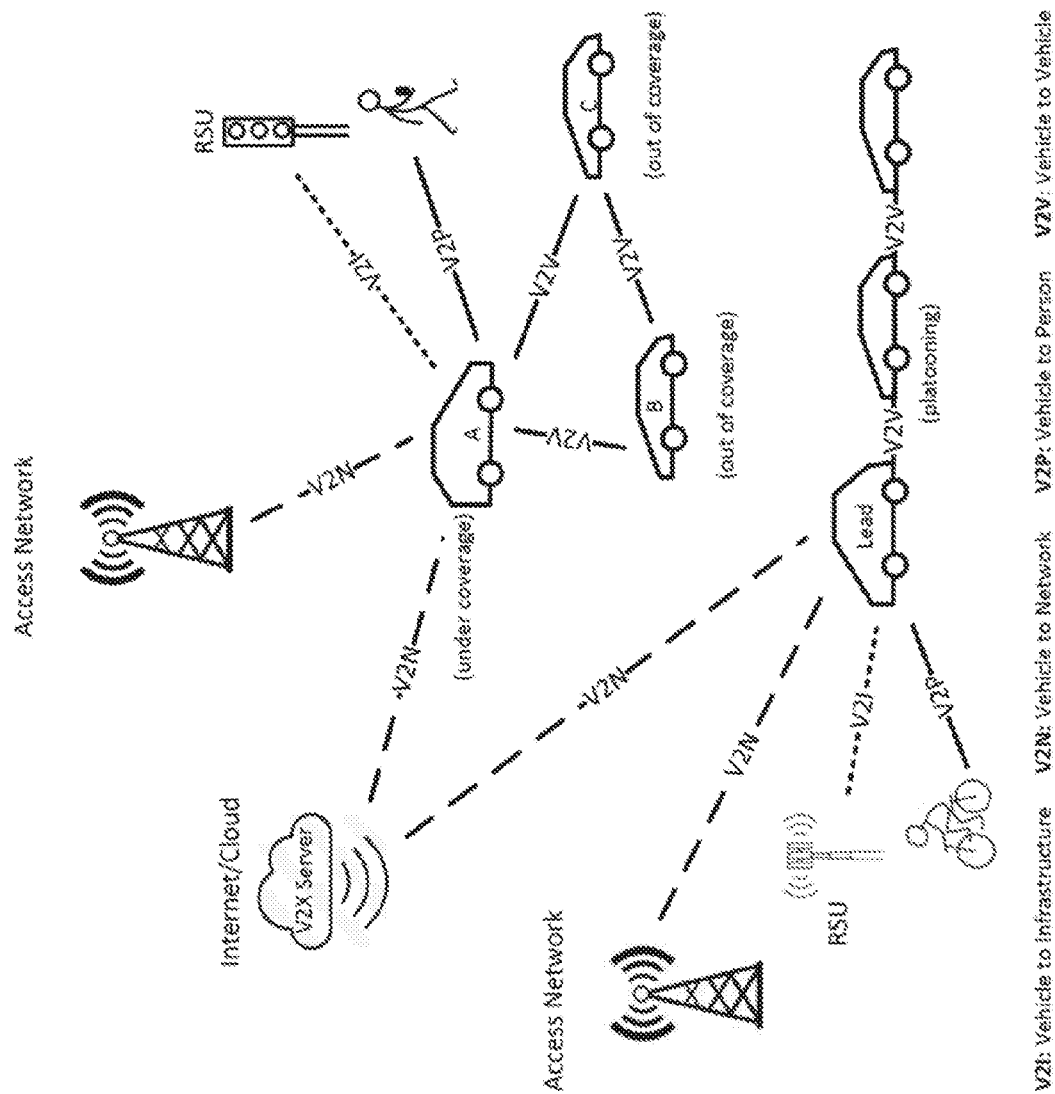
FIG. 2 shows an example block diagram of Advanced V2X services.

As shown in FIG. 2, the advanced V2X applications have created a shift towards more proactive and intelligent transport infrastructure, and the expected requirements are made more stringent to meet the needed data rate, latency, reliability, system capacity, service coverage, etc. The current LTE V2X solutions cannot deliver the required latency and reliability, as well as the required data rate. Therefore, how to optimize the resource structure and how to allocate the resources to support the advanced V2X services are essential problems to be addressed and solved.

Methods and systems are disclosed for resource management on Sidelink for vehicle to everything (V2X) scenarios.

Methods and systems for a Resource Structure on Sidelink are disclosed. Control and data channels are Frequency Division Multiplexed (FDMed) or Time Division Multiplexed (TDMed) with Orthogonal Frequency Division Multiplexing (OFDM) waveform. Symbol or Mini-slot based resource pool in time are also disclosed.

Methods and systems for a Resource Configuration on Sidelink are disclosed. The resource configuration may be statically configured in a V2X system via System Information (SI) or Radio Resource Control (RRC) messages through Uu interface or Sidelink SI (SL-SI) or Sidelink RRC (SL-RRC) through PC5 interface, for example: a configuration per vehicle UE's Level of Automation, a configuration per vehicle UE's role in a group, a configuration per service or application and associated priority, and a configuration per data traffic characteristics. The resource configuration may be locally configured via SL-SI or SL-RRC messages through PC5 interface, for example: a configuration by a special UE such as a group lead, a Roadside Unit (RSU) or a scheduling UE.

Methods and systems for Assisted Resource Allocation are disclosed. Assisted Sensing may be performed by a group lead or an RSU or a UE. Locally scheduling may be performed by a group lead or an RSU or a UE.

Methods and systems for a scheduler selection or election and modification scheme for both under the network control and out of the network control are disclosed.

Methods and systems for resource allocation mode switching scheme for both under the network control and out of network control are disclosed.

Methods and systems for slot or subframe structures with control and data channel resource allocations for different communications are disclosed. Both slot based and mini-slot based are proposed.

Methods and systems for a sensing scheme for both periodic and aperiodic data transmissions are disclosed. The sensing is performed with an adjustable sensing window and candidate resources are selected based on the sensing results. Channel sensing such as Listen-before-Talk (LBT) is conducted before transmitting on the selected resources to avoid possible collisions. For high priority short latency data transmissions, pre-emption is proposed to override the reserved resources.

Method and systems for a sensing based resource selection scheme are disclosed. The resource selection is based on priority, latency, range, and/or congestion.

Method and systems for congestion control based transmission scheme are disclosed. The transmission dropping is based on priority, latency, range, and/or congestion.

Note: the term "UE" and "vehicle UE" are interchangeable in this disclosure.

An example method may comprise receiving a configuration associated with at least one of a resource and a resource pool, wherein the resource and the resource pool are located in a sidelink bandwidth part; determining a resource usage and one or more available resources in the resource pool; receiving an indication from a higher layer that a data packet is ready for transmission; selecting and reserving one or more resources in the resource pool for one or more transmissions; and sending one or more transmissions of the data packet based on the selected one or more resources.

Determining the resource usage and the one or more available resources in the resource pool may comprise setting a time interval for a sensing window, wherein the time interval for the sensing window is set based on at least one of: a periodic or an aperiodic transmission; a latency requirement for the data packet; a repetition for transmitting the data packet; and a retransmission of the data packet per Hybrid Automatic Repeat Request (HARQ) feedback.

Determining the resource usage and the one or more available resources in the resource pool may comprise at least one of: sensing a resource usage by decoding a sidelink control information (SCI) for scheduled or reserved or pre-empted resources; measuring at least one of a sidelink reference signal received power (SL-RSRP), a sidelink received signal strength indicator (SL-RSSI), a channel busy ratio, or a channel occupancy ratio; and determining an available resource based on: a resource that is not scheduled, not reserved, and not pre-empted, a resource that is in a communication range zone, or a determination that at least one of an SL-RSRP measurement of the resource or an SL-RSSI measurement of the resource is below a threshold.

Selecting and reserving the one or more resources in the resource pool may comprise determining a time interval for a resource selection, wherein the time interval for the resource selection is determined based on at least one of: one or more of a priority, a latency, or a reliability of the data packet to be transmitted; and one or more of a repetition or a retransmission per HARQ feedback.

Selecting and reserving the one or more resources in the resource pool may comprise selecting one or more candidate resources by comparing the measured SL-RSRP or RS-RSSI to a threshold, wherein the threshold is based on at least one of a priority, a latency, a communication range, a QoS requirement of the data packet to be transmitted, or an interference measurement or a congestion measurement of the available resources.

Selecting and reserving the one or more resources in the resource pool may comprise at least one of: selecting one or more resources based on at least one of a priority, a latency, a reliability, or a communication range of the data packet to be transmitted, or the measurement of interference or congestion; and selecting one or more resources for at least one of scheduling or reserving SCI, initial transmission, repetitions, HARQ feedback, retransmissions per HARQ feedback, or a next data packet of a periodic traffic.

Sending one or more transmissions of the data packet may comprise: determining, based on a congestion level or at least one of a priority, a latency, a reliability, or a range of the data packet to be transmitted, whether a congestion threshold has been exceeded; and based on determining that the congestion threshold has not been exceeded: sending the one or more transmissions of the data packet; and based on determining that the congestion threshold has been exceeded, performing at least one of: dropping the transmission based at least on the congestion level or at least one of a priority, a latency, a reliability, or a range of the data packet to be transmitted; or adjusting a modulation and coding scheme or a transmit power level based on the congestion level or at least one of a priority, a latency, a reliability, or a range of the data packet to be transmitted; and sending at least one of an initial transmission, a repetition, or a retransmission of the data packet.

Resource Structure

In order to support the advanced V2X services and use cases, data communications on Sidelink are not limited to small periodic transmissions any more. A much more scalable and flexible resource structure may be needed to support both small and big data, which may be periodic or aperiodic (e.g., event triggered). The adoption of multi-carrier OFDM waveform for 5G uplink transmission enables more flexible resource structures with OFDM based multiplexing on Sidelink. For example, New Radio Physical Sidelink Control Channel (NR-PSCCH) for scheduling assignment may be Time Division Multiplexed (TDMed) or Frequency Division Multiplexed (FDMed) with New Radio Physical Sidelink Control Channel (NR-PSSCH) for data transmission.

For highly autonomous vehicles, supporting much higher reliability, shorter latency and higher vehicle density is very crucial. This requires an optimized resource structure to reduce latency, improve reliability and minimize congestions. With the increasing operation bandwidth at high frequency spectrum, time resources may be allocated with finer granularity, (e.g., in symbols or mini-slot) with different numerologies (e.g. 15 KHz, 30 KHz, 60 KHz, 120 KHz and 240 KHz subcarrier spacing). This may help to reduce latency and congestions, as well as improving the reliability (e.g., available time resources for repetition).

With multi-carrier OFDM, Sidelink resources may be structured differently for meeting the requirements for latency, reliability, data rate, coverage, etc.

Figure 3:
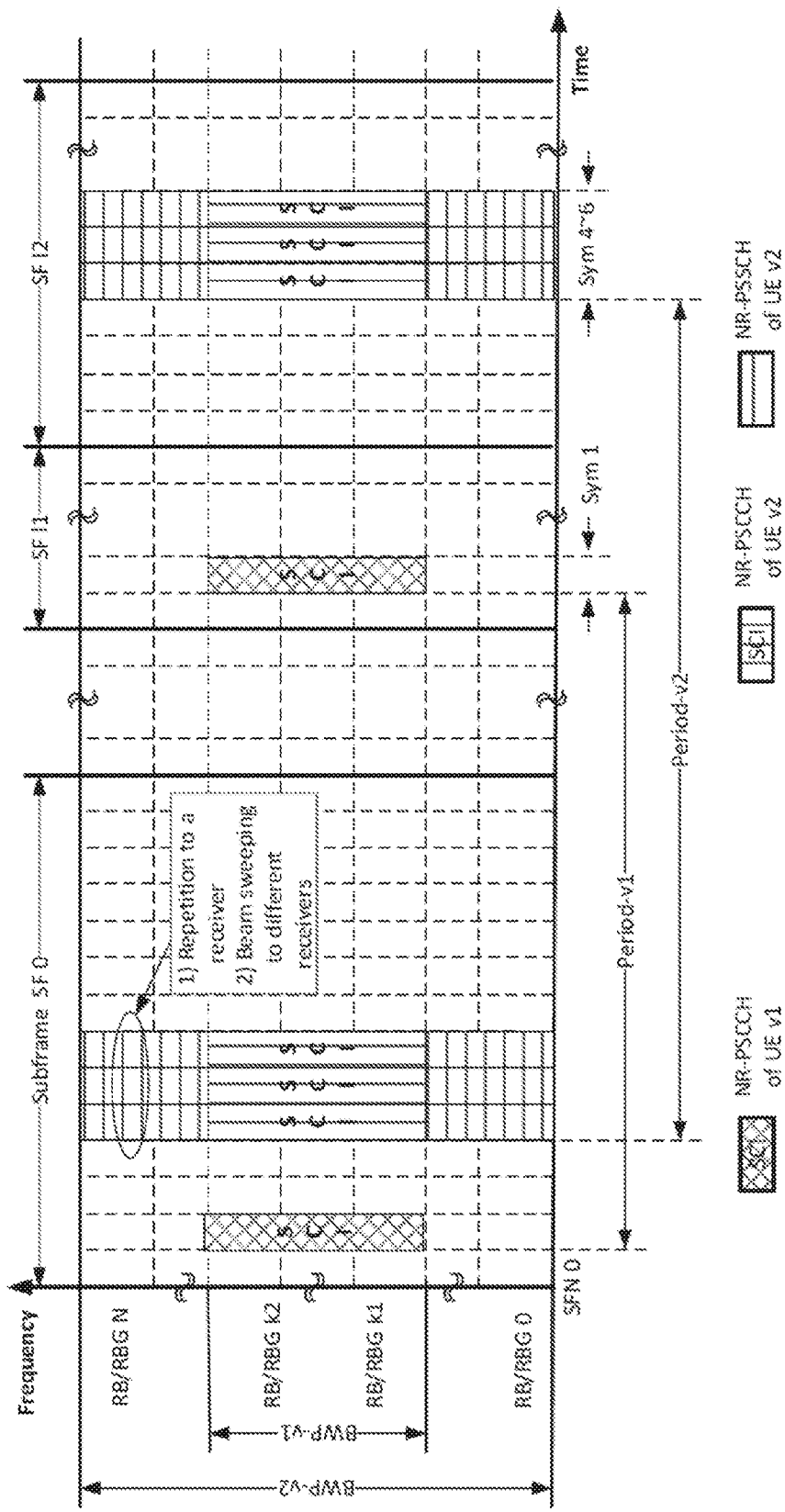
FIG. 3 shows an example one-symbol resource structure on Sidelink.

As shown in FIG. 3, the resource on Sidelink may be structured as short as one symbol in time domain (e.g., symbol pool) and many Resource Blocks (RBs) or Resource Block Groups (RBGs) (e.g., a group of contiguous RBs) or Subchannels (e.g., a group of contiguous RBs or RBGs) available in frequency (e.g., RB pool or RBG pool or Subchannel pool). This allows very low latency transmissions message with a short control signaling on NR-PSCCH, e.g., Sidelink Control Information (SCI) shown in the figure, and data on New Radio Physical Sidelink Shared Channel (NR-PSSCH) FDMed over the same symbol(s), either periodically or aperiodically (e.g., an event triggered transmission).

Since each vehicle UE may take a very short time for a transmission, more time resources are available for other vehicle UEs in each slot, subframe, or frame which improves the coverage at high density area such as road intersections, multi-lane highway, or multi-layer bridge, etc.

Since each vehicle UE may take a very short time for a transmission, more time resources are available for transmitting repetitions to a receiver in each slot, subframe, or frame which improves the reliability with very short latency.

Since each vehicle UE may take a very short time for transmissions, more time resources are available for a vehicle UE to sweep its beam to different receivers for area coverage in each slot, subframe, or frame which enables the beam based operations at very high frequency spectrum up to 52.6 GHz.

For example, UE-v1 sends a short control signaling, e.g., SCI, on NR-PSCCH on symbol 1 "Sym 1" of subframe "SF 0" and "SF 11" respectively with period "Period-v1", from RB k1 to RB k2 or RBG k1 to RBG k2 or Subchannel k1 to Subchannel k2 if more RBs are used in its Band Width Part (BWP) "BWP-v1".

In another example, UE-v2 sends a short message with control, e.g., SCI, on NR-PSCCH and data on NR-PSSCH FDMed on same symbol(s), e.g., symbol 4 "Sym 4", and repeats the same transmission on symbol 5 and 6 of subframe "SF 0" and "SF 12" respectively with period "Period-v2". The transmissions may be sent to the same receiver (e.g., repetition for reliability) or to different receivers each time (e.g., beam sweeping for area coverage). Since UE-v2 sends FDMed control on NR-PSCCH and data on NR-PSSCH over one symbol as shown in FIG. 3, its BWP "BWP-v2" is much larger than UE-v1's BWP, e.g., in the range of BR 0~RB N or RBG 0~RBG N or Subchannel 0~N if more RBs are used in its BWP "BWP-v2" as shown FIG. 3.

When NR-PSCCH and NR-PSSCH are FDMed over the same symbols, the PSCCH carrying SCI, may be allocated at different locations in frequency, for example, may be located at the lowest or highest index of the RB, RBG or subchannel, or at the middle of the frequency band, e.g., the bandwidth part (BWP) on sidelink, as shown in FIG. 3.

As further shown in FIG. 3, the NR-PSCCH carrying SCI is allocated with contiguous RBs, RBGs or Subchannels. However, the NR-PSCCH may also be distributed within the vehicle UE's entire sidelink BWP, e.g. allocated with non-contiguous RBs, RBGs, or Subchannels for frequency diversity gain.

Figure 4:
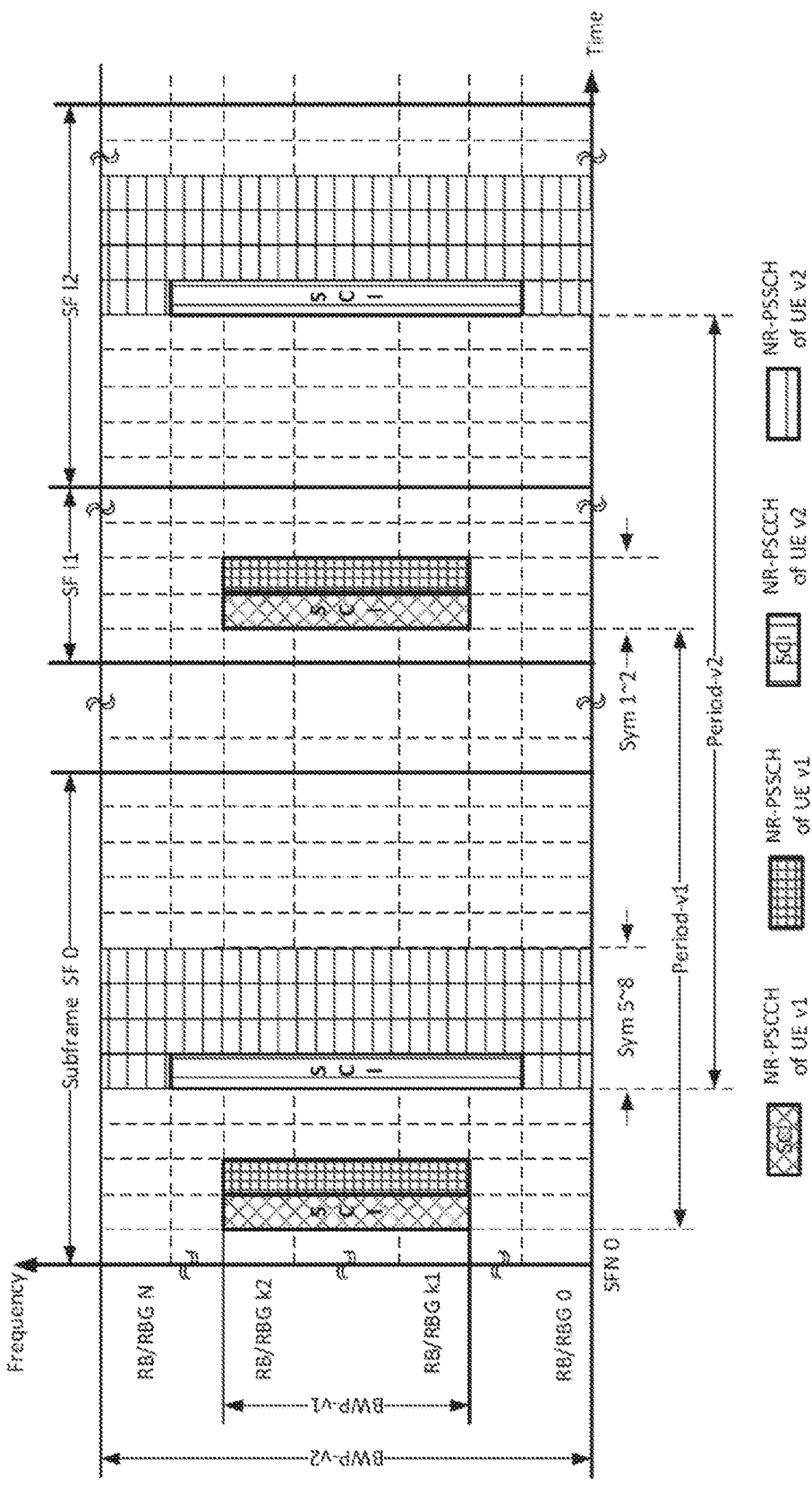
FIG. 4 shows an example two and four-symbol resource structure on Sidelink.

As illustrated in FIG. 4, the resource on Sidelink may be structured with more than one symbol in time (e.g., symbol pool) and many RBs, RBGs or Subchannels available in frequency (e.g., RB pool, RBG pool or Subchannel pool). This allows very low latency transmissions for a medium or large size message, either periodically or aperiodically.

In one example, UE-v1 sends a short message with control, e.g., SCI, on NR-PSCCH on symbol 1 "Sym 1" and data on NR-PSSCH at symbol 2 "Sym 2" of subframe "SF 0" and "SF 11" respectively with period "Period-v1", from RB k1 to RB k2 or RBG k1 to RBG k2 or Subchannel k/to Subchannel k2 if more RBs are used in its BWP "BWP-v1". In this case, the control on NR-PSCCH and data on NR-PSSCH are TDMed over the same RBs or RBGs or Subchannel.

In another example, UE-v2 sends a large message with control, e.g., SCI, on NR-PSCCH and data on NR-PSSCH FDMed on symbol 5 "Sym 5" and the rest data on NR-PSSCH on symbol 6 and 7 of subframe "SF 0" and "SF 12" respectively with period "Period-v2". Since UE-v2 sends a large message over only 4 symbols, its BWP "BWP-v2" is much larger than UE-v1's BWP, in the range of BR 0~RB N or RBG 0~RBG N or Subchannel 0~Subchannel N if more RBs are used in its BWP "BWP-v2" as shown in the figure.

When NR-PSCCH and NR-PSSCH are TDMed as shown in FIG. 4, the PSCCH carrying SCI may be allocated over same or different locations in frequency. For example, may be located at the same frequency range, e.g. with BWP-v1, or at different frequency range, e.g. within BWP-v2, as shown in FIG. 3, or even over different frequency locations without any overlapping (not shown in FIG. 4).

As further shown in FIG. 4, the NR-PSCCH is allocated with contiguous RBs, RBGs or Subchannels. However, the NR-PSCCH may also be distributed within the vehicle UE's entire BWP on the first symbol (e.g., allocated with non-contiguous RBs, RBGs, or Subchannels) or distributed within the vehicle UE's BWP over the first two symbols as an example, using frequency first (e.g., first filling in the frequency resources on first symbol and then the second symbol) or time first mapping (e.g., first filling in the time resources on first RB, RBG or Subchannel and then the second RB, RBG or Subchannel).

Figure 5:
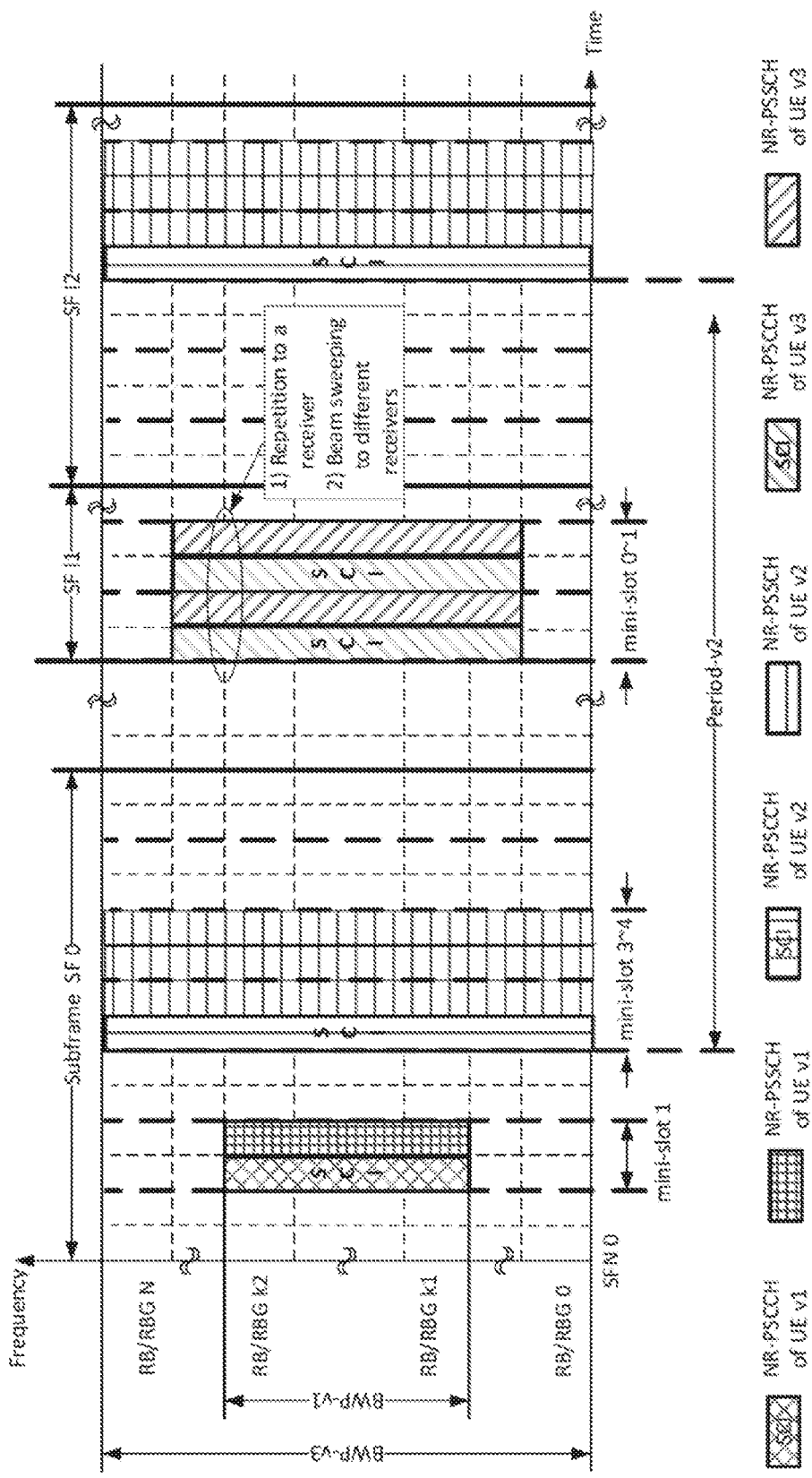
FIG. 5 shows an example two-symbol mini-slot resource structure on Sidelink.

The resource on Sidelink may additionally or alternatively be structured in time with a mini-slot (e.g., a time duration with contiguous symbols). For a 14-symbol slot or subframe (e.g., 15 KHz subcarrier numerology where each subframe contains one slot, therefore, slot and subframe are interchangeable in the examples), a mini-slot may contain 1, 2, 4, or 7 symbols contiguously as an example. As illustrated in FIG. 5, a two-symbol mini-slot is used for the Sidelink resource structure in time (e.g., mini-slot pool) and many RBs or RBGs or Subchannel available in frequency band (e.g., RB pool, RBG pool or Subchannel pool). This allows larger granularity than symbol based allocation but finer granularity than subframe based allocation in time, which may save signaling bits for large data transmissions within a short time. Mini-slot based time allocation may be applied to both periodic and aperiodic (e.g., event triggered) transmissions.

In one example, UE-v1 sends a short message with control, e.g., SCI, on NR-PSCCH and data on NR-PSSCH at mini-slot/of subframe "SF 0" and "SF 11", with its BWP "BWP-v1" from RB k1 to RB k2 or RBG k1 to RBG k2 or Subchannel k1 to Subchannel k2 if more RBs are used in its BWP "BWP-v1". In this case, the control on NR-PSCCH and data on NR-PSSCH are TDMed over the same RBs or RBGs or Subchannels within the two-symbol mini-slot.

In another example, UE-v2 sends a large message with control, e.g., SCI, on NR-PSCCH and data on NR-PSSCH TDMed within mini-slot 3 and 4 of subframe "SF 0" and "SF 12" respectively with period "Period-v2".

In another example, UE-v3 sends a medium message with control on NR-PSCCH and data on NR-PSSCH TDMed within mini-slot 0 and repeats the same transmission on mini-slot/of subframe "SF/I". The transmissions may be sent to the same receiver (e.g., repetition with min-slot) or to different receivers each time (e.g., beam sweeping with mini-slot).

As further shown in FIG. 5, the NR-PSCCH carrying SCI is allocated with contiguous RBs, RBGs or Subchannels. However, the NR-PSCCH may also be distributed within the vehicle UE's entire sidelink BWP on the first symbol of the first mini-slot (e.g., allocated with noncontiguous RBs, RBGs, or Subchannels), or distributed within the vehicle UE's sidelink BWP over the first two symbols of the first mini-slot, such as using frequency first (e.g., first filling in the frequency resources on first symbol and then the second symbol) or time first mapping (e.g., first filling in the time resources on first RB, RBG or Subchannel and then the second RB, RBG or Subchannel).

For resources in frequency (e.g., RB or RBG pool or Subchannel pool) a vehicle UE may select contiguous RBs, RBGs or Subchannel or non-contiguous RBs, RBGs or Subchannel. For contiguous RBs, RBGs or Subchannel, the resources may be indicated with a starting point and the length from the starting point with the unit of RB, RBG or Subchannel, for example $\{RB_{start}, RB_{length}\}$, or $\{RBG_{start}, RBG_{length}\}$ or $\{Subchannel_{start}, Subchannel_{length}\}$, or with a combination of RB, RBG and Subchannel. For non-contiguous RBs, RBGs or Subchannel, the resources may be indicated with $\{RB_{start1}, RB_{length1}, RB_{start2}, RB_{length2}, \ldots, RB_{startN}, RB_{lengthN}\}$, $\{RBG_{start1}, RBG_{length1}, RBG_{start2}, RBG_{length2}, \ldots, RBG_{startN}, RBG_{lengthN}\}$ or $\{Subchannel_{start1}, Subchannel_{length1}, Subchannel_{start2}, Subchannel_{length2}, \ldots, Subchannel_{startN}, Subchannel_{lengthN}\}$ where N>1 respectively, or with a combination of RB, RBG and Subchannel. For evenly distributed non-contiguous RBs or RBGs or Subchannels, the resources may be indicated with $\{RB_{start}, RB_{length}, RB_{gap}\}$ or $\{RBG_{start}, RBG_{length}, RBG_{gap}\}$ or $\{Subchannel_{start}, Subchannel_{length}, Subchannel_{gap}\}$ respectively, or with a combination of RB, RBG and Subchannel.

If bit map is used for the RB or RBG pool or Subchannel pool, a bit string may be mapped to the RBs, RBGs or Subchannel within an operation band for sidelink, e.g. sidelink BWP. For example, $\{b_{RB}, b_{RB-1}, \ldots, b_1, b_0\}$ is mapped with $b_{RB}$ to the first RB (e.g., RB0) and $b_0$ to the last RB (e.g., RB N). In another example, $\{b_{RBG}, b_{RBG-1}, \ldots, b_1, b_0\}$ is mapped with $b_{RBG}$ to the first RBG (e.g., RBG0) and $b_0$ to the last RBG (e.g., RBG N) or $\{b_{Subch}, $b_{Subch-1}, \ldots, b_1, b_0\}$ is mapped with $b_{Subch}$ to the first Subchannel (e.g., Subchannel 0) and $b_0$ to the last Subchannel (e.g., Subchannel N).

For resource in time (e.g., symbol or mini-slot pool) the starting symbol or starting mini-slot may be referenced from the system time reference point such as System Frame Number (SFN) or Direct Frame Number (DFN). For example, the symbol or mini-slot may be indexed as "SFN or DFN number+symbol number within the frame" or "SFN or DFN number+mini-slot number within the frame". The time duration or length may be in symbols, mini-slots, or slots or subframes. For non-contiguous time allocation, the resources may be indicated with $\{Symbol_{start1}$ $Symbol_{length1}, Symbol_{start2} Symbol_{length2}, \ldots, Symbol_{startN}$ $Symbol_{lengthN}\}$, $\{mini\text{-}slot_{start1}\ mini\text{-}slot_{length1},\ mini\text{-}slot_{start2}\ mini\text{-}slot_{length2}, \ldots, mini\text{-}slot_{startN}\ mini\text{-}slot_{lengthN}\}$, $\{slot_{start1},\ slot_{length1},\ slot_{start2}\ slot_{length2}, \ldots, slot_{startN}\ slot_{lengthN}\}$ or $\{Subframe_{start1}$ $Subframe_{length1}, Subframe_{start2}\ Subframe_{length2}, \ldots, Subframe_{startN}.\ Subframe_{lengthN}\}$ where N>1 respectively, or with a combination of symbol, mini-slot and slot or subframe. For evenly distributed non-contiguous Symbols or mini-slots or slot or Subframes, the resources may be indicated with $\{Symbol_{start}.\ Symbol_{length},\ Symbol_{gap}\}$ or $\{mini\text{-}slot_{start},\ mini\text{-}slot_{length},\ mini\text{-}slot_{gap}\}$ or $\{slot_{start},\ slot_{length},\ slot_{gap}\}$ or $\{subframe_{start},\ subframe_{length},\ Subframe_{gap}\}$ respectively, or with a combination of symbol, mini-slot, slot and subframe.

If bitmap is used for indicating the resource in symbols, it may be mapped to the symbols within a time interval. For example, $\{b_s, b_{s-1}, \ldots, b_1, b_0\}$ is mapped with $b_s$ to the first symbol and $b_0$ to the last symbol. A value of "1" indicates allocation on this symbol.

If bitmap is used for indicating the resource in mini-slots, it may be mapped to the mini-slots within a time interval. For example, $\{b_m, b_{m-1}, \ldots, b_1, b_0\}$ is mapped with $b_m$ to the first mini-slot and $b_0$ to the last mini-slot. A value of "1" indicates allocation on this mini-slot.

To save the mapping bits, a two-level mapping may be used. For example, $\{a_f, a_{f-1}, \ldots, a_1, a_0\}$ is mapped to SFN or DFN (e.g., $a_f$ to the first SFN or DFN and $a_0$ to the last SFN or DFN within the time interval, and $\{c_s, c_{s-1}, \ldots, c_1, c_0\}$ is mapped to the symbols within a frame, or $\{c_m, c_{m-1}, \ldots, c_1, c_0\}$ is mapped to the mini-slot or slot within a frame.

Sidelink resource or resource pool configuration or allocation in frequency and time may be configured with Radio Resource Control (RRC) message for each BWP for each cell carrier or cell, over Uu with network control (e.g. gNB or eNB managed) or with Sidelink RRC (SL-RRC) over sidelink (PC5) interface without network control (e.g. UE managed).

Sidelink resource or resource pool configuration or allocation may be broadcasted pieriodically using SI or shared or common RRC over Uu interface or SL-SI or shared or common SL-RRC message over sidelink (PC5) interface. Sidelink resource or resource pool configuration or allocation may also be specifically sent to a UE pieriodically or aperiodically, which may be per a UE's request, using dedicated RRC message over Uu interface or dedicated SL-RRC message over sidelink (PC5) interface.

For RRC over Uu interface, Control Resource Set (CORESET) carried on Physical Downlink Control Channel (PDCCH) is configured at Common Search Space (CSS) or UE Search Space (USS) by RRC for common or UE specific RRC message respectively. DCI on CORESET in CSS or USS addresses the location of common broadcasted RRC or UE specific RRC message carried on Physical Downlink Shared Channel (PDSCH) respectively.

For SL-RRC over sidelink (PC5) interface, Sidelink-Control Resource Set (SL-CORESET) carried on New Radio Physical Sidelink Control Channel (NR-PSCCH) is configured at Sidelink-Common Search Space (SL-CSS) or Sidelink-UE Search Space (SL-USS) by RRC or SL-RRC for common or UE specific SL-RRC massage respectively. Sidelink Control Information (SCI) on SL-CORESET in SL-CSS or SL-USS addresses the location of common broadcasted SL-RRC or UE specific SL-RRC message carried on New Radio Physical Sidelink Shared Channel (NR-PSSCH) respectively.

Sidelink resource pool allocation or configuration in frequency and time may also be indicated with Medium Access Control (MAC) Control Element (CE) over Uu interface with network control (e.g. gNB or eNB managed resource allocation) or with Sidelink-Medium Access Control (SL-MAC) over sidelink (PC5) interface without network control (e.g. UE managed resource allocation). A set or subset of the resources or resource pools configured in RRC or SL-RRC may be indicated by MAC CE or SL-MAC CE, e.g. using the configuration index. Also the resource or resource pool configuration may be activated or deactivated by MAC CE or SL-MAC CE for semi-static allocation.

Sidelink resource pool allocation or configuration in frequency and time may also be dynamically indicated with Downlink Control Information (DCI) over Uu with network control (e.g. gNB or eNB managed resource allocation), or dynamically indicated with Sidelink Control Information (SCI) over sidelink (PC5) interface without network control (e.g. UE managed resource allocation).

A set or subset of the sidelink resources or resource pools configured in RRC or SL-RRC may be indicated by DCI over Uu interface or by SCI over sidelink (PC5) interface, e.g. using the configuration index. Also the resource allocation in time and frequency may be directly indicated in DCI over Uu interface or in SCI over sidelink (PC5) interface, with time allocation and frequency allocation fields respectively, using the different description methods (e.g., bitmap) described previously.

Also the sidelink resource(s) or resource pool configuration(s) or allocation(s) may be activated or deactivated by DCI over Uu interface or by SCI over sidelink (PC5) interface for semi-persistent allocation or scheduling, which may be activated alone with the resource configuration carried on DCI or SCI (e.g., a Scheduling Assignments SCI (SA SCI)), and which may also be activated or deactivated by DCI over Uu interface or by SCI over sidelink interface with the sidelink resource allocation mode, e.g., activating a sidelink resource allocation mode with the related sidelink resource or resource pool configuration or allocation.

Resource Configuration

Methods and systems for resource configuration on Sidelink are disclosed.

In a first example, the sidelink resources may be configured statically by common or dedicated RRC or SL-RRC messages, for example, the resource pools may be configured when a vehicle UE is attached to an access network (e.g., gNB or gNB-like RSU) via SI or Radio Resource Control (RRC) message as an example or when a vehicle UE is registered at a V2X application server at a cloud or infrastructure via Non-Access-Stratum (NAS) or Access-Stratum (AS) message as an example. The resource pool configurations may be updated semi-statically by RRC or SL-RRC message or Medium Access Control (MAC) Control Element (CE) or SL-MAC CE or dynamically by Downlink Control Information (DCI) from a gNB or gNB-like RSU if the vehicle UE is connected to the access network or the V2X service server. Without network control, the sidelink resources may be configured statically by SL-SI carried on or pointed by a New Radio-Physical Sidelink Broadcast Channel (NR-PSBCH) carrying master SL-SI or main SL-SI of a selected New Radio-Sidelink Primary Synchronization Signal (NR-SPSS)/New Radio-Sidelink Secondary Synchronization Signal (NR-SSSS)/NR-PSBCH block or New Radio-Physical Sidelink Shared Channel (NR-PSSCH) carrying remaining or other SL-SI or SL-RRC message associated with a selected NR-SPSS/NR-SSSS/ NR-PSBCH block and/or indicated semipersistently or dynamically by scheduling assignment Sidelink Control Information (SCI) carried on New Radio-Physical Sidelink Control Channel (NR-PSCCH) from an RSU as a coordinator in proximity, a lead in proximity, a group lead, or a synchronization source UE.

For Sidelink resources, different vehicle UEs may be configured differently according their own capability or property (such as level of driving automation) and V2X applications. For example, the resource pools for highly autonomous vehicle UEs may be configured for very low latency and high reliability features as discussed previously. Therefore, a vehicle UE's automation level may be used in the configuration, such as Level of Automation (LoA) SAE 0-2 for Driver Control and SAE 3-5 for Vehicle Control based on whether the human operator or the automated system is primarily responsible for monitoring the driving environment. The vehicle UE's automation level may be indicated by a higher layer's parameter, e.g. auto_level, which may be indicated from the vehicle UE during the sidelink resource configuration procedure.

For Sidelink resources, the resource pools may be configured differently for different kind of vehicle UEs at different operation modes, e.g., priority level, such as an ambulance running for a medical emergency mode, where the operation mode may be indicated from the higher layer or application layer, e.g. high_priority_mode.

For Sidelink resources, the resource pools may be configured differently for different vehicle UEs at different speed, so that vehicle UEs at high speed may be configured with low latency resource pools, where the parameter speed may be indicated from the higher layer or application layer.

For Sidelink resources, the resource pools may be configured according to vehicle UEs' locations or range, so that vehicle UEs at different locations may be configured with shared resource pools, e.g. resource reused per location or proximity, where the parameter location_zone may be indicated from the higher layer or application layer.

For Sidelink resources, a vehicle UE may be configured differently based on its role in an application or service, e.g., a lead or member role of a platoon may be configured differently. A UE's role may be indicated by the higher layer or the application layer, e.g. ue_role.

For Sidelink resources, different V2X applications may be configured differently. For example, the resource pools for the lead vehicle UE may be configured differently from a member vehicle UE of a Platooning application, but the resource pools among vehicle UEs for Extended Sensors application may be configured the same. In addition, different applications or services may have different performance requirements, and the resources maybe configured with different priority levels. Therefore, a vehicle UE may be configured with different configurations associated with different application ID or service ID which may have different priority levels, where the application or service ID to priority level mapping may be handled by the higher layer or application and the vehicle UE may select the resource configuration according to the higher layer parameter such as app_id or app_index for application, or service_id or service_index for service.

For Sidelink resources, different data communications may be configured differently. For example, for a light traffic area, the resource pools may be shared by both periodic transmissions (e.g., using sensing based semi-persistent resource booking) and aperiodic or event triggered transmission (e.g., using quick channel sensing for accessing) as indicated from the higher layer or application layer, e.g. parameter periodic_flag with value "1" for periodic and "0" for aperiodic, or the resource pools may be shared by broadcast, multicast, and unicast as indicated from the higher layer or application layer, e.g. parameter communication_type. But for heavy traffic area, the probability of collisions between the semi-persistent periodic transmissions and event triggered large data transmissions is very high. To reduce collisions, a vehicle UE may be configured with different resource pools for different data traffic (e.g., resource pools for periodic small or medium data transmissions using sensing based semi-persistent booking) and resource pools for event triggered large data transmissions with very low latency and high reliability using priority based channel sensing access schemes, where the parameter priority is indicated from the higher layer or application layer, (e.g. sense the channel first, transmit data with or without a back-off based on the vehicle UE's priority right; wait with a time interval which may be associated to vehicle UE's priority also and sense the channel again if the channel is occupied). To reduce collisions, e.g. in a half duplex communication a UE cannot receive and transmit at the same time, broadcast, multicast and unicast may also be configured with different resource pools allocated at different times for example.

All the parameters exemplified for resource or resource pool configuration or allocation, may be configured by RRC or SL-RRC, indicated by MAC CE or SL MAC CE, and dynamically signaled by DCI or SCI for the associated data.

In a second example, to utilize the resource pools more efficiently and to meet the more stringent resource requirement for very low latency and high reliability vehicle UEs, the resource pools may be configured locally, by RSU as a coordinator in proximity (e.g., at a heavy traffic intersection), by a platoon lead for the platoon, or by a group lead in proximity, using SL-RRC message, SL-MAC-CE, or SA SCI over the sidelink (PC5) interface as described previously.

Figure 6A:
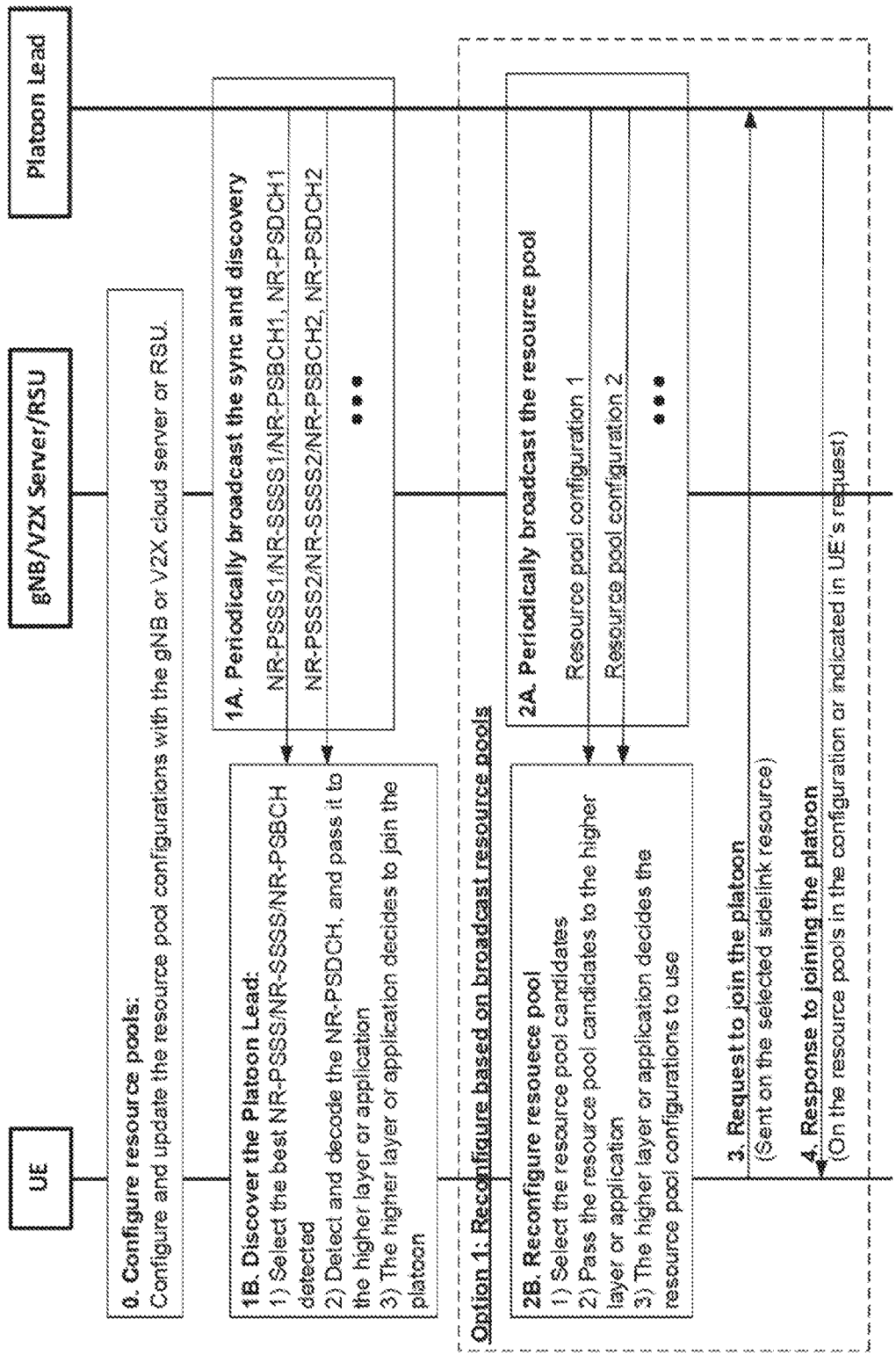
FIGS. 6A and 6B show an example call flow of a resource reconfiguration when joining a platoon.
Figure 6B:
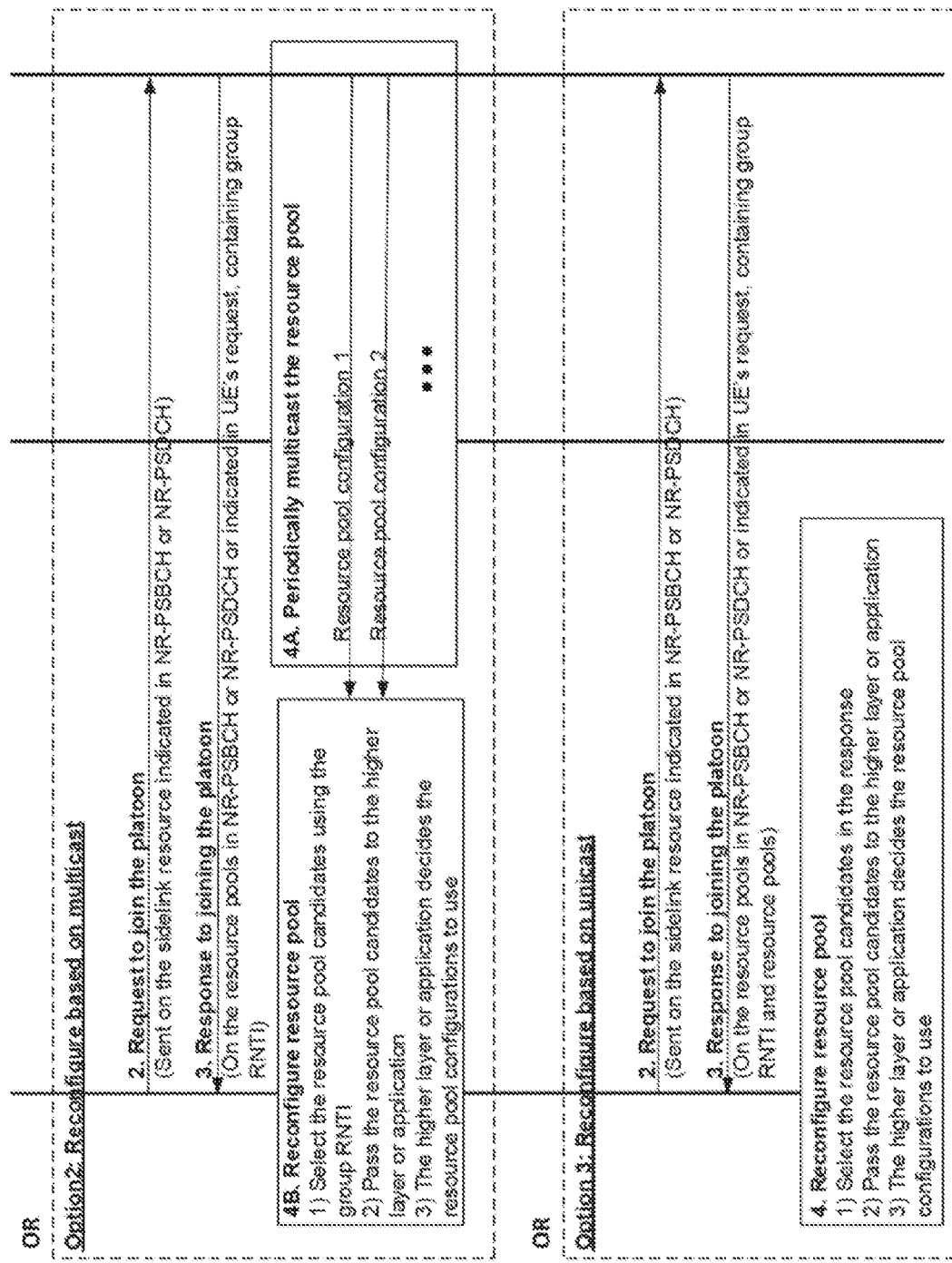

An example of resource pool configuration and reconfiguration for joining a platoon is illustrated FIGS. 6A and 6B, which may contain the following steps as an example:

At step 0, the vehicle UE may initially configure and then update the resource pool configurations with the gNB or V2X cloud server or gNB-like RSU if under the network control over the Uu interface, or with an RSU as a coordinator in proximity, a lead in proximity, a group lead, or a synchronization source UE over the sidelink (PC5) interface.

At step 1A, the platoon lead may periodically broadcast or beam sweep the synchronization signal and discovery information over the sidelink interface, including New Radio Primary Sidelink Synchronization Signal (NR-PSSS) and New Radio Secondary Sidelink Synchronization Signal (NR-SSSS) for synchronization, New Radio Physical Sidelink Broadcast Channel (NR-PSBCH) for broadcasting master or main system information and/or master or main group information, and New Radio Physical Sidelink Discovery Channel (NR-PSDCH) or New Radio Physical Sidelink Shared Channel (NR-PSSCH) for group discovery or NR-PSSCH for remaining or other SL-SI or SL-RRC message.

At step 1B, the vehicle UE may discover the platoon lead. One or more of the following may occur: the vehicle UE may select the best NR-PSSS/NR-SSSS/NP-PSBCH block on the beam detected for synchronization, the vehicle UE may detect and decode NR-PSDCH or NR-PSSCH pointed by NR-PSBCH (e.g. the SL-CORESET allocation for the NR-PSSCH) or associated with the selected NR-PSSS/NR-SSSS/NR-PSBCH block with discovery information on the beam associated or Quasi-Co-located (QCLed), e.g., QCL type-D for spatial QCL relationship, with the selected NR-PSSS/NR-SSSS/NR-PSBCH block and pass it to the higher layer or application, and/or the higher layer or application decides to join the platoon.

In a first option, reconfiguration may be based on broadcast resource pools (e.g., broadcast based) as exemplified in FIG. 6A:

At step 2A, the platoon lead may periodically broadcast or beam sweep the resource pools configurations, which may be the resources (e.g., reserved and/or non-reserved) allocated to the platoon on its NR-PSBCH, e.g. carrying Sidelink Master Information Block (SL-MIB), or NR-PSSCH (e.g. carrying remaining or other SL-SI or SL-RRC message) pointed by NR-PSBCH or associated or QCLed with each NR-PSSS/NR-SSSS/NR-PSBCH block or the available resources (e.g., not used or reserved yet) of the total platoon resources on its NR-PSSCH (e.g. carrying SL-SI or SL-RRC) associated or QCLed with each NR-PSSS/NR-SSSS/NR-PSBCH block.

At step 2B, the vehicle UE may reconfigure the resource pool. One or more of the following may occur: the vehicle UE may select the resource pool candidates based on sensing (Note: an example of sensing is illustrated later in FIG. 16) of the available resources of the total platoon resources broadcasted by the platoon lead on the beam associated or QCLed with the selected NR-PSSS/NR-SSSS/NR-PSBCH block or based on the available resources broadcasted by the platoon lead on the beam associated or QCLed with the selected NR-PSSS/NR-SSSS/NR-PSBCH block, and/or based on the measurement such as sidelink channel occupation ratio, sidelink radio quality or interference, e.g., Reference Signal Received Power (RSRP), Reference Signal Received Quality (RSRQ) or Signal to Noise and Interference Ratio (SINR) on NR-PSSS/NR-SSSS or DMRS of NR-PSBCH or periodic New Radio Sidelink Channel State Information Reference Signal (NR-SL-CSI-RS), etc. if available, the vehicle UE may pass the resource pool or resource candidates as well as related measurements if available to the higher layer or application, and/or the higher layer or application may decide the resource pool or resource configurations to use.

At step 3, the vehicle UE may request to join the platoon. The request may be sent on the default or common sidelink resource indicated by the lead's NR-PSBCH (e.g., SL-MIB) during synchronization or NR-PSDCH or NR-PSSCH during discovery or NR-PSSCH (e.g., carrying SL-SI or SL-RRC) pointed by NR-PSBCH or pointed by SL-CORESET in SI-CSS or SL-USS or associated or QCLed with the selected NR-PSSS/NR-SSSS/NR-PSBCH block or the selected sidelink resource from step 2B, on the beam associated with the selected NR-PSSS/NR-SSSS/NR-PSBCH block. The request may be carried on a new formatted New Radio Physical Sidelink Control Channel (NR-PSCCH) or New Radio Physical Sidelink Feedback Control Channel (NR-PSFCCH), or on NR-PSSCH.

At step 4, the platoon lead may send a response to the vehicle UE associated with the request to join the platoon. The response may be sent on the resource pools in the default sidelink resource indicated by the lead's NR-PSBCH (e.g., SI-MIB) during synchronization or NR-PSDCH or NR-PSSCH during discovery or NR-PSSCH (e.g., SL-SI or SL-RRC) pointed by NR-PSBCH (e.g., SL-CORESET) or associated or QCLed with the selected NR-PSSS/NR-SSSS/NR-PSBCH block. or the selected resource indicated in the vehicle UE's request at step 3, on the beam associated or QCLed with the selected NR-PSSS/NR-SSSS/NR-PSBCH block or indicated by the vehicle UE with Transmission Configuration Indicator (TCI) state or associated Reference Signal (RS) index. The response may contain a sidelink group ID SL-G-RNTI and a group member ID SL-G-CRNTI, and related resource pool configurations for shared or dedicated resources for different communication types such as broadcast, multicast and unicast, and for shared or dedicated resources among the platoon members for each communication type. The response may be carried on a new formatted NR-PSCCH or NR-PSFCCH, or on NR-PSSCH.

In a second option, reconfiguration may be based on multicast (e.g., group based) as exemplified in FIG. 6B:

At step 2, the vehicle UE may request to join the platoon. The request may be sent on the default or selected sidelink resource indicated in the lead's broadcasted NR-PSBCH or NR-PSDCH or NR-PSSCH pointed by NR-PSBCH or associated or QCLed with the selected NR-PSSS/NR-SSSS/NR-PSBCH block on the beam associated or QCLed with the selected NR-PSSS/NR-SSSS/NR-PSBCH block.

At step 3, the platoon lead may send a response to the vehicle UE associated with the request to join the platoon. The response may be sent on the default resource pools indicated in the lead's broadcasted NR-PSBCH or NR-PSDCH or NR-PSSCH or selected resource pools indicated in UE's request, on the beam associated or QCLed with the selected NR-PSSS/NR-SSSS/NR-PSBCH block or indicated by the vehicle UE with TCI state or associated RS index. The response may contain a Sidelink group ID SL-G-RNTI and a group member ID SL-G-CRNTI, and related resource pool configurations for shared or dedicated resources for different communication types such as broadcast, multicast and unicast, and for shared or dedicated resources among the platoon members for each communication type.

At step 4A, the platoon lead may periodically multicast or beam sweep the resource pool on its NR-PSSCH indicated by a Scheduling Assignment (SA) SCI, which may be the total resources (e.g., reserved and non-reserved) allocated to the platoon or the available resources (e.g., not reserved yet) of the total platoon resources.

At step 4B, the vehicle UE may reconfigure the resource pool. One or more of the following may occur: the vehicle UE may decode the SA SCI using the sidelink group ID SL-G-RNTI (e.g. the SA SCI is scrambled by source ID or group ID or the SA SCI field for source ID or group ID) for the multicast message on the beam associated or QCLed with the selected NR-PSSS/NR-SSSS/NR-PSBCH block and select the resource pool candidates based on sensing of the available resources of the total platoon resources multicasted by the platoon lead or based on the available resources multicasted by the platoon lead, and/or based on the measurement such as sidelink channel occupation ratio, sidelink radio quality and interference (e.g. RSRP, RSRQ, or SINR measured on sidelink), etc. if available, or based on the group member ID SL-G-CRNTI (e.g. indicated by the SA SCI field for destination ID or group member ID) for dedicated resources assigned to a group member by the lead, the vehicle UE may pass the resource pool candidates as well as the sidelink measurements if available to the higher layer or application, and/or the higher layer or application may decide the resource pool configurations to use.

In a third option, the reconfiguration may be based on unicast (e.g., ask-response) as exemplified in FIG. 6B:

At step 2, the vehicle UE may send a request to join the platoon. The request may be sent on the default or selected Sidelink resource indicated in the lead's broadcasted NR-PSBCH (e.g., SL-MIB) or NR-PSDCH or PSSCH (e.g., SL-SI or SL-RRC) on the beam as described previously.

At step 3, the platoon lead may send a response to the vehicle UE associated with the request to join the platoon. The response may be sent on the resource pools in the lead's broadcasted NR-PSBCH or NR-PSDCH or NR-PSSCH or indicated in UE's request on the beam as described previously, containing group RNTI and resource pools. The response may contain a Sidelink group ID SL-G-RNTI and a group member ID SL-G-CRNTI, and related resource pool configurations for shared or dedicated resources for different communication types such as broadcast, multicast and unicast, and for shared or dedicated resources among the platoon members for each communication type. The resource pool configurations may also be sent on a separate unicasted message from the platoon lead, e.g. on a PSSCH pointed by a SA-SCI specifically to the UE (e.g. using the UE's group member ID).

At step 4, the vehicle UE may reconfigure the resource pool. One or more of the following may occur: the vehicle UE may select the resource pool candidates in the response based on sensing of available resources for shared resources or based on the dedicated resources indicated to the group member, as well as the measurements on sidelink such as sidelink channel occupation ratio, sidelink radio quality or interference, etc. as described previously if available, the vehicle UE may pass the resource pool candidates and the measurements if available to the higher layer or application, and/or the higher layer or application decides the resource pool configurations to use.

Figure 7A:
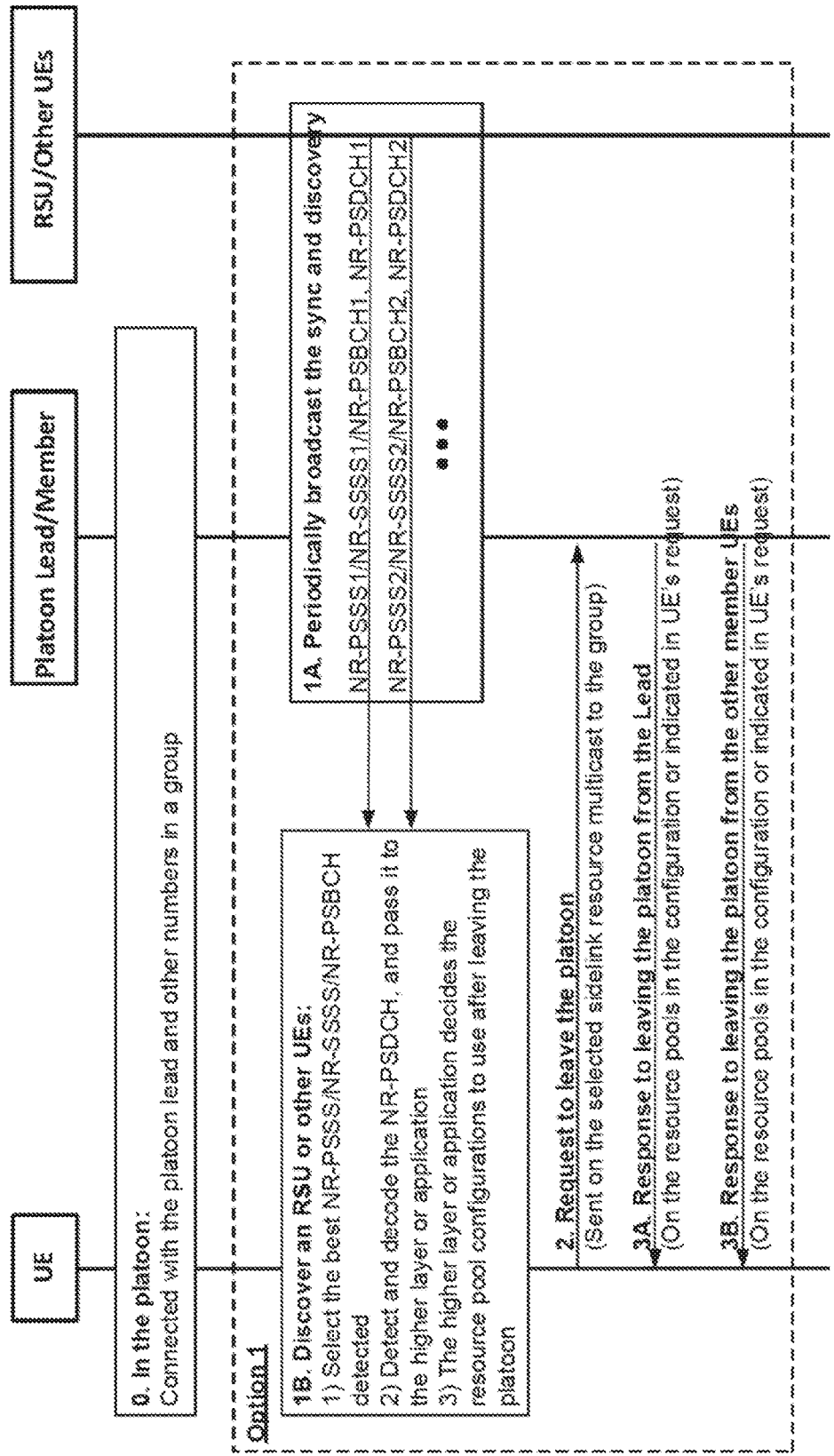
FIGS. 7A and 7B show an example call flow of a resource reconfiguration when leaving a platoon.
Figure 7B:
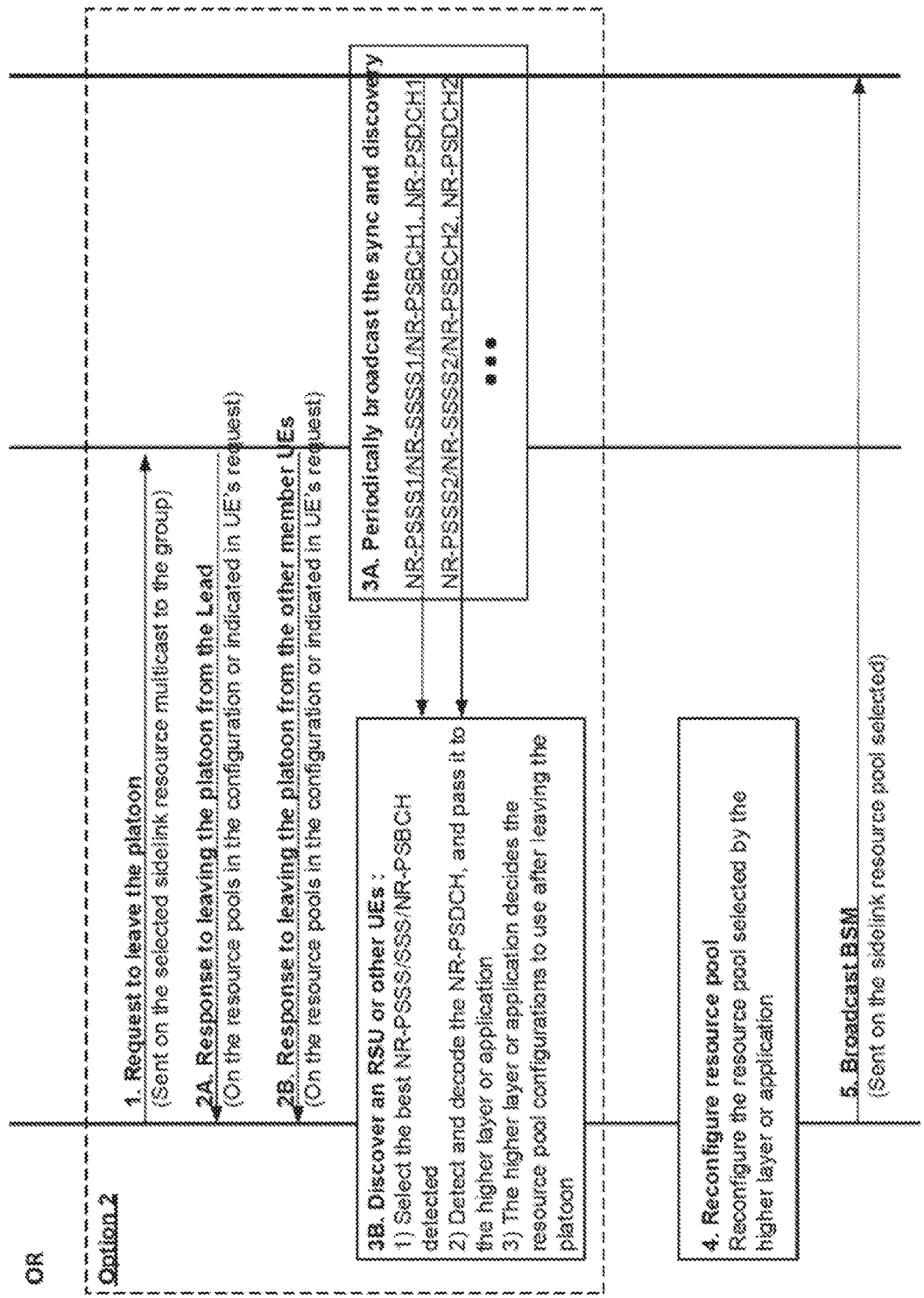

An example of resource pool configuration and reconfiguration for leaving a platoon is illustrated FIGS. 7A and 7B, which may contain the following steps as an example:

At step 0, the vehicle UE may relate to the platoon lead and other numbers in a group.

In a first option as exemplified in FIG. 7A, e.g. discovering an RSU or another UE first:

At step 1A, an RSU/other UEs may periodically broadcast or beam sweeping the synchronization signal and discovery information, e.g., NR-PSSS/NR-SSSS/NR-PSBCH for synchronization and beam selection, NR-PSDCH or NR-PSSCH pointed by NR-PSBCH (e.g., SL-MIB) or associated or QCLed with each NR-PSSS/NR-SSSS/NR-PSBCH block for discovery, and broadcast or beam sweep the NR-PSCCH and/or NR-PSSCH with resource pool configurations associated or QCLed with each NR-PSSS/NR-SSSS/NR-PSBCH block.

At step 1B, the vehicle UE may discover an RSU or another UE. One or more of the following may occur: the vehicle UE may select the best NR-PSSS/NR-SSSS/NR-PSBCH detected based on the sidelink measurements such as RSRP, RSRQ or SINC as described previously, the vehicle UE may detect and decode the NR-PSDCH or NR-PSSCH for discovery on the beam associated or QCLed with the selected NR-PSSS/NR-SSSS/NR-PSBCH, and pass it to the higher layer or application, as well as sidelink measurements if available, and/or the higher layer or application may decide the resource pool configurations to use after leaving the platoon, or to use the resource pool configurations broadcasted by the RSU or other UE.

At step 2, the vehicle UE may request to leave the platoon. The request may be sent on the selected Sidelink resource from the resources broadcasted, multicasted or unicasted as described in FIG. 6A and FIG. 6B.

At step 3A, the platoon lead may send a response to the vehicle UE associated with the request to leave the platoon. The response may be sent on the sidelink resource in the resource pool configuration or indicated in UE's request as described for FIG. 6A and FIG. 6B.

At step 3B, the vehicle UE may receive a response to leaving the platoon from the other member UEs (e.g., relay member UEs to and from this vehicle UE) on the resource pools in the configuration or indicated in UE's request as described for FIG. 6A and FIG. 6B.

In a second option as exemplified in FIG. 7B, e.g. leaving the platoon first:

At step 1, the vehicle UE may request to leave the platoon. The request may be sent on the selected Sidelink resource broadcasted, multicasted or unicasted as described for FIG. 6A and FIG. 6B.

At step 2A, the platoon lead may send a response to the vehicle UE associated with the request to leave the platoon on the resource pools in the configuration or indicated in UE's request as described for FIG. 6A and FIG. 6B.

At step 2B, the vehicle UE may receive a response to leaving the platoon from the other member UEs (e.g., relay member UEs to and from this vehicle UE) on the resource pools in the configuration or indicated in UE's request as described for FIG. 6A and FIG. 6B.

At step 3A, the RSU/other UEs may periodically broadcast or beam sweep the synchronization signal and discovery information: NR-PSSS/NR-SSSS/NR-PSBCH for synchronization and beam forming, NR-PSDCH or NR-PSSCH pointed by NR-PSBCH or associated or QCLed with each NR-PSSS/NR-SSSS/NR-PSBCH block for discovery, and broadcast NR-PSCCH and/or NR-PSSCH with resource pool configurations associated or QCLed with each NR-PSSS/NR-SSSS/NR-PSBCH block.

At step 3B, the vehicle UE may discover an RSU or other UEs. One or more of the following operations may be performed: the vehicle UE may select the best NR-PSSS/NR-SSSS/NR-PSBCH detected based on the sidelink measurements such as RSRP, RSRQ or SINC as described previously, the vehicle UE may detect and decode the NR-PSDCH on the beam associated or QCLed with the selected NR-PSSS/NR-SSSS/NR-PSBCH, and pass it to the higher layer or application, as well as sidelink measurements if available, and/or the higher layer or application may decide the resource pool configurations to use after leaving the platoon, or to use the resource pool configurations broadcasted by the RSU or other UE.

For both the first option and the second option as illustrated in FIG. 7B:

At step 4, the vehicle UE may reconfigure the resource pool selected by the higher layer or application.

At step 5, the vehicle UE may broadcast a Basic Safety Message (BSM) or Common Awareness Messages (CAM), sent on the Sidelink resource pool selected after reconfiguration.

Figure 8A:
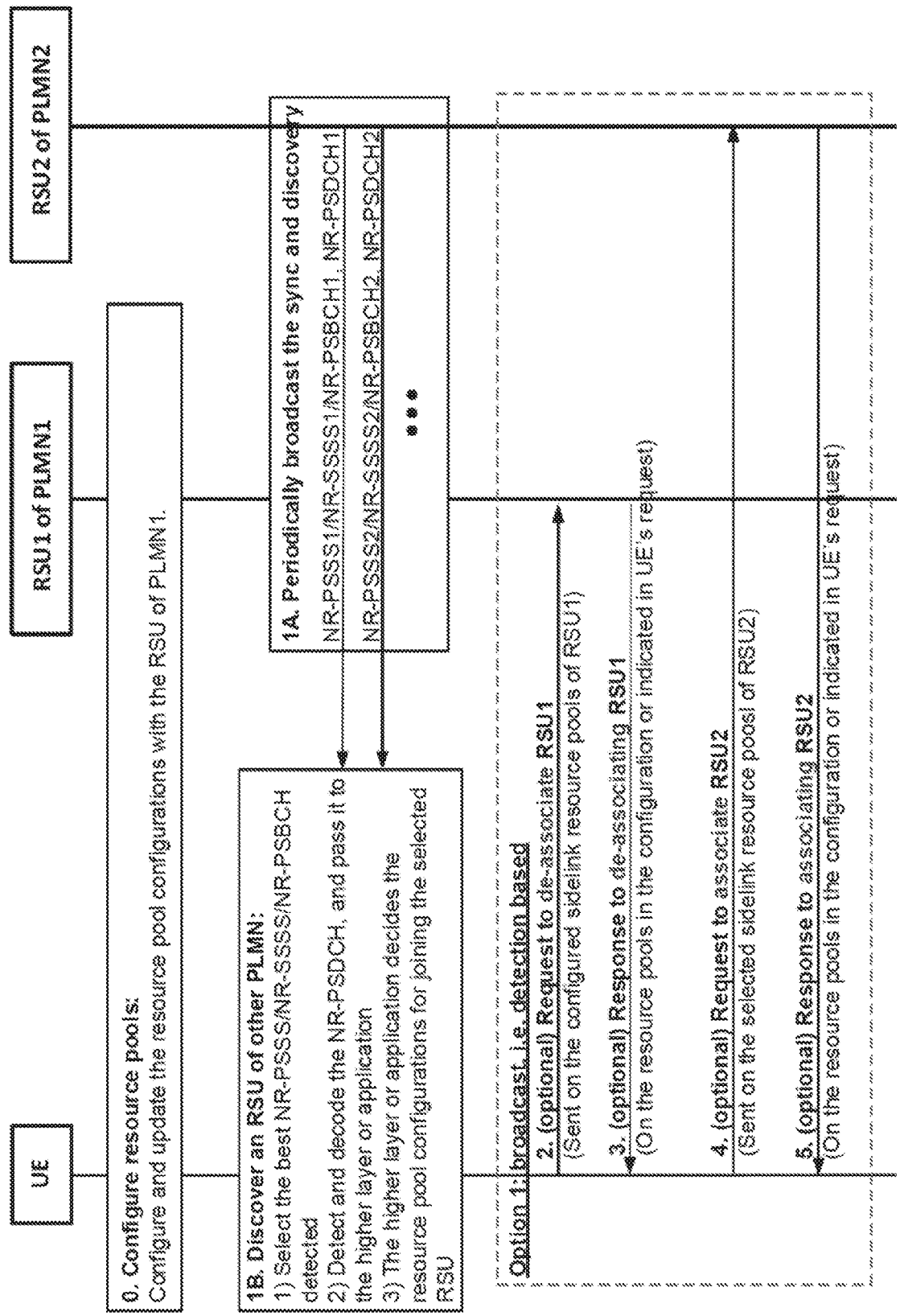
FIGS. 8A and 8B show an example call flow of a resource reconfiguration when switching RSU.
Figure 8B:
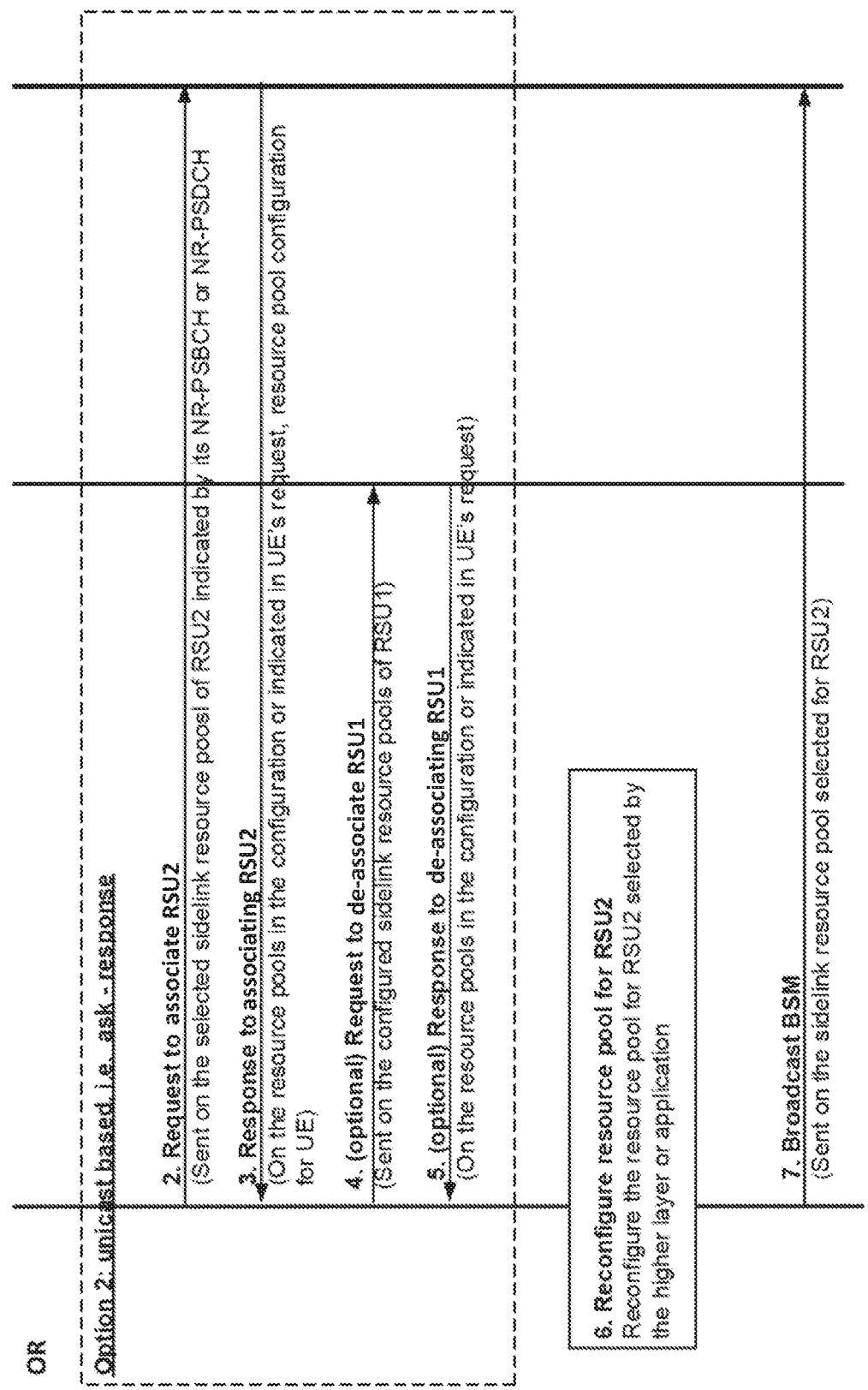

An example of resource pool configuration and reconfiguration for switching RSUs of different Public Land Mobile Network (PLMN) is illustrated FIGS. 8A and 8B, which may contain the following steps as an example:

At step 0, a vehicle UE may configure and update resource pool configurations with the RSU of PLMN1.

At step 1A, the RSU2 of PLMN2 may periodically broadcast or beam sweep the synchronization signal and discovery information: NR-PSSS, NR-SSSS, and NR-PSBCH for synchronization and beam selection, NR-PSDCH or NR-PSSCH pointed by NR-PSBCH or associated or QCLed with each NR-PSSS/NR-SSSS/NR-PSBCH block for discovery, and broadcast NR-PSCCH and/or NR-PSSCH with resource pool configurations associated or QCLed with each NR-PSSS/NR-SSSS/NR-PSBCH block.

At step 1B, the vehicle UE may discover RSU of other PLMN. One or more of the following may occur: the vehicle UE may select the best NR-PSSS/NR-SSSS/NR-PSBCH detected based on the sidelink measurement such as RSRP, RSRQ or SINR as described for FIG. 6A and FIG. 6B, the vehicle UE may detect and decode the NR-PSDCH or NR-PSSCH pointed by NR-PSBCH or associated or QCLed with the selected NR-PSSS/NR-SSSS/NR-PSBCH block, and pass the discovery information as well as the sidelink measurements if available to the higher layer or application, and/or the higher layer or application may decide the resource pool configurations for joining the selected RSU, or to use the resource pool configurations broadcasted by the RSU with NR-PSBCH or NR-PSCCH and/or NR-PSSCH with resource pool configurations associated or QCLed with the selected NR-PSSS/NR-SSSS/NR-PSBCH block.

In a first option (broadcast, detection based) as illustrated in FIG. 8A:

At step 2, the vehicle UE may send a request to de-associated from RSU1. The request may be sent on the configured Sidelink resource pools of RSU1 in the similar way as described with FIG. 7A and FIG. 7B.

At step 3, RSU1 of PLMN1 may send a response to the vehicle UE associated with the request to de-associate from RSU1 on the resource pools in the RSU1's configuration or indicated in UE's request in the similar way as described with FIG. 7A and FIG. 7B.

At step 4, the vehicle UE may request to associate to RSU2. The request may be sent on the default or selected Sidelink resource pools of RSU2 indicated by its NR-PSBCH or NR-PSDCH or NR-PSSCH in the similar way as described with FIG. 6A and FIG. 6B. The vehicle UE may include UE assistant information, such as priority, latency, reliability, speed, location, etc. in the request.

At step 5, RSU2 of PLMN2 may send a response to the vehicle UE associated with the request to associate to RSU2 on the resource pools in the RSU2's configuration or indicated in UE's request in the similar way as described with FIG. 6A and FIG. 6B.

Note that in the first option, step 2-step 5 may be optional, and also the step 2 and 3 may change the order with step 4 and 5.

In a second option (unicast based, response based) as illustrated in FIG. 8B:

At step 2, the vehicle UE may request to associate to RSU2. The request may be sent on the default or selected Sidelink resource pools of RSU2 indicated by its NR-PSBCH or NR-PSDCH or NR-PSSCH. The vehicle UE may include UE assistant information, such as priority, latency, reliability, speed, location, traffic type, etc. in the request for resource allocation.

At step 3, RSU2 of PLMN2 may send a response to the vehicle UE associated with the request to associate to RSU2 on the resource pools in the configuration or indicated in UE's request, with resource pool configuration for the vehicle UE based on the UE assistant information sent with the request at step 3 as an example. A vehicle UE may send request for resource pool configuration or reconfiguration later also, which may include new or updated UE assistant information for resource pool (e.g., the location change, or speed change, etc.)

At step 4, the vehicle UE may request to de-associate from RSU1. The request may be sent on the configured Sidelink resource pools of RSU1.

At step 5, RSU1 of PLMN1 may send a response to the vehicle UE associated with the request to de-associate from RSU1 on the resource pools in the RSU1's configuration or indicated in UE's request.

Note that in the second option, step 4 and step 5 may be optional.

For both the first option and the second option as illustrated in FIG. 8B:

At step 6, the vehicle UE may reconfigure the resource pool with RSU2 selected by the higher layer or application.

At step 7, the vehicle UE may broadcast BSM or CAM sent on the Sidelink resource pool selected for RSU2.

The messages for association or de-association request or response may be carried on a new format PSCCH or New Radio Physical Sidelink Feedback Channel (NR-PSFCH), or on NR-PSSCH over the sidelink (PC5) interface.

Assisted Resource Allocation-Sensing Assistant

For high autonomous vehicles in the Advance Driving case, low latency and high reliability are essential for safety. For example, an autonomous vehicle UE detects falling object on the road and needs to send the emergency trajectory and cooperative maneuvers to nearby RSU and other UEs with performance requirements as 2000 bytes payload, 30 Megabits per second (Mbps) data rate, 3 ms maximum end-to-end latency and 99.999% reliability.

However, the sensing based semipersistent resource reservation scheme, as specified for LTE, take very long time to sense the available resource pool candidates. The sensed resource pool candidates are not totally collision free which may degrade the reliability performance.

To reduce sensing time and possible collisions, assisted sensing may be provided locally by Sensing Assistant (SA) such as an RSU as a coordinator in proximity, a platoon lead, or a lead in proximity, or a vehicle UE. The sensing assistant may periodically broadcast the usage and reservation status of local resource pools, as well as the interference, congestion, location or location zone, communication range, etc., and the sensing assistant may also provide the usage and reservation status of local resource pools upon a vehicle UE's request.

The Sensing Assistant may be pre-configured by manufacturer or service provider, configured by gNB/eNB or V2X server, and optionally may be activated and deactivated by gNB/eNB via DCI over Uu interface, or activated and deactivated by RSU, group lead, or proximity coordinator or lead via SCI over sidelink (PC5) interface.

Figure 9A:
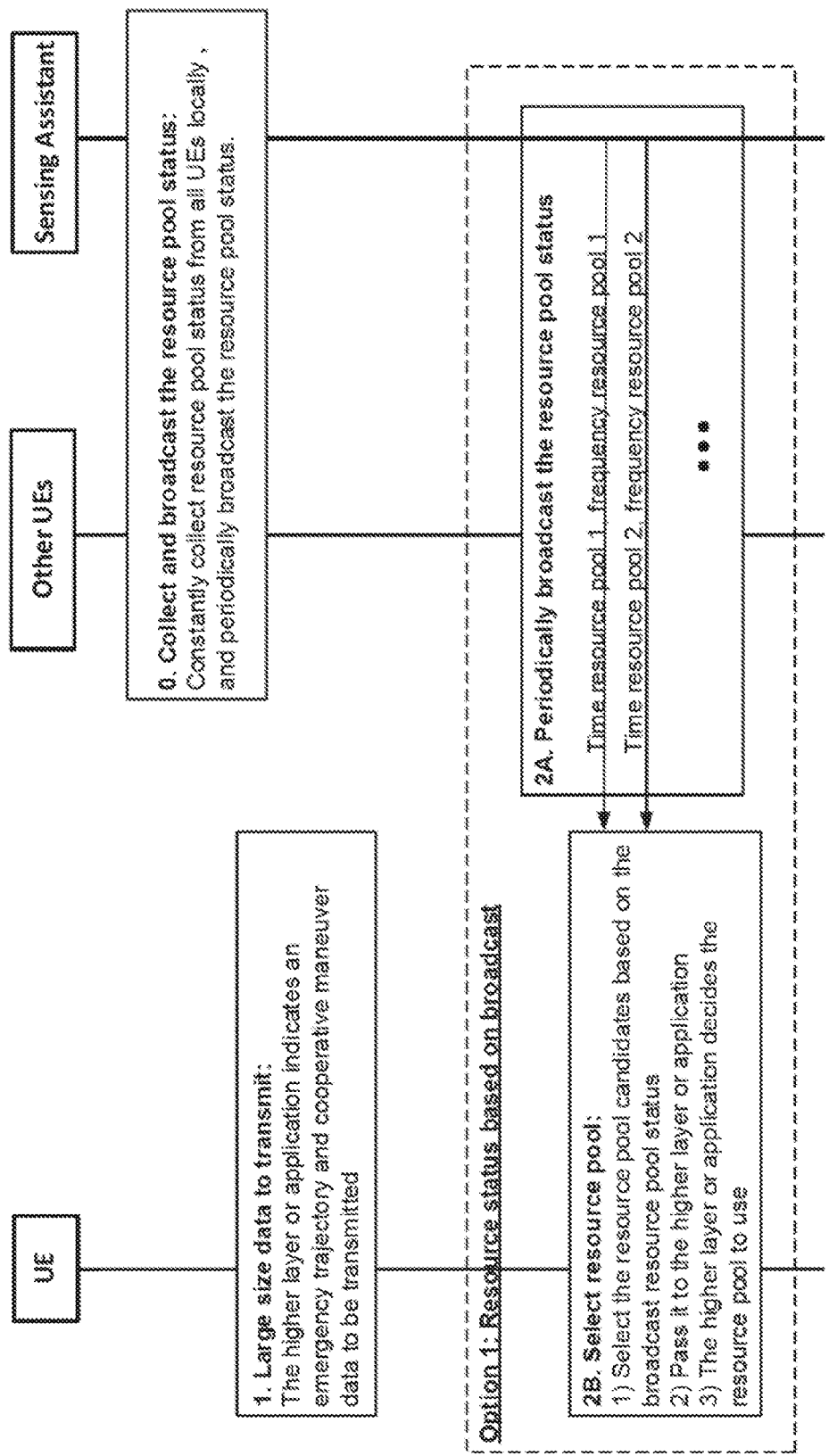
FIGS. 9A and 9B show an example call flow for assisted resource sensing.
Figure 9B:
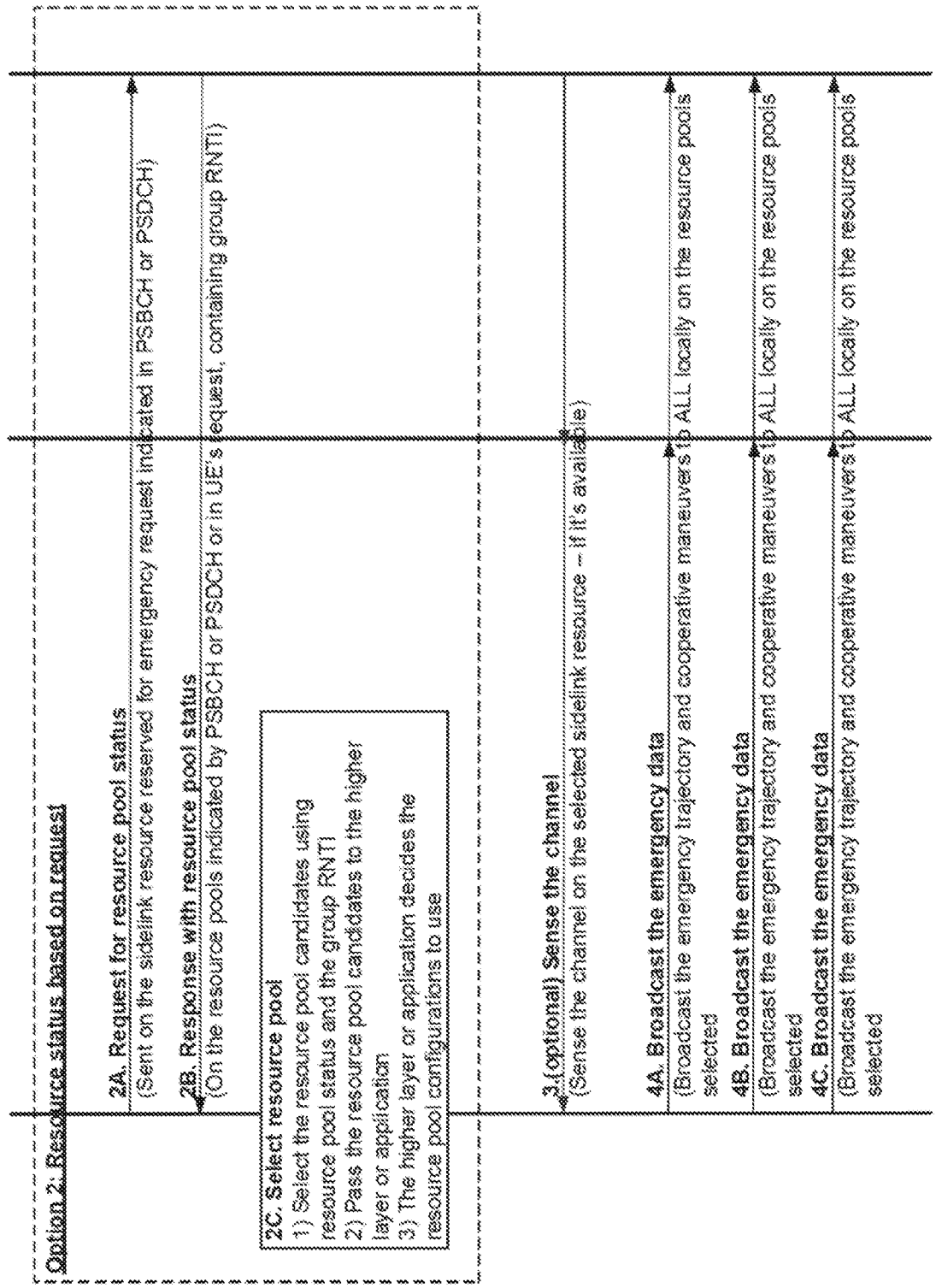

An example of assisted resource sensing is illustrated in FIGS. 9A and 9B, which may contain the following steps. The sensing assistant may collect information associated with one or more of the following: traffic patterns (e.g., resource scheduled or reserved), information on periodicity, time offset, message size, QoS information, and a source or destination identifier. It is understood that the sensing assistant may sense and/or collect any type of information and is not limited to the examples above.

At step 0, the sensing assistant may collect and broadcast the resource pool status. The sensing assistant may constantly collect resource pool or resource status via decoding the SA SCIs carried on NR-PSCCHs sent from all vehicle UEs locally and/or measuring the sidelink radio link quality and interference (e.g., RSRP, RSRQ, SINC, etc.), and periodically broadcast the resource pool or resource status, as well as the interference, congestion, location or location zone, communication range, etc.

At step 1, the vehicle UE may have a large data size to transmit. The higher layer or application indicates an emergency trajectory and cooperative maneuver data to be transmitted.

In a first option (resource status based on broadcast) as illustrated in FIG. 9A:

At step 2A, the sensing assistant may periodically broadcast or beam sweep the resource pool status, such as the time resource pool and frequency resource pool. For example, the bitmap of symbol pools or mini-slot pools, and the bitmap for RB pools or RBG pools may be broadcasted. The resource pool or resource status with other information such as interference, congestion, location or location zone, communication range, etc., may be carried on a NR-PSCCH or NR-PSSCH pointed by NR-PSBCH (e.g. SL-CORESET) or associated or QCLed with each NR-PSSS/NR-SSSS/NR-PSBCH block, or on an SA SCI carried on a NR-PSCCH, or on a broadcast NR-PSSCH indicated by an SA SCI carried on a NR-PSCCH (e.g., SL-CORESET in SL-CSS). The periodicity configurations may be specified, and a specific broadcasting period configuration index may be indicated in NR-PSBCH, e.g., a 2-bit value indicating 4 possible period values.

At step 2B, the vehicle UE may select a resource pool. One or more of the following steps may occur: The vehicle UE may select the resource pool or resource candidates based on the broadcast resource pool or resource status and optionally further conduct a quick sensing of the available resources, for example collecting the resource reservation within the sensing window which is defined by the time line and latency requirement for the data (e.g. one or multiple transport blocks) to be transmitted, the vehicle UE may pass resource pool or resource candidates as well as the sidelink channel condition (e.g., congestion), radio quality and interference measurements if available, to the higher layer or application, and/or the higher layer or application decides the resource pool to use.

In a second option (resource status based on request) as illustrated in FIG. 9B:

At step 2A, the vehicle UE may send a request for a resource pool or resource status. The request may be sent on the Sidelink resource default or reserved for emergency request indicated in Sensing Assistant's NR-PSBCH or NR-PSDCH or broadcast NR-PSSCH associated or QCLed with the selected NR-PSSS/NR-SSSS/NR-PSBCH block. The request may contain a sidelink group ID SI-G-RNTI a sidelink group member ID SL-G-C'RNTI for group based sensing assistance if needed or the vehicle UE's sidelink ID SL-CRNTI or location zone-ID) for proximity or range based sensing assistance if needed. The request may be carried on a new formatted SCI on PSCCH or a new formatted Sidelink Feedback Control Information (SFCI) on New Radio-Physical Sidelink Feedback Control Channel (NR-PSFCCH) or on NR-PSSCH on the beam associated or QCLed with the selected NR-PSSS/NR-SSSS/NR-PSBCH block or associated with the TCI state or RS index indicated to the vehicle UE.

At step 2B, the sensing assistant may send a response with resource pool or resource status on the resource pools or resources indicated by Sensing Assistant's NR-PSBCH or NR-PSDCH or broadcast NR-PSSCH associated or QCLed with the selected NR-PSSS/NR-SSSS/NR-PSBCH block or indicated in the vehicle UE's request, which may contain a sidelink group ID or location zone ID of the Sensing Assistant. The response may be broadcasted, multicasted or unicasted on a NR-PSSCH indicated by or associated with a PSCCH on the beam associated or QCLed with the selected NR-PSSS/NR-SSSS/NR-PSBCH block or indicated with the TCI state or RS index by the vehicle UE in its request.

At step 2C, the vehicle UE may select a resource pool or resource. One or more of the following steps may occur: the vehicle UE may select the resource pool or resource candidates using resource pool or resource status and the group ID if group based or location zone ID if proximity or range based and optionally further conduct a quick sensing of the available resources, for example collecting the resource reservation statistics within the sensing window which is defined by the time line and latency requirement for the data (e.g. one or multiple transport blocks) to be transmitted, the vehicle UE may pass the resource pool or resource candidates as well as the sidelink channel conditions, radio quality and interference measurements if available to the higher layer or application, and/or the higher layer or application may decide the resource pool or resource configurations to use.

For both the first option and the second option:

At step 3, the vehicle UE may further sense the channel on the selected sidelink resource, e.g., sense the channel occupancy to check if it is still available by using energy detection or Received Signal Strength Indication (RSSI) measurement as an example, if needed.

At step 4, the vehicle UE may broadcast the emergency data using repetition or beam sweeping. The vehicle UE may broadcast the emergency trajectory and cooperative maneuvers to all UEs locally on the resources selected. Same or different resources may be used for repetition to the same receiver or beam sweeping to different receivers as exampled in step 4B and 4C. The data may be carried on a broadcast NR-PSSCH indicated by an SA SCI carried on a NR-PSCCH.

Note that step 3 may be optional.

Assisted Resource Allocation—Scheduler

Sensing based resource allocation is not collision free, especially with many periodic and event triggered data at a traffic accident site, at a congested intersection, or in a tightly spaced car platoon. To reduce sensing overhead and avoid possible collisions, resource pools or resources may be reserved by a local scheduler such as an RSU as a coordinator in proximity, a platoon lead, or a lead in proximity, or a scheduling UE. The scheduler may periodically broadcast the resource allocation to each vehicle UE, or provide the resource allocation upon a vehicle UE's request.

The scheduler may be pre-configured by manufacturer or service provider, configured by gNB/eNB or V2X server, and optionally may be activated and deactivated by gNB/eNB via DCI over Uu interface, or activated and deactivated by RSU, group lead, or proximity coordinator or lead via SCI over sidelink (PC5) interface.

The scheduler may statically configure the resources or resource pools for UE(s) to select, e.g., via the SL-RRC message on PSSCH as an example. The scheduler may semi-statically indicate the resources or resource pools for UE(s), e.g., via the SL-MAC CE. The scheduler may semi-persistently allocate the resources or resource pools for UE(s) e.g., via the SCI activation or deactivation as an example. The scheduler may dynamically allocate the resources or resource pools for UE(s), e.g., via the SA SCI as an example.

Figure 10A:
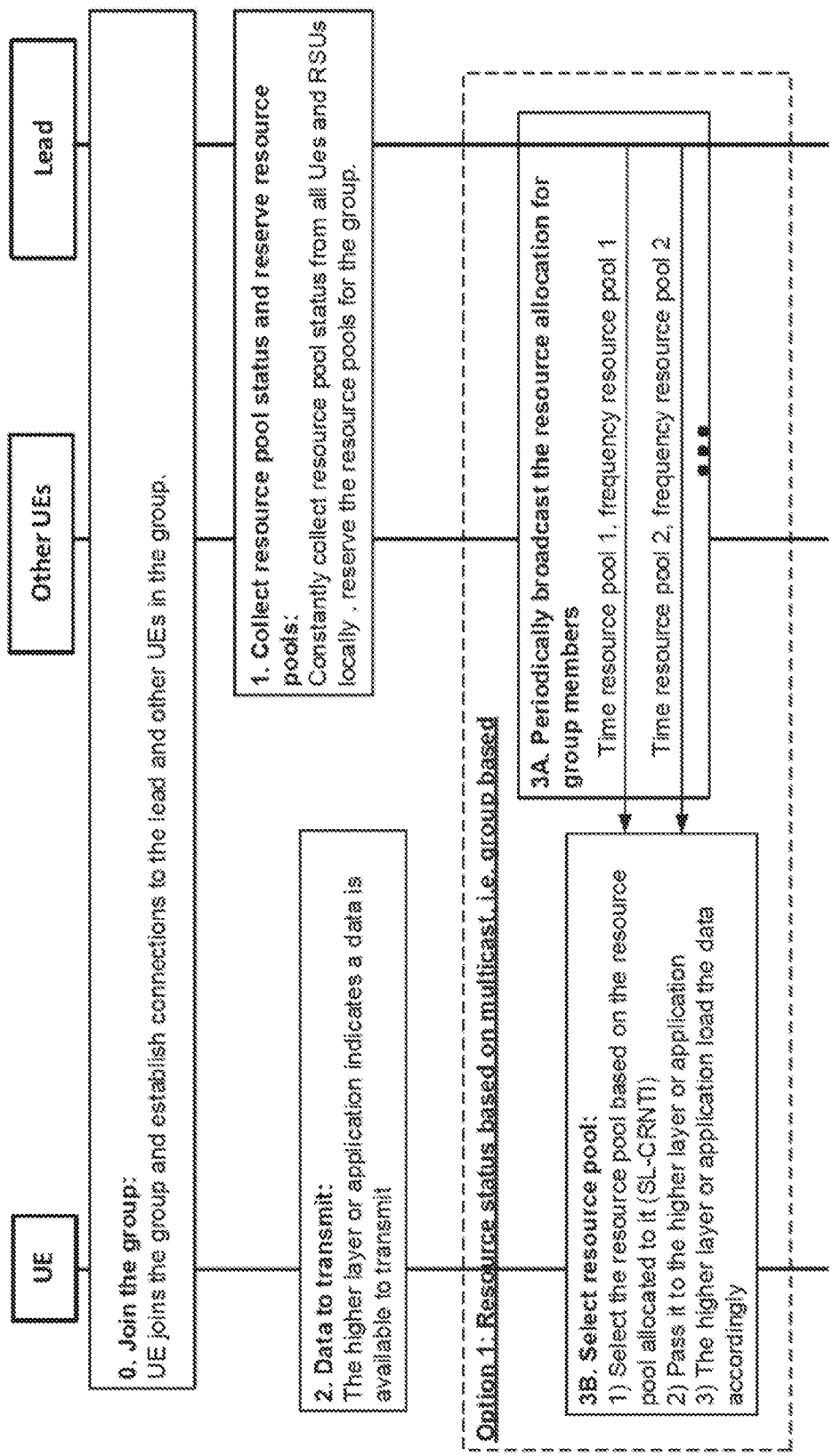
FIGS. 10A and 10B show an example call flow of locally scheduling by a lead.
Figure 10B:
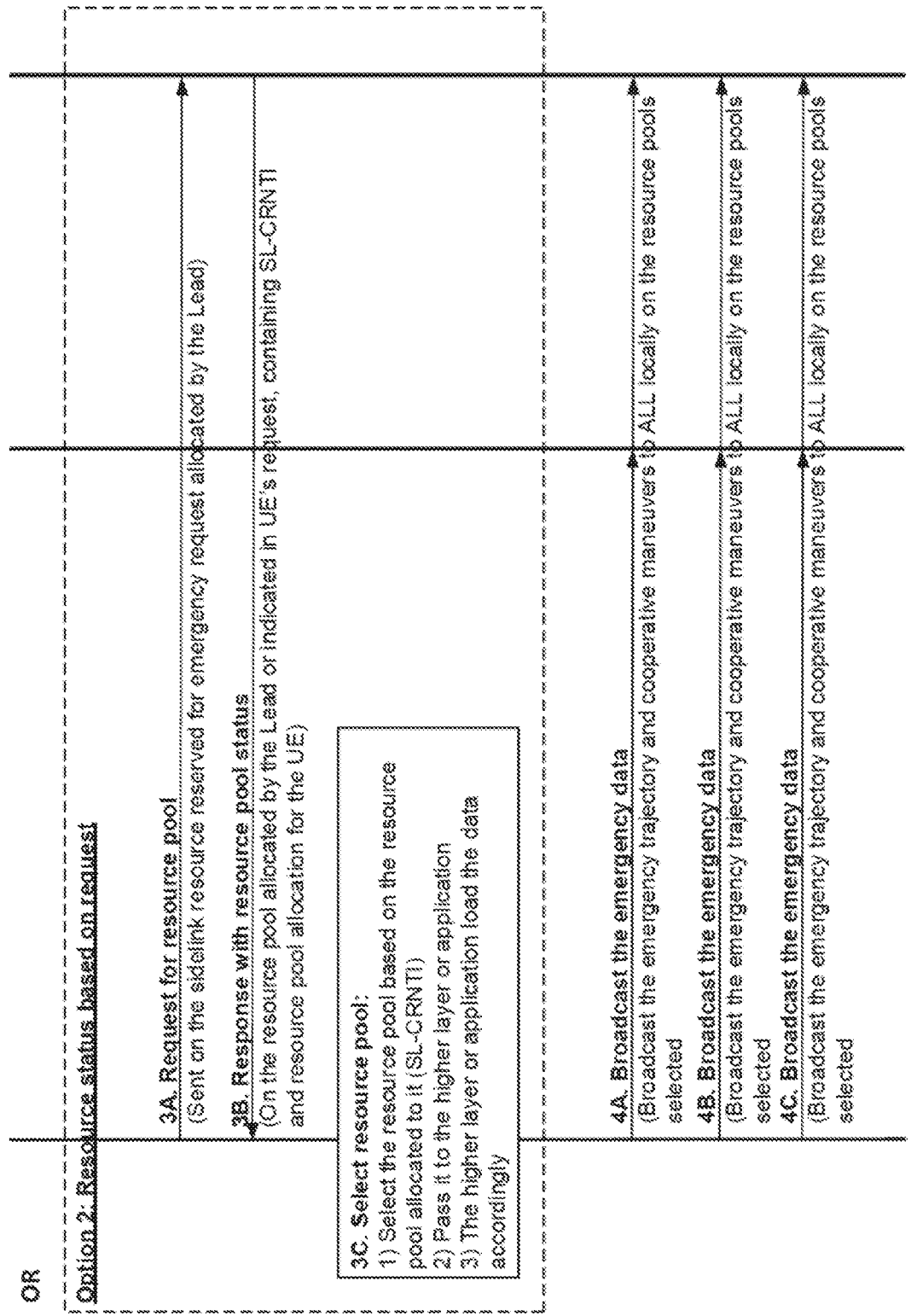

An example of local scheduling by a lead (e.g. RSU as a coordinator or lead in a proximity group, a platoon lead, etc.) as a scheduler is illustrated in FIGS. 10A and 10B, which may contain the following steps:

At step 0, the vehicle UE may join the group (e.g. a platoon led by a platoon lead, a group in proximity led by a proximity lead, etc.) and establish connections to the lead and other UEs in the group via the procedure of group discovery and joining the group. The vehicle UE may also receive a SL-G-CRNTI as a group member ID or label within the group, or a location zone ID for proximity or range.

At step 1, the lead may be configured or allocated with shared or dedicated resource pools or resources, constantly or frequently collect resource pool or resource status from all UEs and RSUs locally, and reserve the resource pools or resources for the group if using shared resource pools.

At step 2, the vehicle UE's higher layers or application layer may indicate that data is available to transmit, which may be periodic or aperiodic, repetition or retransmission with Hybrid Automatic Repeat Request HARQ feedback, etc.

In a first option (resource status based on multicast, group based) as illustrated in FIG. 10A:

At step 3A, the lead periodically broadcasts or beam sweep the resource allocations for group members, such as time resource pools and frequency resource pools for each UE within the group. The resource allocation may be carried on a new formatted SA SCI carried on NR-PSCCH or on a multicast NR-PSSCH pointed by its NR-PSBCH or associated or QCLed with each NR-PSSS/NR-SSSS/NR-PSBCH block, or on a multicast NR-PSSCH indicated by an SA SCI carried on a NR-PSCCH. The resource allocation may be shared or dedicated for different communication types such as broadcast, multicast and unicast, and shared or dedicated among the group members for each communication type. The resource allocation may be semi-static activated and deactivated by SCI or dynamic indicated by a new formatted SA SCI.

At step 3B, the vehicle UE may select a resource pool or resource. One or more of the following operations may occur: the vehicle UE may select the resource pool or resource based on the resource pool or resource allocated to it (e.g., associated to a group member ID SL-G-CRNTI for dedicated resources, or associated to a location zone ID for proximity or range based resources), and send the data accordingly which is carried on NR-PSSCH with associated SCI carried on NR-PSCCH. For shared resources, the vehicle UE may conduct a quick sensing and sidelink measurement and pass the selected resources and measurement to the higher layer or application, and/or the higher layer or application may load the data accordingly. In another example for shared resources, the vehicle UE may conduct channel occupancy sensing, e.g. energy detection or RSSI based, to check is the channel or resources are available for transmitting the data.

In a second option (resource status based on request) as illustrated in FIG. 10B:

At step 3A, the vehicle UE, e.g. a transmitting or receiving UE, may send a request for resource or a request for scheduling. The request may be sent on the sidelink resource default or reserved for emergency or scheduling request allocated by the lead as the scheduler. The request may be carried on a new formatted SCI on NR-PSCCH or a new formatted SFCI on NR-PSFCCH or NR-PSSCH on the beam associated or QCLed with the selected NR-PSSS/NR-SSSS/NR-PSBCH block or associated with the TCI state or RS index indicated to the vehicle UE.

At step 3B, the lead may send a response with resource allocation or schedule on the resource pool or resource allocated by the Lead or indicated in UE's request. The response may contain a group member ID, e.g., SL-G-CRNTI, assigned to this vehicle UE for group based and resource allocation for the vehicle UE, or a location zone ID for proximity or range based resource allocation. The resource allocation may be indicated by an SA SCI carried on a NR-PSCCH scrambled or carried with the group member ID or the UE's sidelink ID, e.g., SL-CRNTI, or a location zone-ID, or by a multicast or unicast NR-PSSCH indicated by an SA SCI carried on a NR-PSCCH.

At step 3C, the vehicle UE may select the resource pool or resources. One or more of the following may occur: the vehicle UE may send the data on the allocated or scheduled resource (e.g., associated with SL-G-C'RNTI) if the resource is dedicated resource. The vehicle UE may select the resource based on the resource pool or resources allocated to it (e.g., associated with SL-G-CRNTI) if the resource is shared, the UE may pass the selected resources as well as the sidelink measurements to the higher layer or application, and/or the higher layer or application may load the data accordingly.

For both the first option and the second option:

At step 4A, the vehicle UE may broadcast the emergency data. The vehicle UE may broadcast the emergency trajectory and cooperative maneuvers to all UEs locally on the resource(s) selected. All UEs in proximity may receive the broadcast message at the allocated resource(s) accordingly which may be indicated by the Lead at step 3B, e.g., broadcasted response, or at the configured broadcast monitoring occasions. Same or different resource allocations may be used for repetition to the same receiver or beam sweeping to different receivers as exampled in step 4B and 4C. The data may be carried on a broadcast NR-PSSCH indicated by an SA SCI carried on a NR-PSCCH.

For multicast, the UEs of the multicast group may receive the multicast message at the allocated resource(s) accordingly which may be indicated by the Lead at step 3B, e.g., broadcasted or multicasted response, or at the configured multicast monitoring occasions.

For unicast, if the request is sent from the transmitting UE at step 3A as exemplified in FIG. 10B, the receiving UE of the unicast pair may receive the unicast message at the allocated resource(s) accordingly which may be indicated by the Lead at step 3B, e.g., broadcasted, multicasted or unicasted response to the unicast pair, or at the configured unicast monitoring occasions; if the request is sent from the receiving UE at step 3A, the transmitting UE of the unicast pair may transmit the unicast message at the allocated resource(s) as indicated by the Lead at step 3B, e.g., broadcasted, multicasted or unicasted response to the unicast pair, and the receiving UE of the pair may receive the unicast message at the resource(s) indicated by the Lead at step 3B.

Assisted Resource Allocation—Scheduler Allocation

A scheduler may be an RSU as a coordinator in proximity, a platoon lead, or a lead in proximity, or a scheduling UE which may be pre-configured by manufacturer or service provider (e.g. V2X service provider or network operator) for use for example when out of coverage or partial coverage of a serving node, or may be selected or activated and deactivated by a serving or a scheduler controlling network entity for example when under network coverage and scheduler allocation is under the network control. Herein, a serving node or scheduler controlling entity may be for example a serving gNB or V2X server (e.g., V2X control server in the core network or V2X application server in the V2X service provider network). Furthermore, the scheduler may also be elected from a group of candidate schedulers or scheduling capable entities in the proximity of the scheduled UE.

A scheduler may be indicated or modified by a gNB via RRC, MAC CE, physical channel (e.g., PDCCH, PDSCH, PUCCH, PUSCH, or new physical broadcast channel) or combination of them over Uu interface or by an RSU or a UE via SL-RRC, SL-MAC CE, sidelink physical channel (e.g., NR-PSCCH, NR-PSFCH, NR-PSSCH, etc.) or combination of them over sidelink (PC5) interface. A scheduler may also be activated and deactivated or modified by a gNB via RRC, MAC CE or DCI over Uu interface or by an RSU or a UE via SL-RRC, SL-MAC CE, or SCI over sidelink (PC5) interface. The communications between a serving scheduler and a candidate scheduler or between a scheduler and other UEs may be carried on SL-RRC, SL-MAC CE, sidelink physical channels (e.g., NR-PSCCH, NR-PSFCH, NR-PSSCH, etc.), or combination of them over sidelink (PC5) interface.

Figure 17:
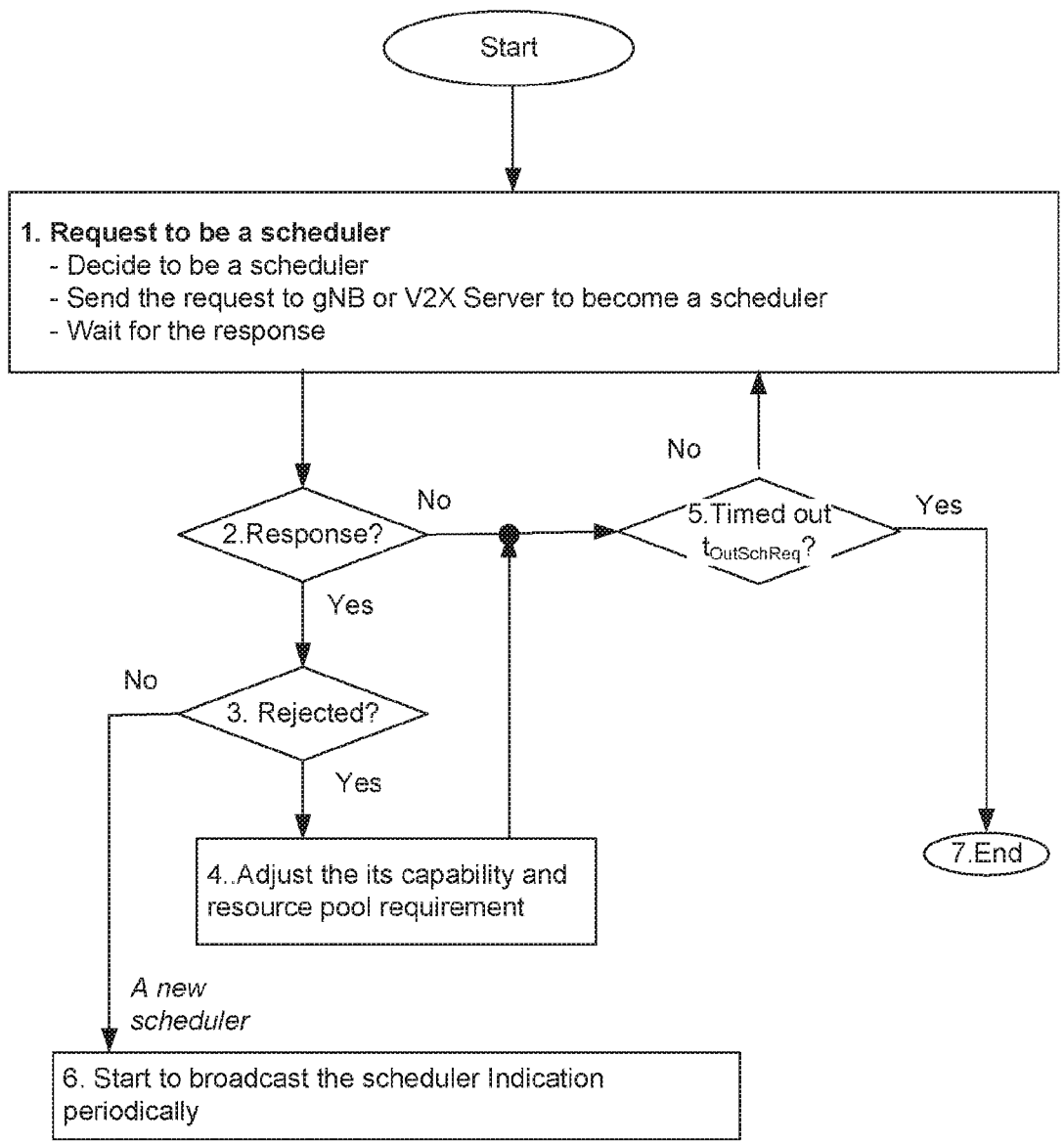
FIG. 17 shows an example of a UE initiated scheduler selection with network control.

FIG. 17 shows an example of network controlled scheduler selection initiated by a UE, which is exemplified with the following steps.

At step 1, request to be a scheduler: decide to be a scheduler and send the request to gNB or V2X Server to become a scheduler, which includes the UE's context and capability, location or location zone, resource pool requirement, and QoS requirements, as well as sidelink measurements such as interference, congestion, link quality, etc. Wait for the response.

At step 2, check response. If no, go to Step 5; otherwise go to Step 3.

At step 3, check if it's a rejection in the response. If no, go to Step 6; otherwise go to Step 4.

At step 4, adjust the its capability, resource pool requirement, etc. per the rejection reason.

At step 5, check if timed out based on the higher layer parameter $t_{OutSchReq}$. If no, go to Step 1; if yes, do to Step 7 for end.

At step 6, start to broadcast the Scheduler Indication periodically carried on its NR-PSBCH if it's a synchronization source UE, on its NR-PSDCH, or on its broadcast NR-PSSCH.

At step 7, end of the Scheduler election.

Figure 18:
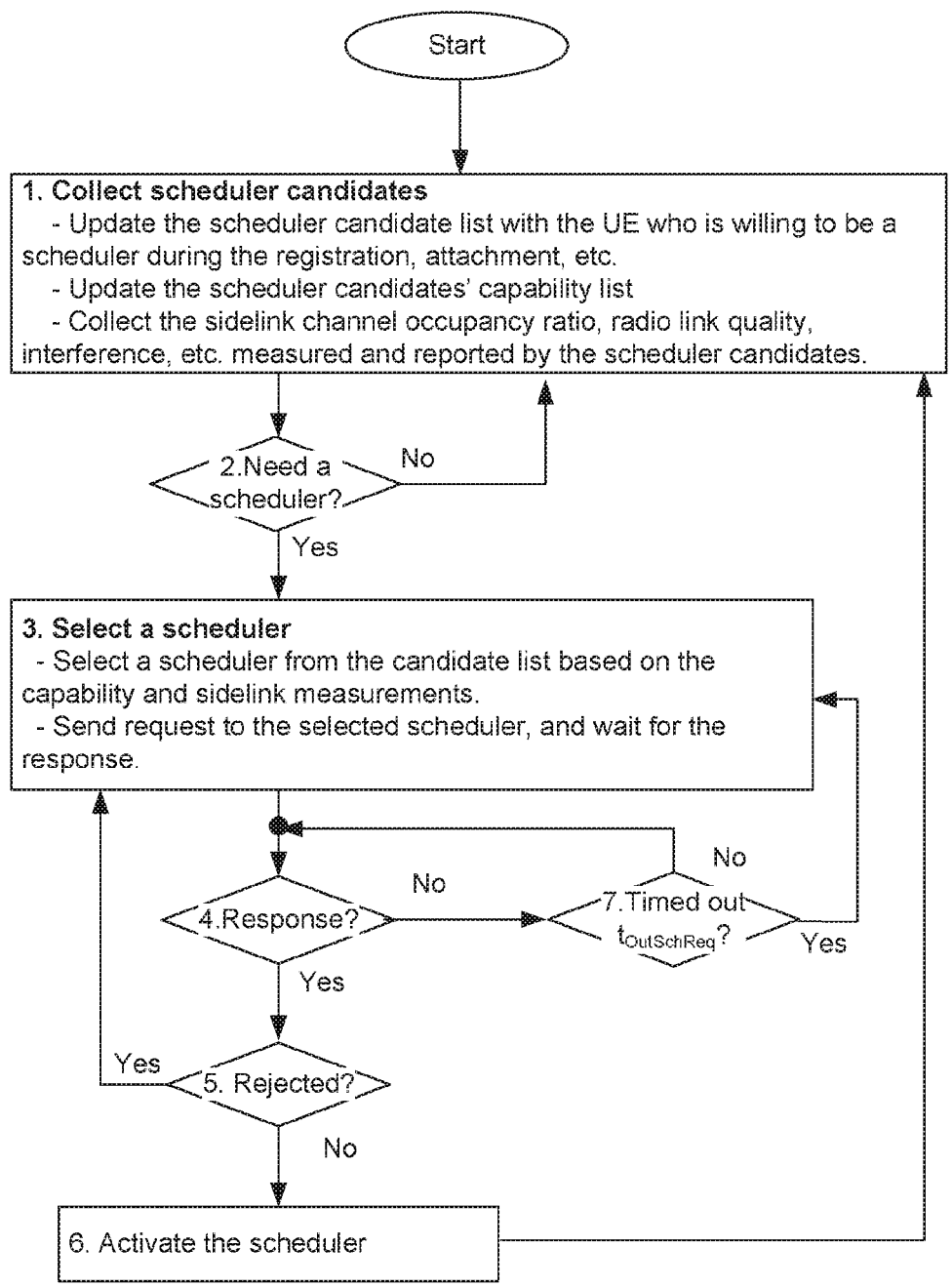
FIG. 18 shows an example of a network initiated scheduler selection with network control.

In alternative example, network (e.g. a gNB, a V2X server, or a scheduler selection controller) initiated scheduler selection is illustrated in FIG. 18, which is exemplified with the following steps.

At step 1, collect scheduler candidates: update the scheduler candidate list with the UE who is willing to be a Scheduler during the procedure of registration, attachment, etc.; update the scheduler candidates' capability list based on the UE's capability indication; update the scheduler candidates' location or location zone; collect the sidelink channel occupancy ratio, radio link quality, interference, etc. measured and reported by the scheduler candidates.

At step 2, check if a scheduler is needed. If no, move to Step 1; otherwise go to Step 3.

At step 3, select a scheduler: select a scheduler from the candidate list based on UE's capability, location, resource pool requirement, QoS requirements, sidelink measurements, etc.; send a request to the selected scheduler, and wait for the response.

At step 4, check if any response received. If no, move to Step 7; otherwise go to Step 5.

At step 5, check if a rejection in the response. If yes, move to Step 3 to select another scheduler; otherwise go to Step 6.

At step 6, activate the scheduler, e.g., indicated in RRC or MAC CE or Downlink Control Information (DCI) sent to the scheduler.

At step 7, check if timed out based on the higher layer parameter $t_{OutSchReq}$. If yes, move to Step 3 to select another scheduler; if no, move to Step 4 for response.

Figure 19A:
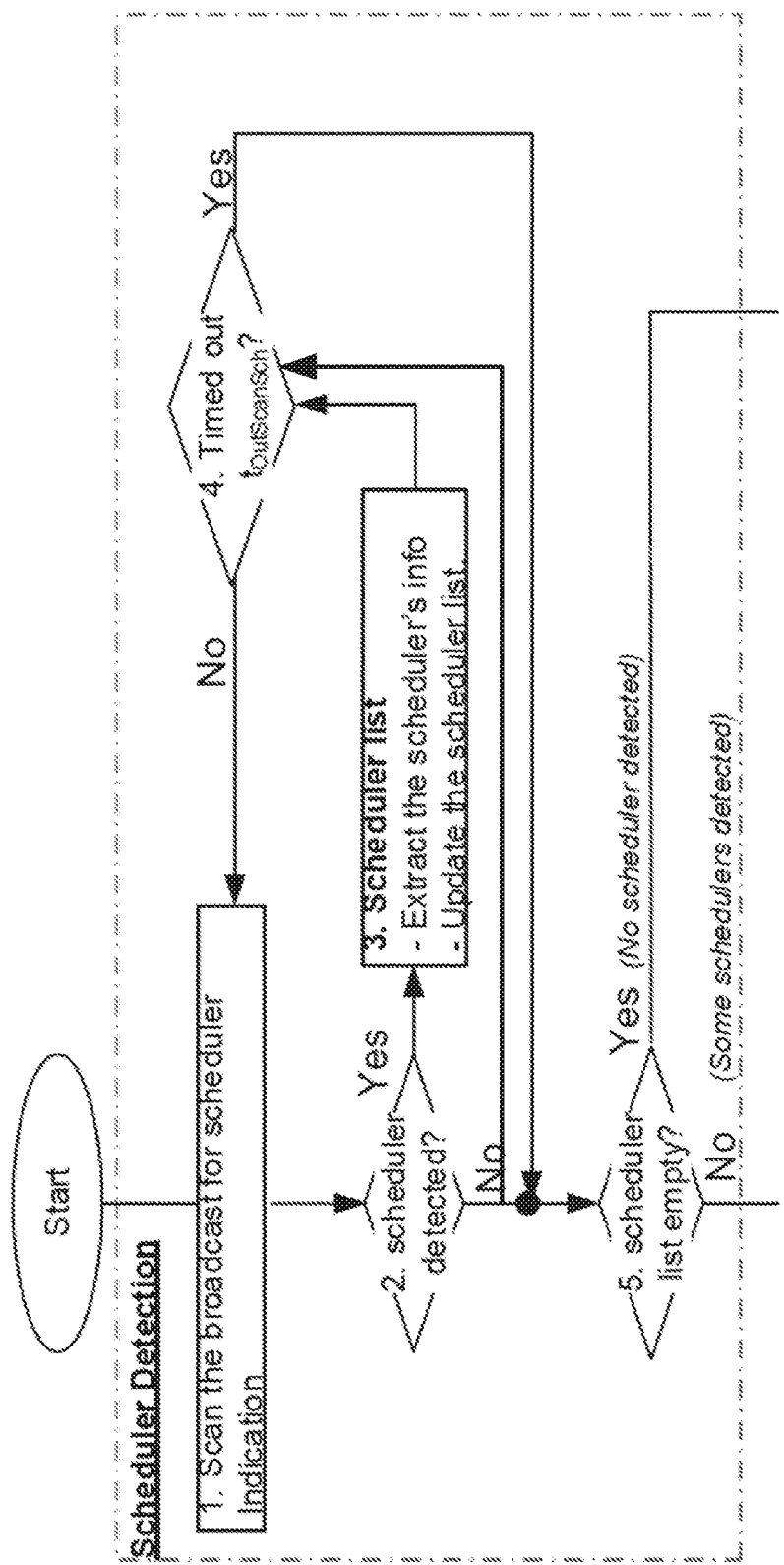
FIGS. 19A and 19B show an example of a scheduler election without network control.
Figure 19B:
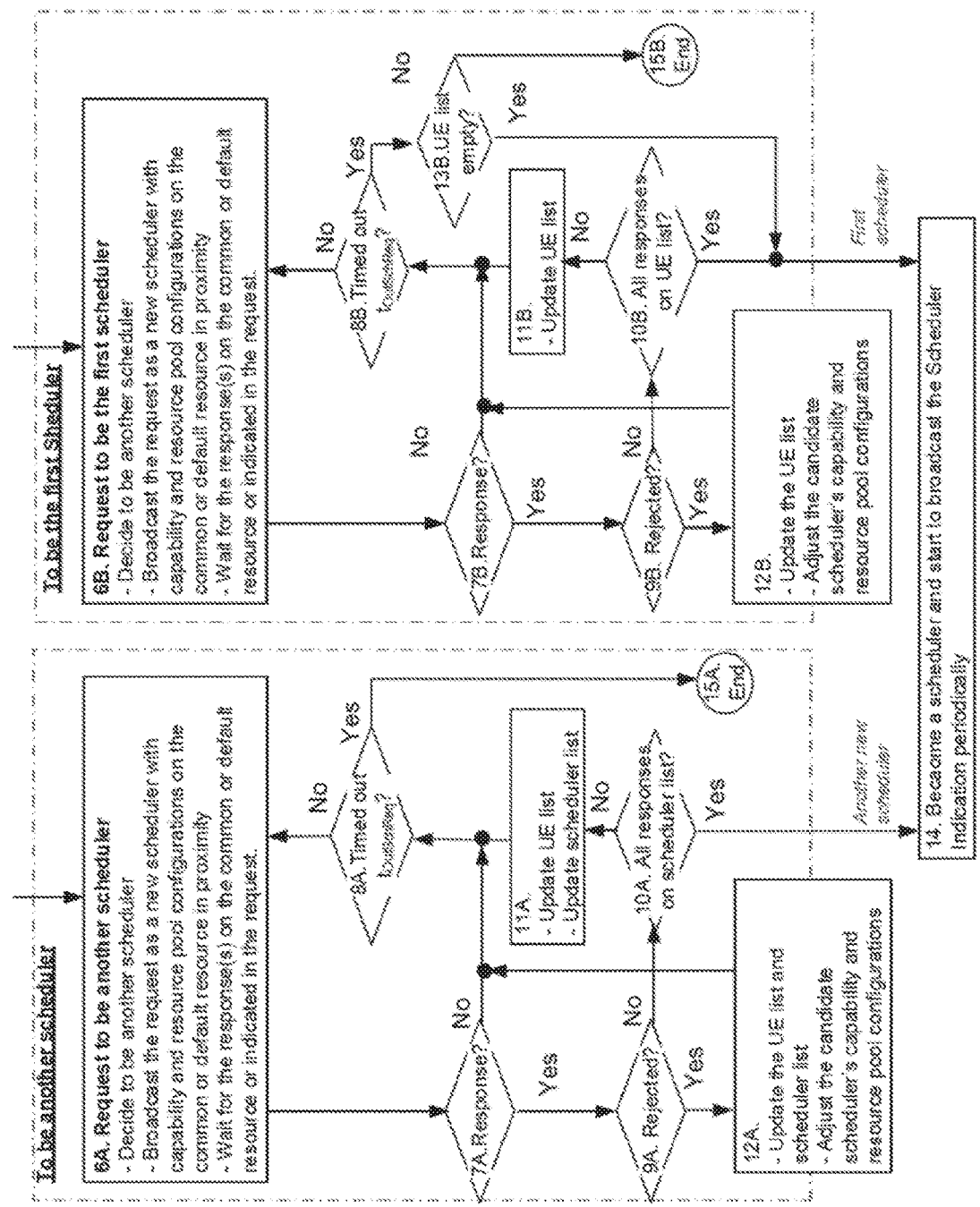

In an alternative example for a network controlled scheduler election, an example of scheduler election without network control is illustrated in FIGS. 19A and 19B, which is exemplified with the following steps.

At step 1, scan for the Scheduler Indication, which may be indicated by a scheduler's NR-PSBCH, NR-PSDCH, or broadcast NR-PSSCH.

At step 2, check if any scheduler detected. If no, move to step 4; otherwise go to step 3.

At step 3, if a scheduler is detected, extract the scheduler's info such as ID, resource pools, location or location zone, QoS requirements, etc.; update the scheduler list.

At step 4, check if timed out based on the higher layer parameter $t_{OutScanSch}$. If yes, move to Step 5; if no move to step 1 to continue scanning for scheduler.

At step 5, check if the scheduler list is empty or not. If yes, there is no scheduler in proximity, and move to Step 6B to request for the first scheduler in the proximity; if no, move to Step 6A to request for another scheduler in the proximity.

At step 6A/6B, request to be a scheduler: decide to be a scheduler as indicated by the higher layer or the application layer; broadcast the request as a new scheduler with capability, resource pool configurations, QoS requirements, and location or location zone on the common or default resource or the resource for broadcasting in proximity. The request may be a specially formatted SCI carried on NR-PSCCH, or a specially formatted SFCI carried on NR-PSFCCH or broadcast NR-PSSCH. Wait for the response(s) on the common or default or broadcasting resource or on the resource indicated in the request.

At step 7A/7B, check if any response. If yes. move to Step 9A/9B for checking a rejection; if no, move to Step 8A/8B to check time out.

At step 8A/8B, check if timed out based on the higher layer parameter $t_{OutSchReq}$. If no, move to Step 6A/6B to request to be a scheduler again; if 8A is yes, move to Step 15A to end; if 8B is yes, move to 13B to check UE list.

At step 9A/9B, check if rejection in the response. If yes, move to Step 12A/12B for updating UE's context; if no move to Step 10A/10B.

At step 10A/10B, check if one or more schedulers/UEs on the scheduler/UE list, e.g. schedulers or UEs in the proximity or in the communication range, have responded yes. If yes, move to Step 14.

At step 11A/11B, update UE list and update scheduler list for Step 11A. Update UE list for Step 11B based on the responses, e.g. schedulers or UEs in the proximity or communication range. Then move to Step 8A/8B for checking the timeout.

At step 12A/12B, update the UE list and scheduler list for 12A and update the UE list for Step 12B based on the responses; adjust the candidate scheduler's capability, resource pool configurations requirements, QoS requirements, etc. Then move to Step 8A/8B for checking timeout.

At step 13B, check if the UE list is empty or not. If yes, there is no another UE and move to Step 14 to be the first UE there as a scheduler; if no, move to Step 15B to end.

At step 14, become a scheduler and start to broadcast the Scheduler Indication periodically on its NR-PSBCH, NR-PSDCH, or broadcast NR-PSSCH.

Figure 20A:
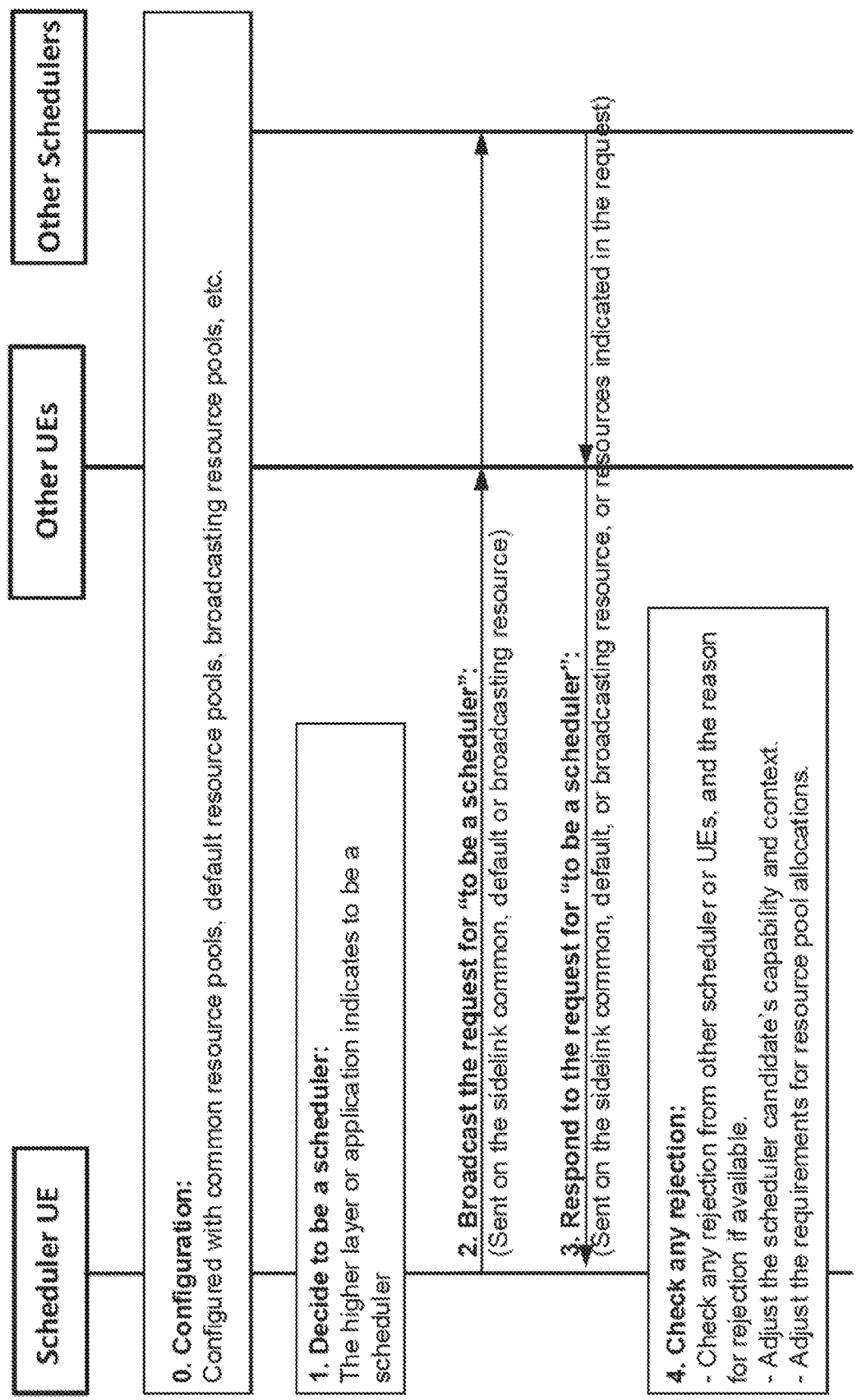
FIGS. 20A and 20B show an example call flow for scheduler election without network control.
Figure 20B:
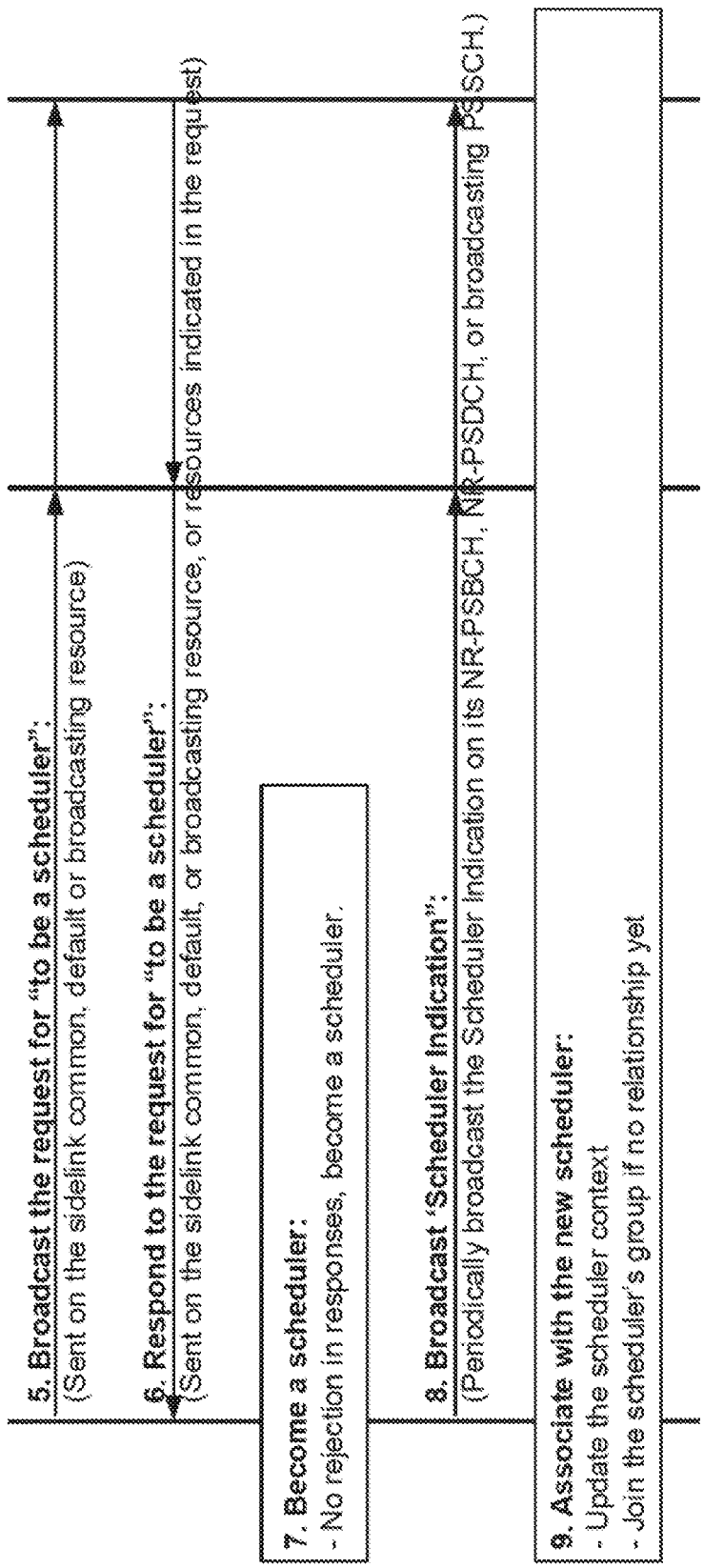

A call flow of scheduler election without network control is exemplified in FIGS. 20A and 20B, which may contain the following steps.

At step 0, configuration: scheduler UE, other UEs, and other schedulers are configured with common resource pools, default resource pools, broadcasting resource pools, etc. The configuration may be conducted by the manufacture, or service provider. Also, the configuration may be conducted by a gNB or a V2X server if under network coverage and network management.

At step 1, decide to be a scheduler: candidate scheduler UE's higher layer or application layer may pass an indication to be a scheduler.

At step 2, broadcast the request for "to be a scheduler": the candidate scheduler UE sends the request on the sidelink common, default or broadcasting resource. The request may include the UE's capability, location or location zone, resource pool requirement, and QoS requirements, as well as sidelink measurements such as interference, congestion, link quality, etc. The request may be a new format SCI carried on NR-PSCCH or a new format SFCI carried on NR-PSFCCH, or on a broadcast NR-PSSCH.

At step 3, respond to the request for "to be a scheduler": the other schedulers and/or other UEs in proximity may send the responses on the sidelink common, default, or broadcasting resource, or the resource indicated in the request. The response may be a new format SCI carried on NR-PSCCH or a new format SFCI carried on NR-PSFCCH, or on a broadcasting NR-PSSCH. The candidate scheduler UE may decode the responses and pass them to its higher layer.

At step 4, check any rejection: the candidate scheduler UE's higher layer may check any rejection carried on the responses from other scheduler or UEs, and the reason for rejection if available, then adjust the scheduler UE's capability and context, adjust the requirements for resource pool allocations, adjust the QoS requirements, etc.

At step 5, broadcast the request for "to be a scheduler": the candidate scheduler UE sends the request again with the updated UE context and other information, on the sidelink common, default or broadcasting resource. The request may include adjusted parameters from Step 4.

At step 6, respond to the request for "to be a scheduler": the other schedulers and/or other UEs in proximity may send the responses on the sidelink common, default, or broadcasting resource, or the resource indicated in the request. The candidate scheduler UE may decode the responses and pass them to its higher layer.

At step 7, become a scheduler: check no rejection in responses. Then become a scheduler.

At step 8, broadcast 'Scheduler Indication": the new scheduler UE periodically broadcast the Scheduler Indication on its NR-PSBCH, NR-PSDCH, or broadcasting PSSCH. The Scheduler Indication on NR-PSBCH may be a one-bit indication to flag if the UE is a scheduler or not. The Scheduler Indication on its NR-PSDCH or NR-PSSCH may be used during the discovery or association process. The Scheduler Indication on its NR-PSCCH or NR-PSSCH may be used by the UEs, who have established relationship with the scheduler UE already, to update the scheduler UE's context, e.g. it's a new scheduler, as well as other information such as the resource pool configurations managed by this new scheduler.

At step 9, associate with the new scheduler: the other UEs and/or schedulers update the new scheduler UE's context if relationship has been established already via message exchanges carried on NR-PSSCH, or join the new scheduler's group or pair or associate with the new scheduler if no relationship has been established yet via message exchanges carried on NR-PSDCH or NR-PSSCH for discovery or association process.

Figure 21:
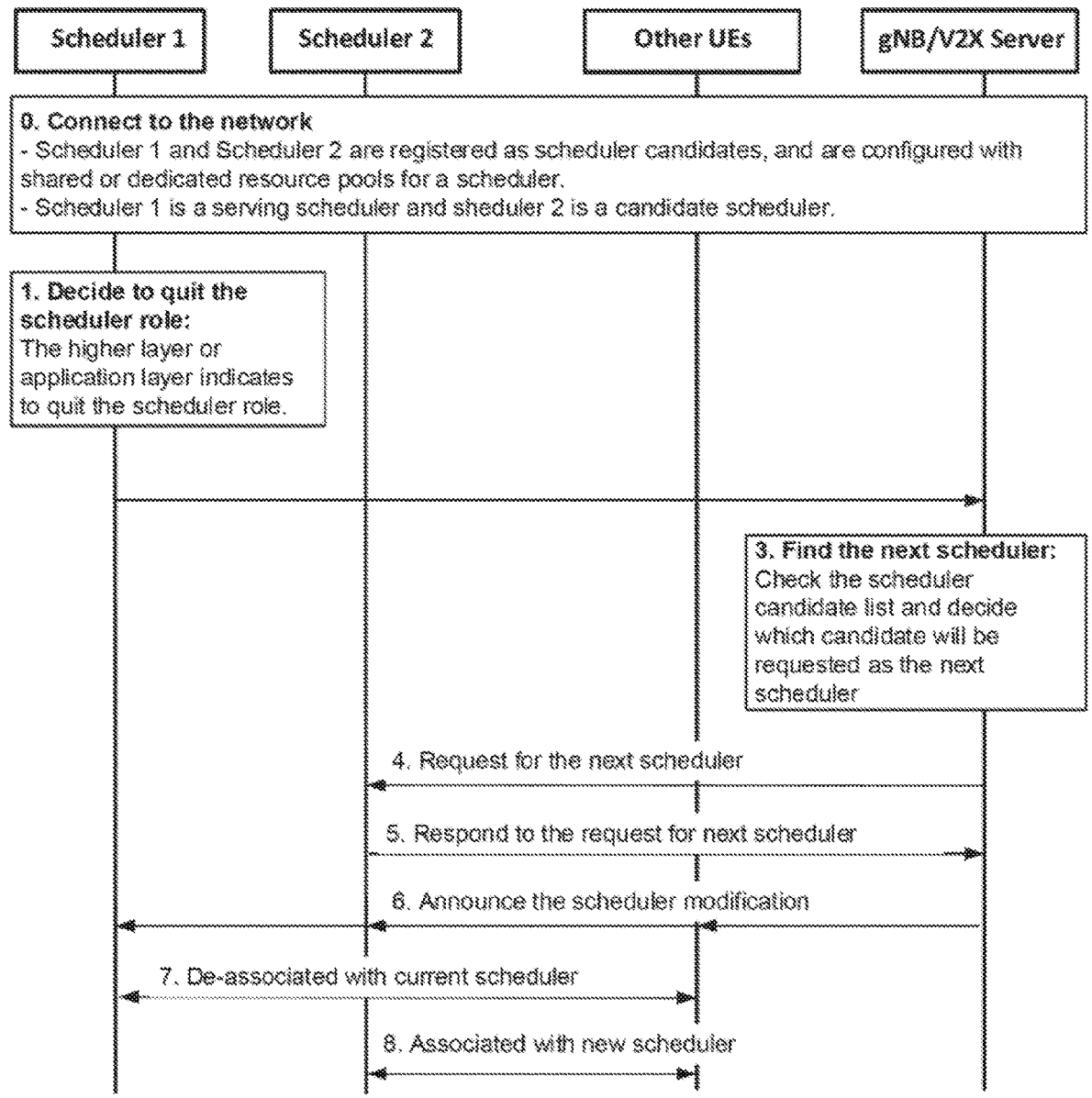
FIG. 21 shows an example call flow of scheduler modification with network control.

An example of scheduler modification with network control is exemplified in the call flow illustrated in FIG. 21, which may contain the following steps.

At step 0, connect to the network: Scheduler 1 and Scheduler 2 are registered as scheduler candidates, and are configured with shared or dedicated resource pools for a scheduler. Scheduler 1 is a serving scheduler and scheduler 2 is a candidate scheduler.

At step 1, decide to quit the scheduler role: Scheduler 1's higher layer or application layer indicates to quit the scheduler role.

At step 2, request for quit: Scheduler 1 sends a request to gNB or V2X Server for quitting the scheduler role. The request may be carried on a new format Physical Uplink Control Channel (PUCCH) or on Physical Uplink Shared Channel (PUSCH) if sent to gNB on NR Uu interface.

At step 3, find the next Scheduler: gNB or V2X Server checks the scheduler candidate list with the UE's capability and status such as the location or location zone, as well as the sidelink measurements reported by the candidate schedulers, and decides which candidate will be requested as the next scheduler.

At step 4, request for the next scheduler: gNB or V2X Server sends a request to the candidate scheduler(s), e.g., Scheduler 2, which may be carried on a new format Physical Downlink Control Channel (PDCCH) or Physical Downlink Shared Channel (PDSCH) if sent from gNB on NR Uu interface.

At step 5, respond to the request for next scheduler: the candidate scheduler(s), e.g., Scheduler 2, may respond to the request with accept or reject information, which may be carried on a new format PUCCH or PUSCH. If rejected, the gNB or V2X server may reselect a candidate scheduler(s) and send the request to the newly selected candidate scheduler(s).

At step 6, announce the scheduler modification: the gNB may send activation RRC, MAC CE or DCI to the new scheduler (e.g., Scheduler 2), send deactivation RRC, MAC CE or DCI to the old scheduler (e.g., Scheduler 1), and broadcast to all UEs about the scheduler modification via PDCCH, PDSCH, a new physical broadcast channel, or combination of them. The V2X Server may send confirmation message to Scheduler 1 and Scheduler 2 respectively, and make announcement to all UEs for the scheduler modification.

At step 7, de-associated with old scheduler: the UEs may de-associate with the old scheduler, e.g. Scheduler 1, by sending a notice to it, on sidelink, and then remove the old scheduler's context after the confirmation is received from the old scheduler.

At step 8, associated with new scheduler: the UEs may associate with the new scheduler, e.g., Scheduler 2, by sending a pairing or associationg request to the new UE, and then save the new scheduler's context received from the new scheduler's response.

The association and de-association request and response messages over sidelink interface may be carried on a new format NR-PSCCH with SCI, NR-PSFCH with SFCI, or on NR-PSSCH with SCI or SFCI multiplexed, or on a special mapped NR-PSSCH at higher layer.

Figure 22:
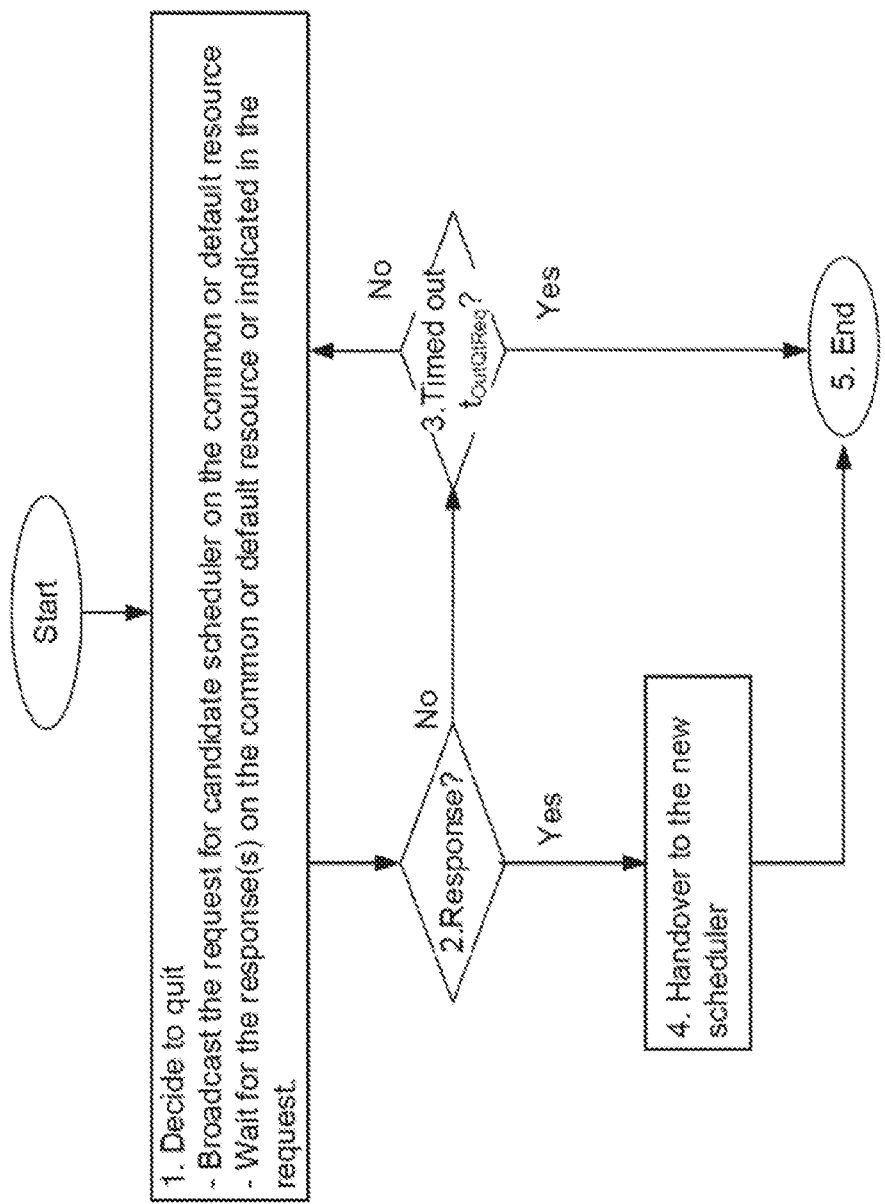
FIG. 22 shows an example of a scheduler modification without network control.

An example of scheduler replacement without network control is exemplified in FIG. 22, which may contain the following steps.

At step 1, decide to quit: the higher layer or application layer indicates to quit the scheduler role. Broadcast the request for a candidate scheduler on the common or default resource. The request may be carried on a new format SCI on NR-PSCCH or a new format SFCI on NR-PSFCCH or on broadcast NR-PSSCH. Wait for the response(s) on the common or default resource or indicated in the request.

At step 2, check if any response. If yes, move to Step 4 for handover; if no, move to Step 3 for checking timeout.

At step 3, check if timed out based on higher layer parameter $t_{OutQtReq}$. If yes, move to Step 5 to end; if no, move to Step 1 to resend the request.

At step 4, handover to the new scheduler: the current scheduler may pass scheduler context, other associated UE context, as well as the resource pool configuration to the new scheduler.

At step 5, to end: if no candidate scheduler's response, hard stop without any context exchange.

Figure 23:
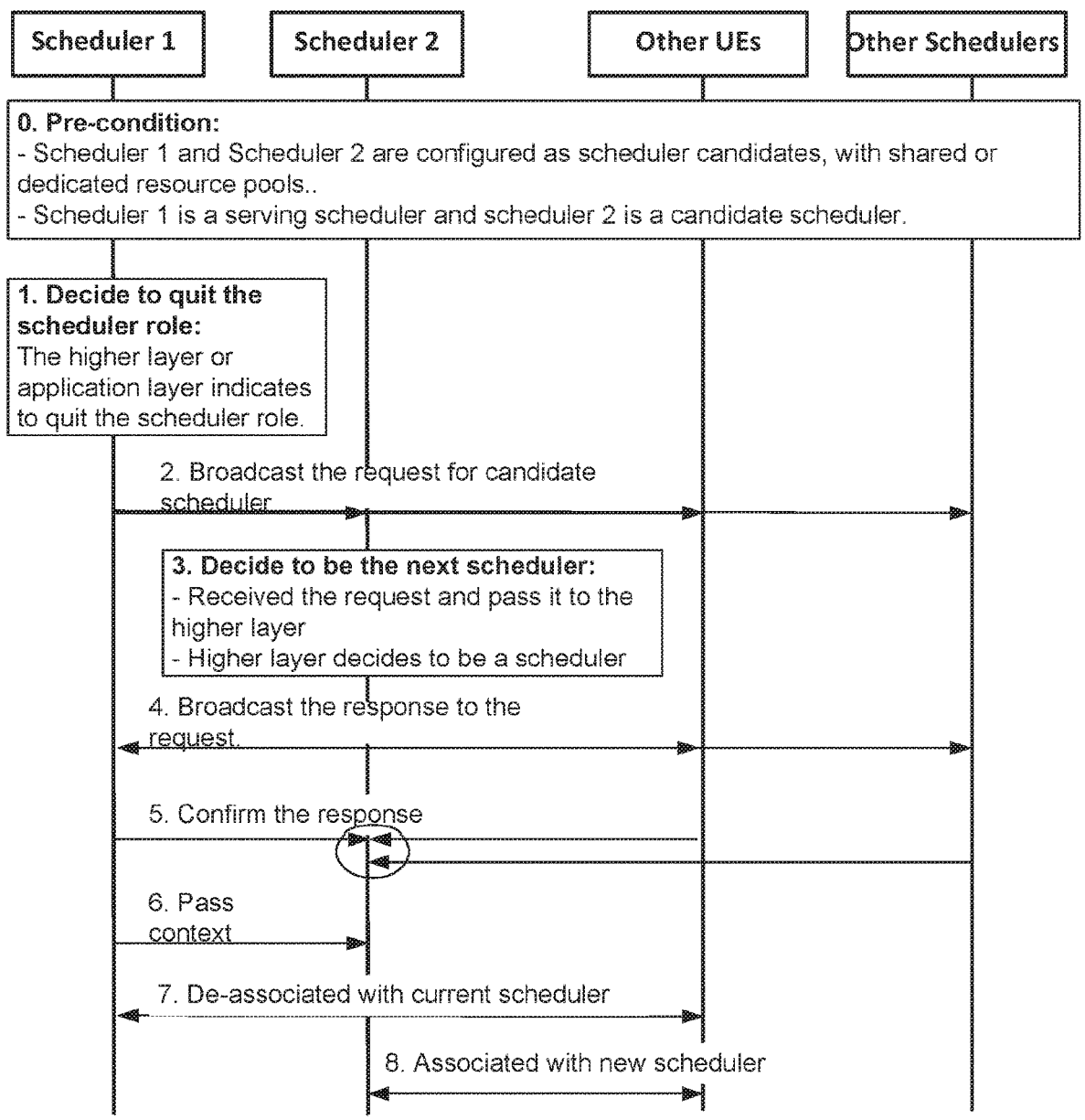
FIG. 23 shows an example call flow for scheduler modification without network control.

A call flow of scheduler replacement without network control is exemplified in FIG. 23, which may contain the following steps.

At step 0, pre-condition: Scheduler 1 and Scheduler 2 are configured as scheduler candidates, with shared or dedicated resource pools. Scheduler 1 is a serving scheduler and scheduler 2 is a candidate scheduler.

At step 1, decide to quit the scheduler role: the higher layer of the current scheduler, e.g. Scheduler 1, indicates to quit the scheduler role.

At step 2, broadcast the request for candidate scheduler: the current scheduler, e.g., Scheduler 1, may broadcast request for candidate scheduler on the common or default resource. The request may be carried on a new format SCI on NR-PSCCH, or a new format SFCI on NR-PSFCCH, or SCI or SFCI multiplexed with PSSCH, or broadcast NR-PSSCH.

At step 3, decide to be the next scheduler: a scheduler candidate, e.g., Scheduler 2, may decode the request and pass it to the higher layer. The higher layer may decide to be the next scheduler.

At step 4, broadcast the response to the request: the scheduler candidate, e.g., Scheduler 2, broadcast the response to the request on the common or default resource. The response may be carried on a new format SCI on NR-PSCCH or a new format SFCI on NR-PSFCCH or broadcasting NR-PSSCH.

At step 5, confirm the response: the candidate scheduler, e.g., scheduler 2, may receive confirmation from the current scheduler, from Other UEs, and/or from Other schedulers. The confirmation may be carried on a new format SCI on NR-PSCCH or a new format SFCI on NR-PSFCCH or NR-PSSCH.

At step 6, pass context: The current scheduler, e.g. Scheduler 1, passes context, resource pool configurations, etc. to the candidate scheduler over sidelink, which may be carried on NR-PSSCH.

At step 7, de-associated with old scheduler: the UEs may de-associate with the old scheduler, e.g. Scheduler 1, by sending a notice to it, on sidelink, and then remove the old scheduler's context after the confirmation is received from the old scheduler.

At step 8, associated with new scheduler: the UEs may associate with the new scheduler, e.g., Scheduler 2, by sending a pairing request to the new UE, and then save the new scheduler's context received from the new scheduler's response.

Resource Allocation Mode Switching

Resource allocation may be conducted with different operation mode, for example sidelink resource allocation fully controlled by a gNB or eNB (e.g., Mode 1); sidelink resource allocation based on sidelink sensing and resource selection (e.g., Mode 2(a)); sidelink resource allocation based on pre-configuration or configuration from gNB or eNB (e.g., Mode 2(c)); sidelink resource allocation managed by a scheduler, e.g. a scheduling UE (e.g., Mode 2(d)). One or more than one mode combined may be configured and activated for a vehicle UE to communicate on sidelink. Also, a UE may select or be directed to switch from one mode to another mode.

Resource allocation mode may be configured, indicated or modified by a gNB via RRC, MAC CE, physical channels (e.g. PDCCH, PDSCH, PUCCH, PUSCH, etc.), or combination of them over Uu interface or by an RSU or a UE via SL-RRC, SL-MAC CE, sidelink physical channels (e.g. NR-PSCCH, NR-PSFCH, NR-PSSCH, etc.), or combination of them over sidelink (PC5) interface. Resource allocation mode may also be activated and deactivated by a gNB via RRC, MAC CE, or DCI over Uu interface or by an RSU or a UE via SL-RRC, SL-MAC CE or SCI over sidelink (PC5) interface.

Resource allocation mode may also be indicated by other signal or channels at physical layer, such as NR-PSBCH, NR-PSDCH, NR-PSCCH, NR-PSFCH, NR-PSSCH, or combination of them.

Figure 24A:
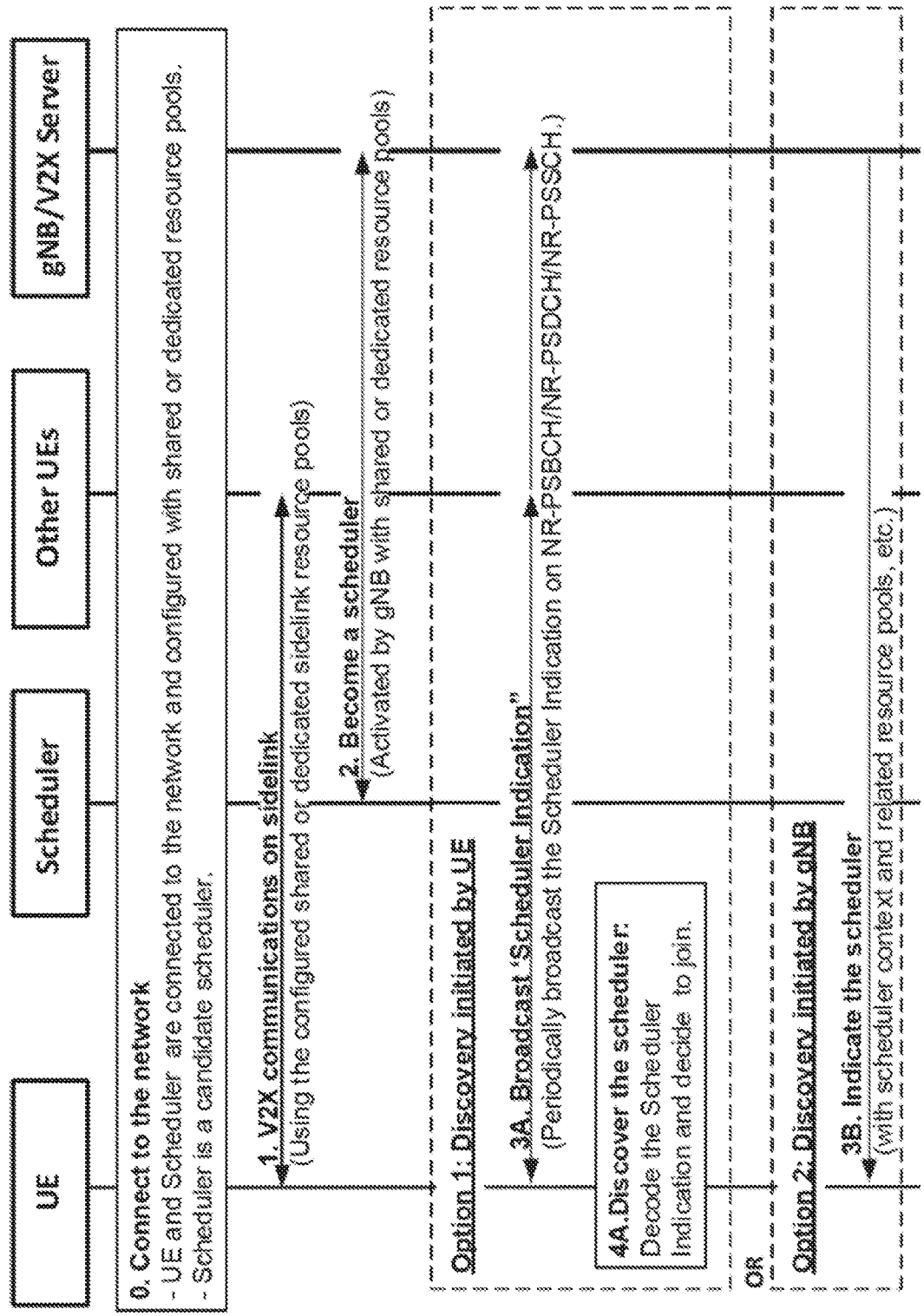
FIGS. 24A and 24B show an example call flow for resource allocation mode switching with network control.
Figure 24B:
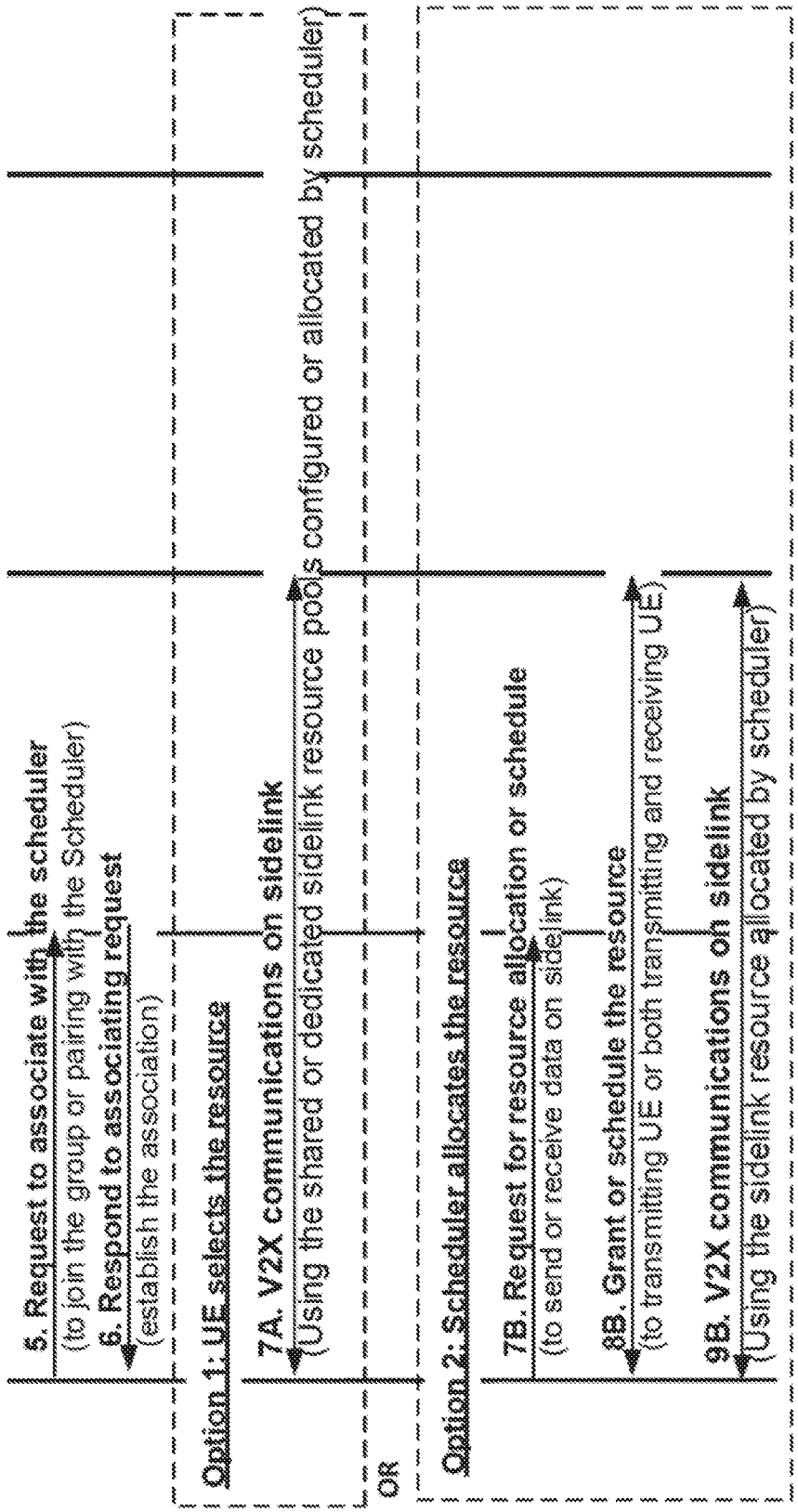

An example of resource allocation mode switching, e.g. between sensing based (e.g., Mode 2(a)) and scheduling based (e.g., Mode 2(d)) with network control is exemplified in FIGS. 24A and 24B, which may contain the following steps.

At step 0, connect to the network: the UE(s) and the Scheduler are connected to the network and configured with shared or dedicated resource pools. The scheduler is a candidate scheduler.

At step 1, V2X communications on sidelink: the UE communicate with the Other UEs on sidelink using the configured shared or dedicated sidelink resource pools. For shared resource pools, the UE may need to do sensing and resource reservation for resource allocation; or the UE may need to sense the channel over the available resource for more dynamic resource allocation.

At step 2, become a scheduler: the Scheduler is activated by gNB as a new scheduler with shared or dedicated resource pools allocated.

For Option 1: scheduler discovery initiated by UE:

At step 3A, broadcast 'Scheduler Indication": the scheduler may periodically broadcast Scheduler Indication on its NR-PSBCH/NR-PSDCH/NR-PSSCH.

At step 4A, discover the scheduler: the vehicle UE may decode the Scheduler Indication and pass it to its higher layer. The higher layer decides to join the Scheduler.

For Option 2: discovery initiated by gNB:

At step 3B, indicate the scheduler: the gNB may send an indication of the Scheduler via broadcast (e.g., on PDSCH or a new broadcast channel), groupcast (e.g., on PDSCH or a new groupcast channel) or unicast (e.g., on PDSCH) message to UE(s) and direct the UE(s) to join the Scheduler and switch to the resource allocation mode which is managed by the Scheduler. The gNB may send the indication by a RRC, MAC CE, or DCI activation, activating the Scheduler to UE or activating a new resource allocation mode to UE, as well as activating the resource pools.

For both Option 1 and Option 2:

At step 5, request to associate with the scheduler: the vehicle UE may send a request with NR-PSCCH or NR-PSFCH or NR-PSSCH to the Scheduler to join the Scheduler's group or to pair with the Scheduler.

At step 6, respond to associating request: the Scheduler may respond to UE's request to establish the association, which may be carried on NR-PSCCH or NR-PSFCH or NR-PSSCH.

For Option 1: UE selects the resource(s) configured or semi-persistently scheduled by the scheduler At step 7A, V2X communications on sidelink: the UE may communicate with the Other UEs on the sidelink by selecting the shared or dedicated sidelink resource pools or resources configured, or semi-statically allocated by scheduler (e.g., indicated by an activation SL-RRC, SL-MAC CE, or SCI).

For Option 2: Scheduler dynamically allocates the resource(s), e.g., dynamically scheduling.

At step 7B, request for resource allocation or schedule: the UE may send a request to the Scheduler for resource(s) to send to or receive from the Other UE(s) on sidelink.

At step 8B, grant or schedule the resource: the Scheduler may grant or schedule the resource(s) to transmitting UE or to both transmitting and receiving UE indicated by SA SCI carried on NR-PSCCH.

At step 9B, V2X communications on sidelink: the UE communicate with the Other UE(s) using the sidelink resource dynamically allocated by the Scheduler via SA SCI.

Figure 25A:
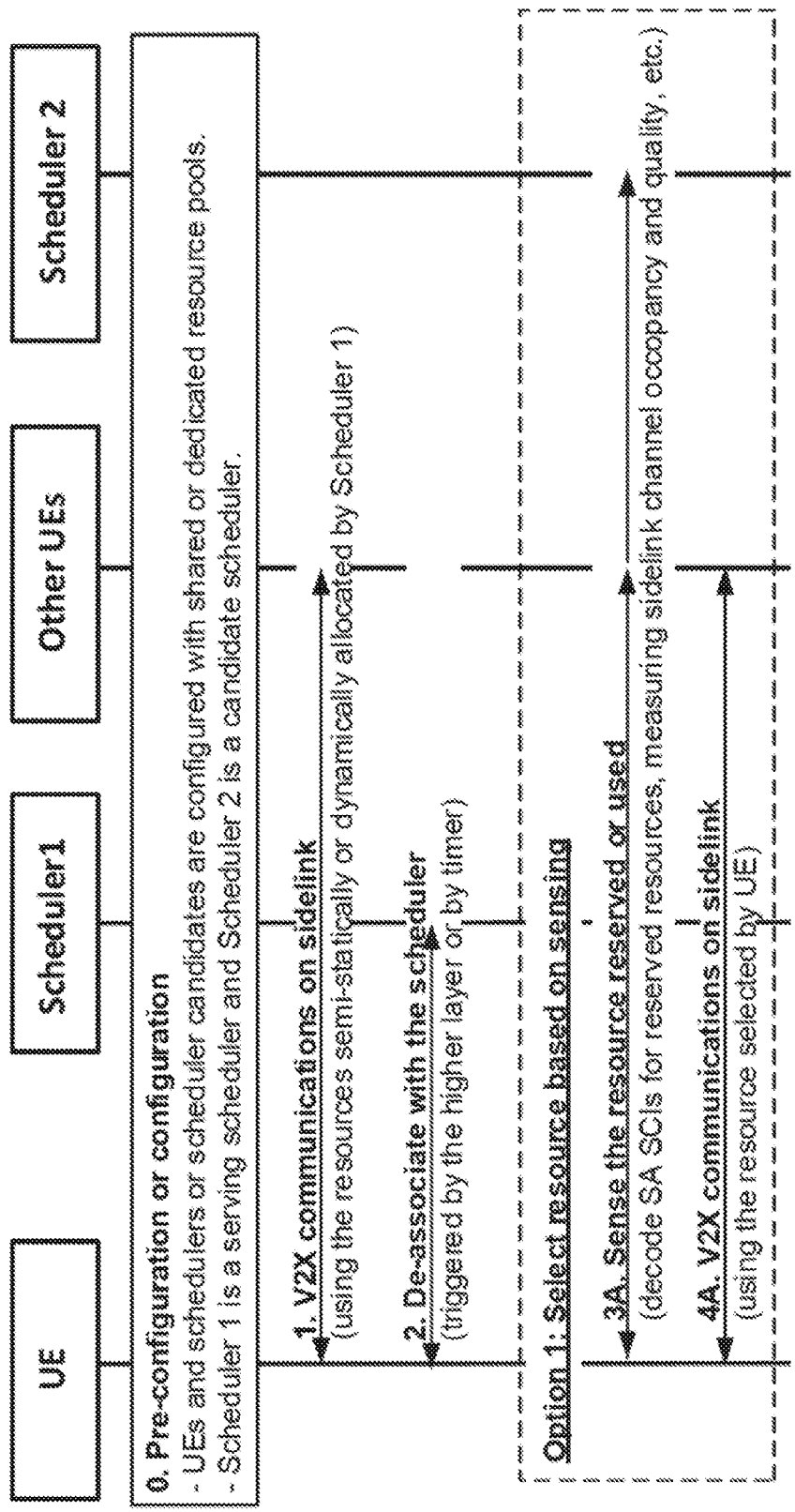
FIGS. 25A and 25B show an example call flow for resource allocation mode switching without network control.
Figure 25B:
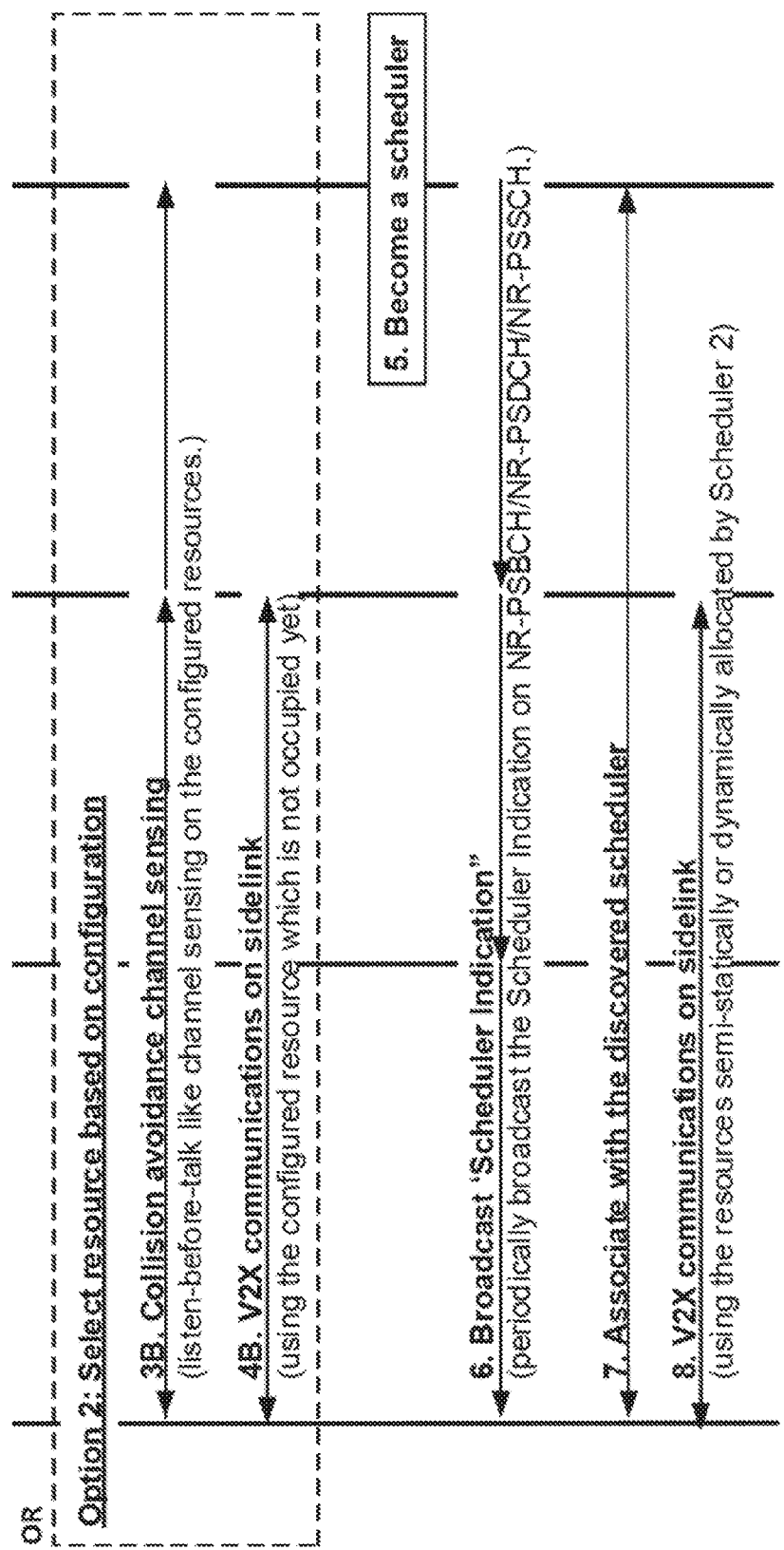

An example of resource management mode switching without network control is exemplified in FIGS. 25A and 25B, which may contain the following steps.

At step 0, pre-configuration or configuration: the UEs and schedulers or scheduler candidates are configured with shared or dedicated resource pools. Scheduler 1 is a serving scheduler and Scheduler 2 is a candidate scheduler.

At step 1, V2X communications on sidelink: the vehicle UE communicates with the other UEs on sidelink using the resources semi-statically or dynamically allocated by Scheduler 1.

At step 2, de-associate with the scheduler: the UE de-associated with the Scheduler 1, which may be triggered by the higher layer (e.g., leaving the proximity of Scheduler 1) or by timer (e.g., beam failure timer or out of synchronization timer). UE may switch to non-scheduler managed resource allocation mode as exemplified as Option 1 and Option 2 in next steps. For Option 1: Select the resource based on sensing:

At step 3A, sense the resource reserved or used: the UE may select the resource(s) based on sensing (e.g., decode SA SCIs sent from other UEs in the proximity for reserved or used resources), and/or measuring sidelink channel occupancy and quality, etc.

At step 4A, V2X communications on sidelink: the vehicle UE communicates with the Other UEs on sidelink using the resource(s) selected by itself.

For Option 2: Select resource based on configuration:

At step 3B (optional) Collision avoidance channel sensing: optionally, especially for the shared resources configured, the UE may conduct channel sensing, e.g., using listen-before-talk like channel sensing on the configured resources.

At step 4B, V2X communications on sidelink: the UE communicates with the Other UE(s) on sidelink using the configured resource which is not occupied if channel sensing is used at Step 3B.

For both options:

At step 5, become a scheduler: the Scheduler 2 become a new scheduler in the UE's proximity.

At step 6, broadcast 'Scheduler Indication": the Scheduler 2 may periodically broadcast the Scheduler Indication on its NR-PSBCH/NR-PSDCH/NR-PSSCH.

At step 7, associate with the discovered scheduler: the UE may discover the Scheduler 2 and associate with the scheduler accordingly.

At step 8, V2X communications on sidelink: the UE may switch the resource allocation mode and communicate to the Other UE(s) on sidelink by using the resource(s) semi-statically or dynamically allocated by Scheduler 2.

Request and response messages for different purposes as described herein may be carried on new format PSCCH with SCI, NR-PSFCH with SFCI, NR-PSSCH with SCI or SFCI multiplexed, or spatially mapped NR-PSSCH at higher layer.

Examples of Resource Allocation

NR supports many different numerology, which may contain different numbers of slots within a subframe, e.g., one slot per subframe for 15 KHz subcarrier space and 2 slots per subframe for 30 KHz subcarrier space. For simplify the illustration, slot is used in the examples. However, a slot structure depicted in an example may also be applicable to a subframe.

Figure 11:
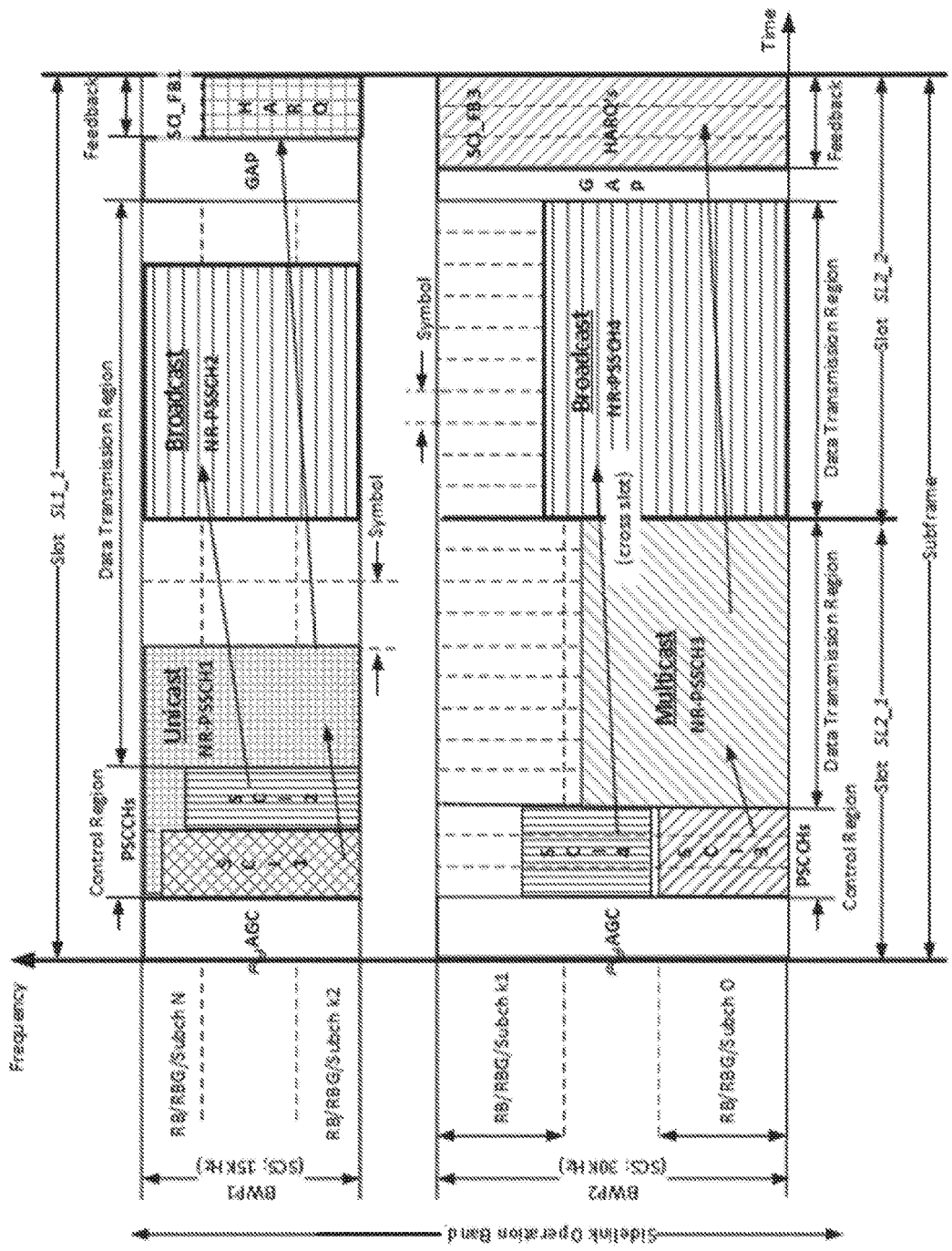
FIG. 11 exemplifies broadcast, multicast and unicast resources allocated or scheduled within a sidelink operation band or of a sidelink resource pool.
Figure 12:
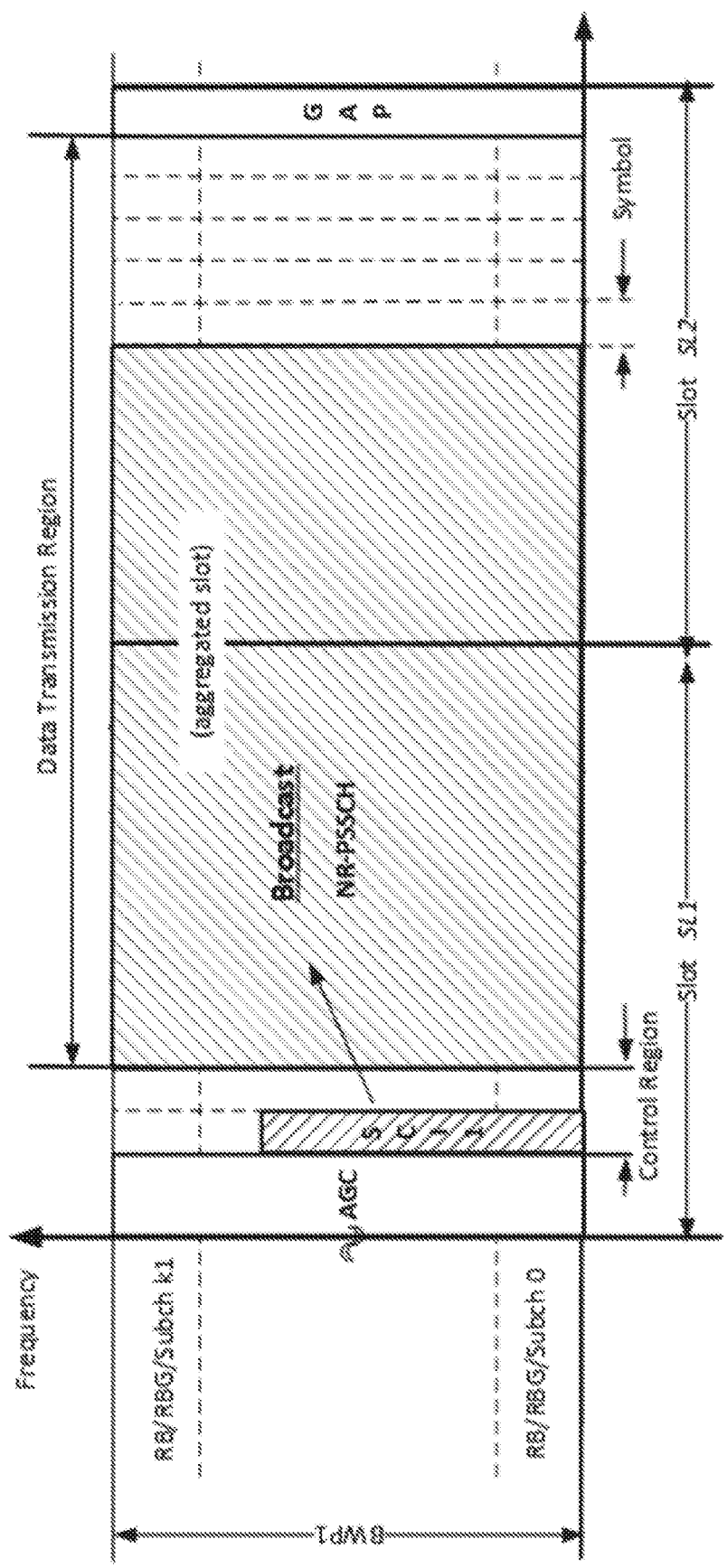
FIG. 12 depicts an example of aggregated slot scheduling on sidelink, where a broadcast transmission on the PSSCH is across the slot boundary between slot SL1 and slot SL2.
Figure 13:
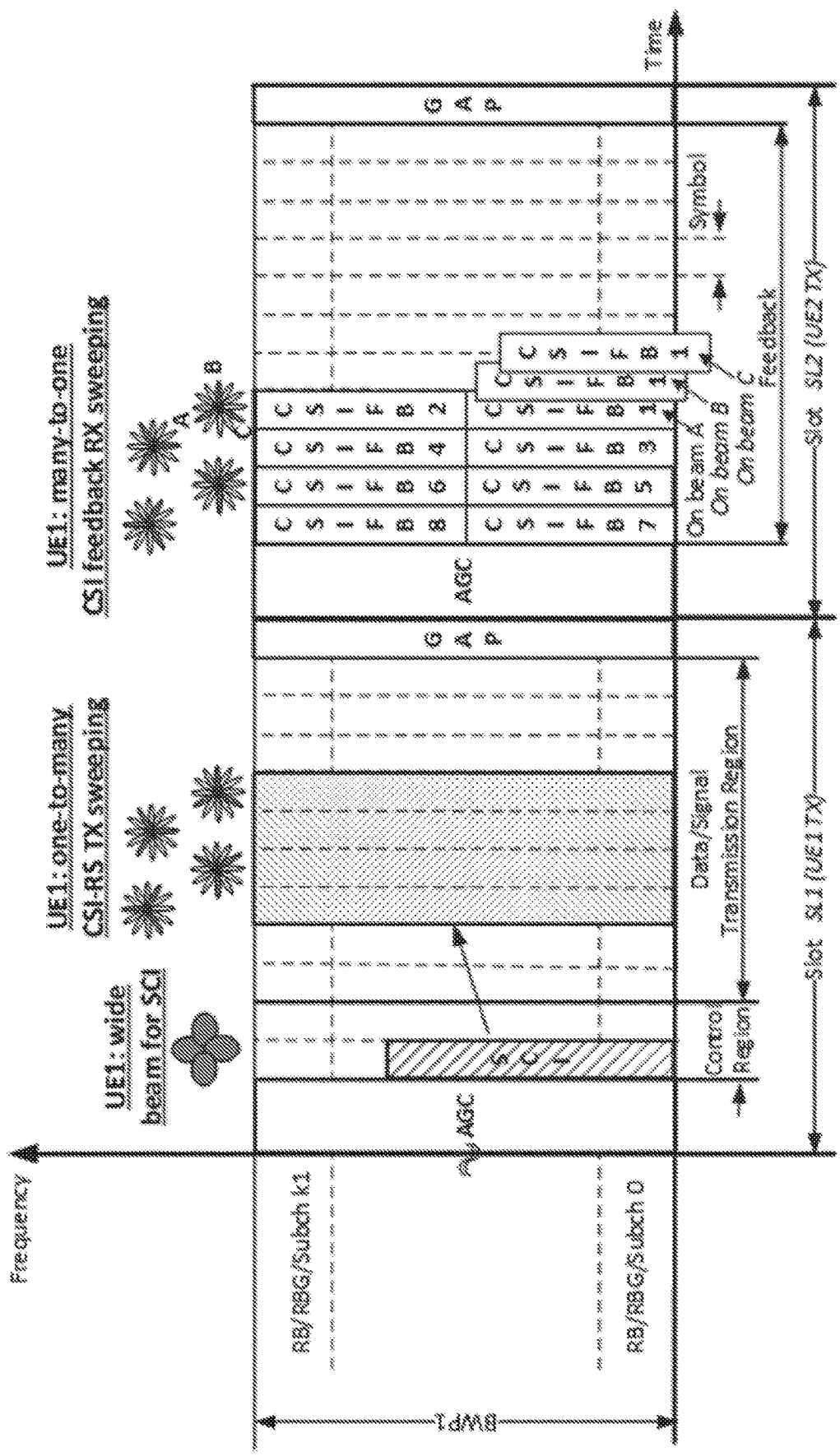
FIG. 13 illustrates an example of Sidelink Channel State Information (SL-CSI) acquisition.
Figure 14:
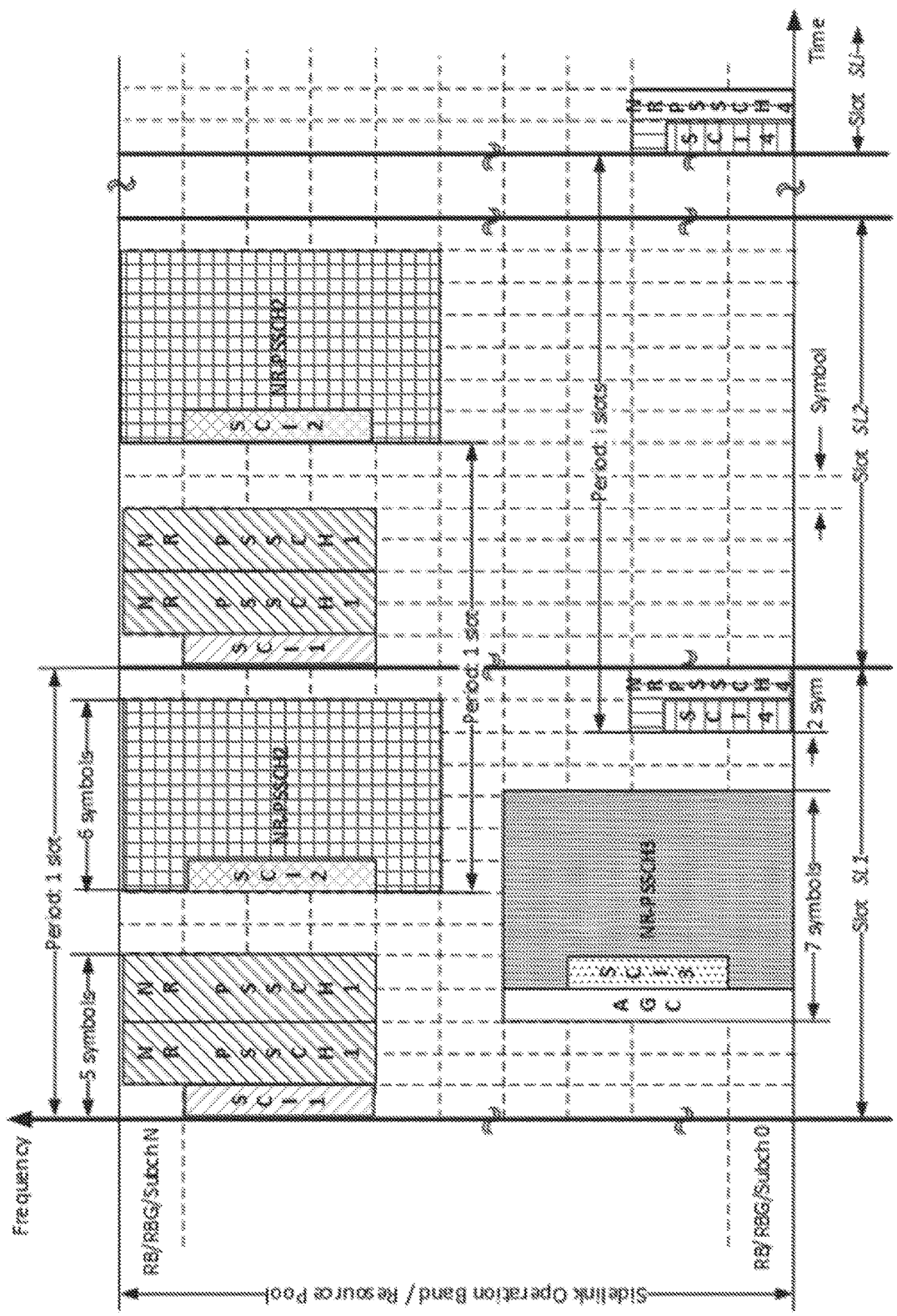
FIG. 14 illustrates mini-slot based scheduling.

A few examples are illustrated in FIG. 11, FIG. 12, FIG. 13, FIG. 14 for resource allocation or scheduling on sidelink with different slot and mini-slot structures. Slot based resource allocation or scheduling examples are shown in FIG. 11, FIG. 12, and FIG. 13, where the Scheduling Assignment (SA) SCIs on NR-PSCCH are not necessarily adjacent to the associated NR-PSSCH carrying the data in time and may be on the same or different beam depending on if the NR-PSCCH and NR-PSSCH are fully or partially Quasi-CoLocationed (QCLed) respectively on sidelink. Mini-slot based resource allocation or scheduling examples are shown in FIG. 14, where the Scheduling Assignment (SA) SCIs on NR-PSCCH are adjacent to the associated NR-PSSCH carrying the data in time and may be more efficient if carried on the same beam on sidelink.

FIG. 11 exemplifies broadcast, multicast and unicast resources allocated or scheduled within different BWPs of a sidelink operation band, e.g., BWP1 and BWP 2, using different numerologies. For example, BWP1 with the bandwidth from RB/RBG/Subchannel k2 to RB/RBG/Subchannel N has Sub-Carrier Space (SCS) of 15 KHz and BWP2 with the bandwidth from RB/RBG/Subchannel 0 to RB/RBG/Subchannel k1 has SCS of 30 KHz.

As illustrated in FIG. 11, different slot structure may be formed based on the data to be transmitted, timeline, as well as the feedback from the receiving vehicle UE(s).

For example, Slot "SL1_1" of BWP1 may optionally contain a first symbol (depending on the numerology, e.g. the symbol length, as well as the AGC settling time requirement) for a receiver's Automatic Gain Control (AGC) which may be sequence based or modulated data based design (e.g., using dummy data or randomly generated data or user data) for pre-condition the receiver's AGC setting; 2 symbols as an example herein as the Control Region for the SA SCIs (e.g., SCI1 for a short latency unicast on NR-PSSCH 1 and SCI2 for a broadcast on NR-PSSCH2) carried on NR-PSCCH and its SideLink Demodulation Reference Signal (SL-DMRS) for indicating the resource locations for the associated NR-PSSCH (e.g., NR-PSSCH1 and NR-PSSCH2) carrying data; a few symbols for data and/or Reference Signal (RS) transmissions, such as SideLink Demodulation Reference Signal (SL-DMRS) for NR-PSSCH, SideLink Channel State Information Reference Signal (SL-CSI-RS) for Sidelink Channel State Information (SL-CSI) report, SideLink Phase-tracking Reference Signal (SL-PTRS) for tracking frequency and/or phase, SideLink Positioning Reference Signal (SL-PRS) for location measurement, etc.; one symbol (depending on the numerology, e.g. the symbol length, as well as a vehicle UE's switching time) for example herein as a gap for a vehicle UE to switch from receiving to transmitting or vice visa; a few symbols optionally at the end if feedback is needed on sidelink from a receiving vehicle UE, e.g. 1 symbol for the HARQ ACK/NACK feedback on feedback SCI "SCI_FB1" (for simplifying the illustration, its AGC signal is not shown in the figure) for the short latency unicast carried on NR-PSSCH1. This slot structure, as self-contained, has data or signal exchanges at both directions, e.g., between one transmitting vehicle UE and one or multiple receiving vehicle UEs. For SA SCI and data NR-PSSCH, the resource mapping may be frequency first, e.g., filling in the Resource Elements (RE) along the frequency dimension of a first symbol, then filling in the REs along the frequency dimension of a second symbol, and so on. For example, the SA SCI1 fills in the first symbol of the control region, and the SA SCI2 fills in the second symbol of the control region. Similarly, NR-PSSCH1 and NR-PSSCH2 are mapped with frequency first. The 1-bit HARQ ACK/NACK carried on SCI_FB1 may be a sequence based design.

For example, Slot "SL2_1" of BWP2 may contain first two symbols (e.g. with larger SCS or narrower symbol, 2 symbols as an example herein) for AGC; 3 symbols as an example as the Control Region for the SA SCIs (e.g., SCI3 for a multicast on NR-PSSCH3 and SCI4 for a broadcast on NR-PSSCH4 in next slot "SL2_2") carried on NR-PSCCH and it SL-DMRS; a few symbols for data and/or Reference Signal (RS) transmissions, such as SL-DMRS, SL-CSI-RS, SL-PTRS, SL-PRS, etc., e.g. Data Transmission Region. Since the SA SCI4 indicates a cross slot resource allocation or scheduling, the gap and feedback symbols may not be required herein. Slot "SL2_2" carrying a cross slot allocated or scheduled broadcast transmission on NR-PSSCH4 from the same transmitting vehicle UE, may start with a few symbols for NR-PSSCH4, then a symbol for gap and 3 symbols as an example herein for the HARQ feedbacks from all or some of the receiving vehicle UEs of the multicast message on PSSCH3 in previous slot "SL2_1".

The multiple bits of HARQ ACKs/NACKs from all or some of the receiving vehicle UEs may be UE specific sequence based design which may be multiplexed over the same or different symbols or may be modulated symbol based design, with each mapped to a group of RBs over different symbols in time or group of RBs in frequency depending time first or frequency first mapping. For example, multiple HARQ feedbacks from receiving UEs, may be mapped with frequency first, e.g., UE1 and UE2's feedback in a first symbol for feedback and UE3 and UE4's in a second symbol for feedback, etc. The time first mapping is for example filling in the first symbol in time with a first RBG or a first RB and then filling in the second symbol in time with a second RBG or a second RB, and so on. Time first mapping is exampled herein for SA SCI3 and SCI4 and PSSCH3 and PSSCH4.

To maintain the orthogonality, all the UEs sending HARQ ACK/NACKs to the transmitting UE need to be synchronized at the transmitting UE's receiver, e.g. need to properly adjust the Timing Advance (TA) caused by a signal's propagation delay in air. This is a typical case for a multicast's many-to-one feedback design. Since multicast is receiving-UE-aware communication, e.g. the communication is conducted within a group and a UE needs to conduct procedures for discovering a group in proximity and joining the group to be a member of the group. The Timing Advance info may be exchanged among UEs within a group. For a group based multicasting in proximity, a signal's propagation delay may not vary significantly among the group members within a very small area, and all the group members are mostly synchronized with a common synchronization source, therefore the TA may be handled well within a small group.

As shown in FIG. 11, different communications such as unicast, multicast and broadcast are allocated or scheduled with the corresponding SA SCIs in the control region.

An SA SCI may carry a source ID for a broadcast, e.g., SL-BA-RNTI for application, SL-BT-RNTI for the transmitter. An SA SCI may carry a group ID for a multicast, e.g., SL-M-RNTI for a multicast, SL-G-RNTI for a group or a group lead. An SA SCI may carry a UE sidelink ID or a pair ID for a unicast, e.g., SL-C-RNTI-1 for a first UE, SL-C-RNTI-2 for a second UE, or SL-C-RNTI-p for the pair. With the proper ID(s), a UE may detect and decode a desired SA SCI for the transmitted data.

A 2-bit communication type indication, e.g., com type, as an example may be included in the SA SCIs, for example, "00" for broadcast, "01" for multicast", and "10" for unicast. Also, a one-bit flag, e.g., periodic, as an example may be included in the SA SCIs, for example, "0" for aperiodic or event trigger, and "1" for periodic, as well as optionally a field for period, e.g., "period", indicating the period of the data traffic for resource reservation.

The SL-DMRS of NR-PSCCH carrying the SA SCIs or the SL-DMRS of the NR-PSSCH carrying the data may also include a source ID for a broadcast, source ID or group ID for a multicast, and a UE's sidelink ID or a pair's sidelink ID for a unicast, which may be used for a UE to identify a desired NR-PSCCH or a desired NR-PSSCH. UE may assume SL-DMRS of NR-PSCCH is Quasi-CoLocationed (QCLed) with the selected NR-PSSS/NR-SSSS/NR-PSBCH during synchronization and/or group or peer discovery procedure or the SL-CSI-RS during the beam training and pairing. The QCL or Transmission Configuration Indication (TCI) of a NR-PSSCH may be indicated by its associated NR-PSCCH.

For example, the SL-DMRS for NR PSCCH or NR-PSSCH may be constructed by a gold sequence as follows using a ID:

$$r(m) = \frac{1}{\sqrt{2}}(1 - 2c(2m)) + \frac{1}{\sqrt{2}}(1 - 2c(2m+1))$$

where the gold sequence c (n) may be defined as follows as an example.

$$c(n) = (x_1(n+N_c) + x_2(n+N_c)) \bmod 2$$

$$x_1(n+31) = (x_1(n+3) + x_1(n)) \bmod 2$$

$$x_2(n+31) = (x_2(n+3) + x_2(n+2) + x_2(n+1) + x_2(n)) \bmod 2$$

where $N_c$ is a constant (e.g=1600) and the operator "+" is the modulo-2 addition. The $x_1$ and $x_2$ are polynomial generator with length 31. The initialization for PSCCH DMRS can be $$c_{init} = (2^a(14n_s+l+1)(2N_{ID}^{nSLSCID}+1)+2N_{ID}^{nSLSCID}) \bmod 2^{31},$$

where $N_{ID}^{nSLSCID}$ denotes the sidelink scrambling code ID, e.g., the source ID, group ID, UE sidelink ID, etc. as described previously; a is an integer, for example a=23; $n_s$ is the slot number in a frame and l is the symbol relative to the start of a slot.

SL-DMRS port(s) of NR-PSCCH may be configured by gNB or gNB-like RSU via RRC, if with the network control; may be configured by an RSU as a coordinator in proximity, a lead in proximity, a lead of a group, a synchronization source UE, or a scheduling UE during group discovery and joining the group or peer discovery and pairing procedure or association or connection procedure via SL-RRC, if without the network control.

SL-DMRS port(s) of NR-PSSCH may be signaled with DCI by gNB or gNB-like RSU, if with the network control; may be configured or signaled by SCI by an RSU as a coordinator in proximity, a lead in proximity, a lead of a group, or the synchronization source UE during group discovery and joining the group or peer discovery and pairing procedure, if without the network control.

As the example shown in FIG. 11, there are Control Region for SA SCIs on PDSCH, and Data Transmission Region for data and/or RS. Different resource pools may be configured for the Control Region and Data Transmission Region respectively, e.g., one or multiple resource pools for control and one or multiple resource pools for data.

FIG. 12 depicts an example of aggregated slot scheduling on sidelink, where a broadcast transmission on the PSSCH is across the slot boundary between slot SL1 and slot SL2, e.g., the data transmission region is across the slot boundary.

FIG. 13 illustrates an example of SL-CSI-RS acquisition which may be configured by a gNB via RRC or an RSU, a lead or a scheduling UE via SL-RRC and dynamically indicated by a transmitting UE via a SA SCI in slot SL1, e.g., an SL-CSI-RS request indication in the SA SCI, and SL-CSI feedback (e.g., sidelink CSI reporting) in slot SL2, with multi-beam (spatial multiplexing) based sweeping which may also be indicated by the SA SCI in slot SL1. A wide beam transmission for SL-CSI-RS may be indicated by an SA SCI in the control region of slot SL1 as an example for multicast area coverage. But a narrow multi-beam sweeping may also be applied to SL-CSI-RS(s) in the data region which is shown in FIG. 13.

A narrow multibeam sweeping for one-to-many SL-CSI-RS transmission (similar to multicast data on NR-PSSCH) is performed over 4 symbols in the data region as an example for multicast coverage. Also, the CSI feedback in slot SL2 from all UEs or some UEs in a group, are exemplified with multiplexing with different symbols in time (e.g., TDMed), with different RBs/RBGs/subchannels in frequency (e.g., FDMed), and/or different beams in space (e.g. spatial multiplexing or Space Division Multiplexed (SDMed) on beam A, beam B and beam C as depicted in FIG. 13 at feedback location CSIFB1). The example shown in FIG. 13 has a multiplexing of 4×2×3=24 SL-CSI feedbacks, for a SL-CSI report carried on a modulation based feedback channel, for example, the feedback SCI is carried on a new physical sidelink feedback channel or multiplexed with a NR-PSSCH or carried on a specially mapped NR-PSSCH at higher layer.

If UE specific sequence based spreading is applied to the CSI feedback resources (in either time domain, frequency domain or both), then more UE's feedbacks may be multiplexed via different codes, e.g. Code Division Multiplexed (CDMed) but with the cost of more resources in time or frequency.

Since SL-CSI feedback is used for reporting a sidelink radio channel condition, it may be redundant to report channel conditions measured by beam pairs with Quasi-CoLocation (QCLed) Type A relationship, e.g., Doppler shift, Doppler spread, average delay, delay spread, etc. Therefore, UEs within a group in a small area may have QCL-type A relationship with QCL-type A beams. In this scenario, only one UE of a QCL-type A UE subgroup needs to feedback the SL-CSI report, to further reduce the overhead of many-to-one CSI feedbacks.

The mechanisms proposed for multicast CSI feedbacks are also applicable to multicast HARQ ACK/NACK implementations either sequence based or modulation based.

FIG. 14 illustrates mini-slot based scheduling, where the NR-PSCCH carrying the SA SCI(s) is adjacent to NR-PSSCH carrying the data in time and therefore NR-PSCCH and NR-PSSCH share the same resource pool used for data and/or RS such as SL-DMRS, SL-CSI-RS, SL-TPRS, SL-PRS, etc. In addition, for narrow beam based sweeping, the PSCCH and PSSCH may be carried on the same beam.

As illustrated in FIG. 14, SA SCI1 indicates a small low latency and high reliability periodic data transmission carried on NR-PSSCH1 over a 2-symbol mini-slot one-time repetition and a period of 1 slot; SA SCI2 indicates a medium size low latency periodic data carried on NR-PSSCH2 over a 6-symbol mini-slot with a period of 1 slot; SA SCI3 indicates a medium size low latency event-triggered data carried on NR-PSSCH3 over a 6-symbol mini-slot; SA SCI4 indicates a very small periodic data transmission carried on NR-PSSCH4 over a 2-symbol mini-slot with a period of i slots, where i>1.

For periodic transmissions, especially for frequent periodic transmissions, the receiver may have the AGC set properly and may not need AGC signal for pre-condition the receiver AGC circuit setting.

For an event trigger transmission, the AGC signal may be needed for pre-condition the receiver AGC circuit setting.

Figure 15A:
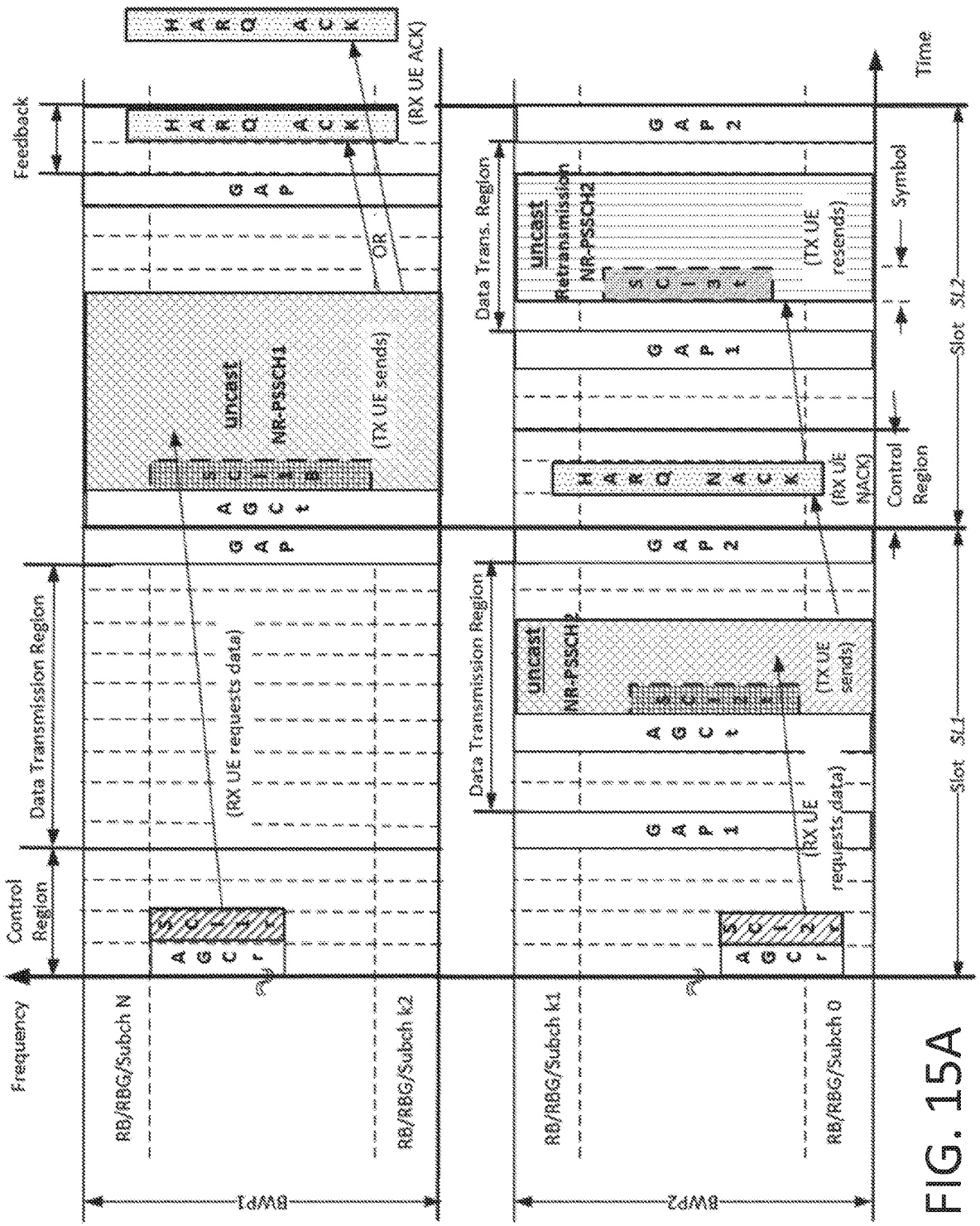
FIG. 15A illustrates a receiving UE initiated unicast.
Figure 15B:
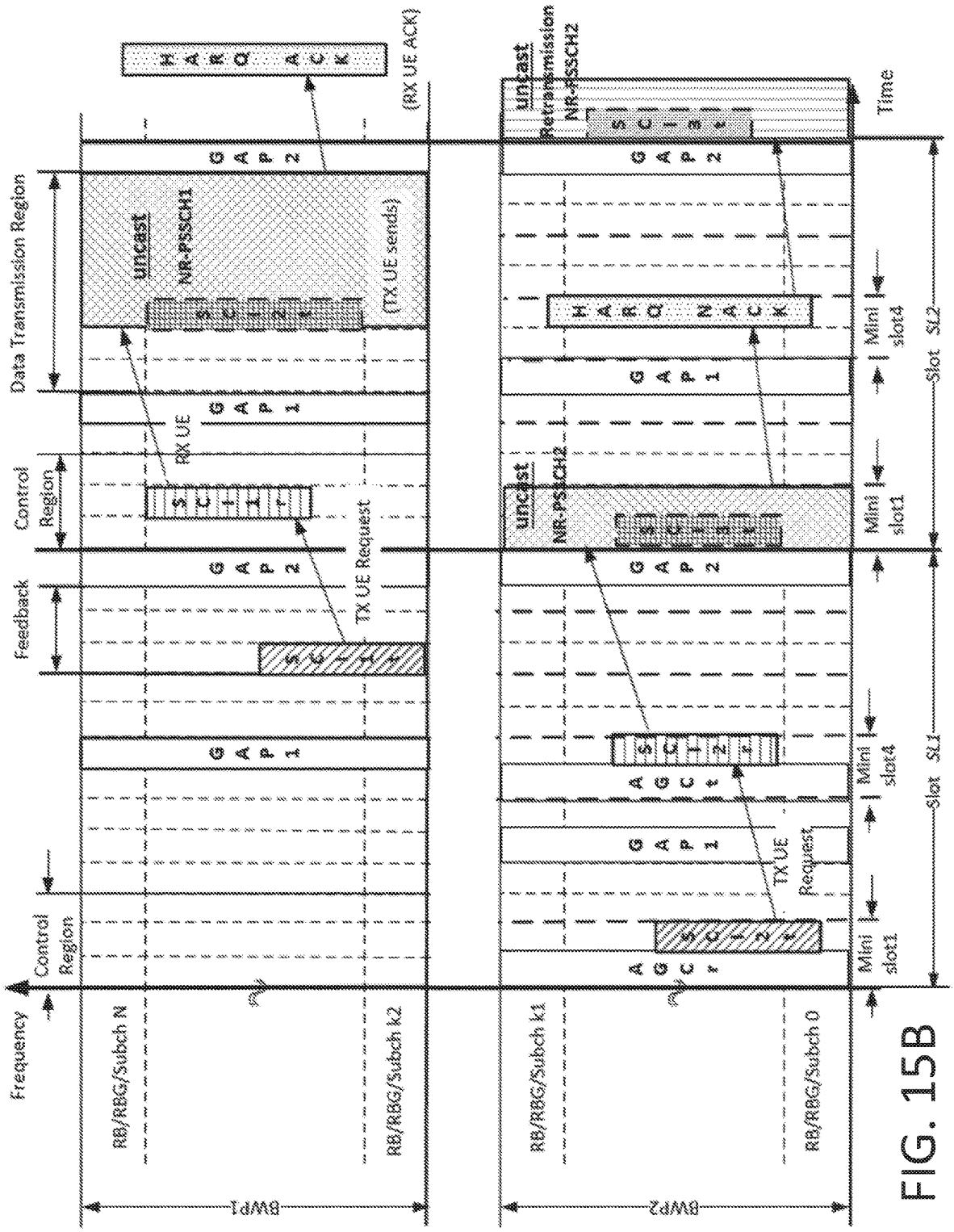
FIG. 15B illustrates a transmitting UE initiated unicast.

Examples of resource allocation or scheduling for unicast are illustrated in FIG. 15. A unicast may be initiated by a receiving UE using a SA SCI as depicted in FIG. 15A, or by a transmitting UE as depicted in FIG. 15B.

As shown in FIG. 15A, a receiving UE may initiate a unicast by sending a SA SCI for requesting or reserving a data transmission, or pulling data.

With BWP1, a data requesting or reserving SA SCI (e.g., SCI1 r) optionally with a AGC signal (e.g., AGC r) from the receiving UE is allocated in the control region of the first slot (e.g., SL 1), the data is then transmitted in the second slot (e.g., SL 2), e.g., on NR-PSSCH1, with optional AGC signal (e.g., AGC t) and optional SCI (e.g., SCI1 t) associated with the data for decoding. The receiving UE's HARQ ACK feedback may be at the end of slot SL2, or in slot 3 which may be indicated in the first SA SCI (e.g. SCI1 r).

With BWP2, a data requesting or reserving SA SCI (e.g. SCI2 r) optionally with a AGC signal (e.g., AGC r) from the receiving UE is allocated in the control region of the first slot (e.g., SL 1), the data is transmitted in the same slot, e.g., on NR-PSSCH2, with optional AGC signal (e.g. AGC t) and optional SCI (e.g. SCI2 t) associated with the data for decoding. The receiving UE's HARQ NACK feedback may be at the beginning of the second slot (e.g., SL2) and the retransmission on NR-PSSCH2 is in the same slot (e.g. SL2), which may also be indicated in the SA SCI (e.g.

SCI2 r). This is an example of resource allocation or scheduling for a low latency short data transmission.

As shown in FIG. 15 B, a transmitting UE may initiate a unicast by sending a request SCI for resource allocation or scheduling of a data transmission.

With BWP1, a resource allocation or scheduling request SCI (e.g. SCI1 t) from a transmitting UE is allocated in the feedback region of the first slot (e.g., SL 1), the SA SCI (e.g. SCI 1 r) is transmitted in the control region of the second slot (e.g., SL 2), and then the data is transmitted in the same slot, e.g., on NR-PSSCH1, with optional SA SCI (e.g. SCI2 t) for decoding the associated data. The receiving UE's HARQ ACK feedback is allocated in slot 3.

With BWP2, a data request SCI (e.g. SCI2 t) optionally with a AGC signal (e.g., AGC t) from the transmitting UE is allocated in the first mini-slot of the first slot (e.g., SL1), the SA SCI (e.g. SCI 2 r) is transmitted in the fourth mini-slot of the first slot (e.g., SL 1), and then the data is transmitted in the first mini-slot of the second slot (e.g., SL2), e.g., on NR-PSSCH2, with optional SCI (e.g. SCI3 t) for decoding the data. The receiving UE's HARQ ACK feedback is allocated in fourth mini-slot of the second slot. This is an example of resource allocation or scheduling for a low latency short data transmission with mini-slots.

Sensing for Periodic and Aperiodic Transmissions

Figure 16:
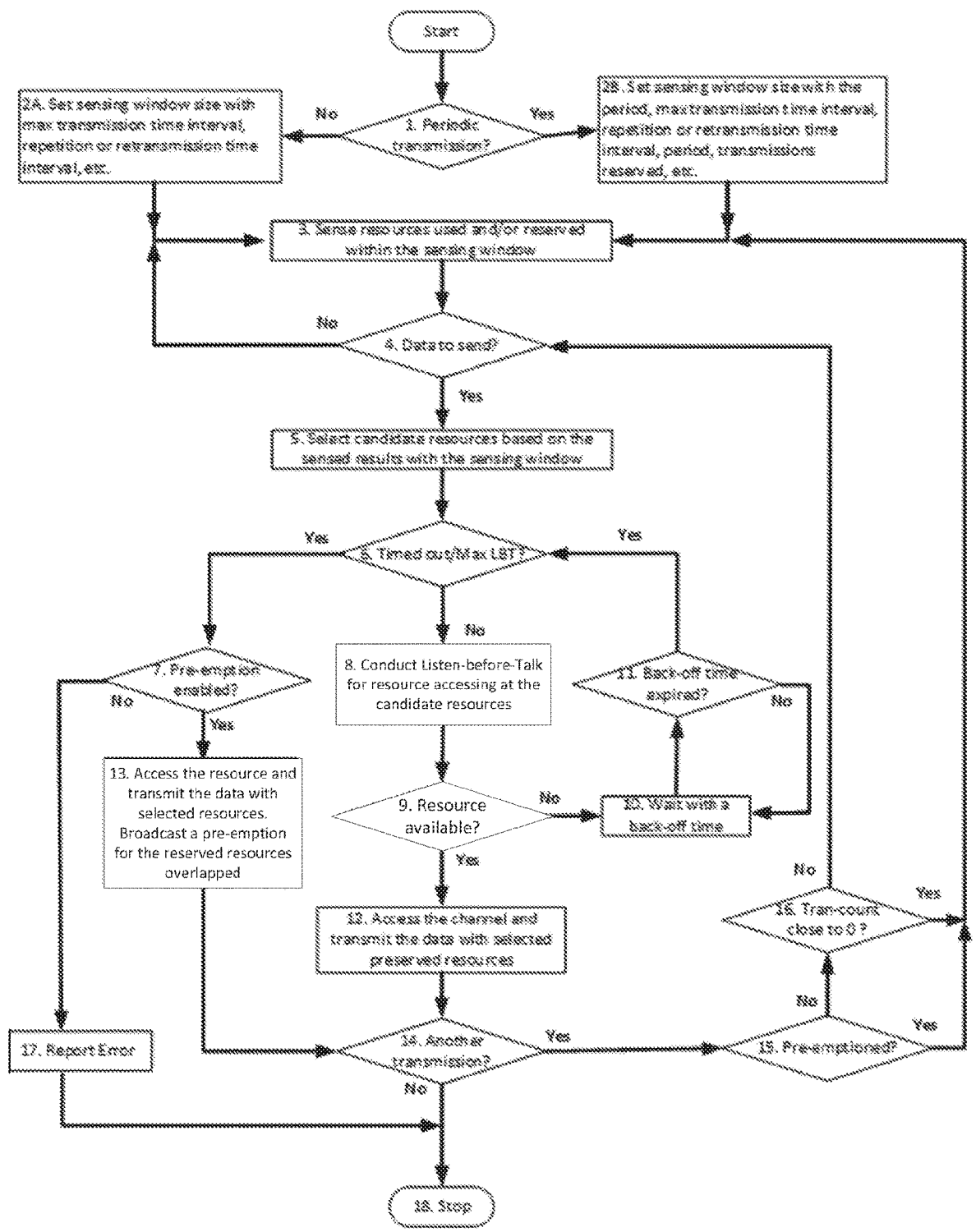
FIG. 16 illustrates an example method of sensing for periodic and aperiodic data transmissions over shared resource pools.

An example scheme of sensing for periodic and aperiodic data transmissions over share resource pools is depicted in FIG. 16, which may have the following steps.

At step 1, a UE checks if the planned data transmission is periodic or aperiodic, e.g. indicated by the higher layer parameter periodic "1" for periodic and "0" for aperiodic", if "1" a higher layer parameter period for the time interval of periodicity. If aperiodic, move to step 2A; otherwise move to step 2B for periodic data transmissions.

At step 2A, the UE set a sensing window size, e.g., window-size, based on the maximum time resource for a typical or maximum Transport Block (TB) size for a V2X application (e.g., max-transmission-time), repetition number (e.g., repetition-number) if it's enabled (e.g., repetition_enable is "1", otherwise is "0"), possible retransmission time line (e.g., delay-retransmission), etc. For example, the window size may be estimated as the following equation, window-size=max-transmission-time+(repetition-number×max-transmission-time)×repetition_enable+(delay-retransmission+max.transmission-time)+window-adjustment, where window-adjustment is the extra time adjustment for the sensing window based on different QoS requirements such as latency, priority, reliability, etc. for different V2X services in the proximity.

At step 2B, the UE set a sensing window size, e.g., window-size, based on the maximum time resource for a typical or maximum Transport Block (TB) size for a V2X application, repetition number if it's enabled, possible retransmission time line, the period for periodic transmissions (e.g., period), periodic transmissions to reserve (e.g., trans-count), etc. For example, the window size may be estimated as the following equation, window-size=max. transmission-time+repetition-number×max. transmission-time (if enabled)+delay-for-retransmission+max. transmission-time+period×trans-count+window-adjustment, where window-adjustment is the extra time adjustment for the sensing window based on different QoS such as latency, priority, reliability, etc. requirements for different V2X services in the proximity.

Comparing with aperiodic window size, the periodic sensing window size is much bigger if a UE needs to preserve the resources for the next few transmissions, e.g. trans_count, of the periodic messages. The longer the period, the bigger the window size.

At step 3 for resource sensing, the UE senses resources used and/or resources reserved in the sensing window. There are multiple ways to implement sensing mechanisms.

If all the SA SCIs in the sensing window can be decoded by a UE, then the UE may extract the exact resources used and resources reserved within the time of sensing window. Therefore, the UE may select a set of available resources required by its data transmission(s) which may be periodic or aperiodic (e.g. event triggered).

If not all SA SCIs are decodable to a UE, for example the SCIs are scrambled with a ID, e.g., SL-BA-RNTI as a broadcast source ID for a V2X application, SL-BT-RNTI as a source ID for a broadcast transmitter, SL-M-RNTI as a multicast ID, SL-G-RNTI as a group or a group lead's sidelink ID, SL-C-RNTI for a UE's sidelink ID, etc., or if the resources are scheduled or reserved already by other UEs via SA SCIs, the UE may detect resource usage by measurements. For example Sidelink Reference Signal Received Power (SL-RSRP) or Sidelink Reference Signal Received Quality (SL-RSRQ) measured from the SL-DMRS of NR-PSCCH or NR-PSSCH. If the measured result is above a threshold value configured by the higher layer, e.g., Sense_Th$_{SL-RSRP}$ or Sense_Th$_{SL-RSRQ}$, the resources associated to the measured SL-RSRP or SL-RSRQ may be marked as used resources, e.g., not available resources. If the used resource shows a repeated pattern, then the UE may assume this pattern will continue for periodic transmissions for a certain time duration in near future, e.g. the patterned resources are reserved for periodic transmissions. Another way to measure is the energy based measurements on NR-PSCCH and/or NR-PSSCH, e.g. Sidelink Received signal Strenth Indicator (SL-RSSI). To reflect the resource usage in frequency, a measurement for SL-RSRP, SL-RSRQ or SL-RSSI may be based on a certain frequency unit such as per RB, per RBG, or per Subchannel, which may be configured via RRC or SI-RRC. Similarly, for more accurate usage in time, measurement for SL-RSRP, SL-RSRQ or SL-RSSI may be based on a certain time unit such as per symbol or symbols, per mini-slot, or per slot, which may also be configured via RRC or SI-RRC. The energy based measurement of NR-PSCCH or NR-PSCH may be combined with the SL-RSRP or SL-RSRQ of NR-PSCCH or NR-PSSCH's SL-DMRS, to enhance the measured accuracy.

Another way is combining the results from decoded SA-SCIs, SL-RSRP or SL-RSRQ measurements of NR-PSCCH and/or NR-PSSCH, and/or energy measurements SL-RSSI of NR-PSCCH and/or NR-PSSCH, or a combination of them.

The UE may keep sensing the resources used and/or reserved with its sensing window and keep updating the set of available resources for its near future aperiodic or periodic transmissions with the sensing window sliding with the time.

At step 4, if higher layer indicates that a new data is ready for transmission, e.g., a trigger for transmitting a new data, move to step 5; otherwise move to step 3 for sensing available resources.

At step 5 for resource selection, the UE selects a subset of resources as candidate resources from the set of available resources, based on the TB size, latency requirement, priority level, periodic or aperiodic (e.g., event triggered), channel congestion, etc., for the new data to be transmitted. The higher layer may select the resources to be used from the candidate resources. The UE may reserve the selected resources for its transmission(s) or use the selected resources for at least the intimal transmission without reservation to avoid the delay of reservation. For shared resource pool or resources, the UE may conduct accessing resource sensing before transmitting its data at the selected resources to avoid a possible collision with other UE's transmission at the same selected resources, for example, using Listen-Before-Talk (LBT) which is based on a very short measuring window of, e.g., energy based SL-RSSI measurement. If the measurement is above a threshold, e.g., Measure_Th$_{LBT}$, the UE may assume that the resource has been used by another UE, and then the UE may back off for a time, e.g., T$_{LBT\_off}$, and resense the accessing resource again for its transmission. A UE may be indicated by the higher layer if accessing resource sensing enabled or not, e.g., Acc_Resource_En=1 or 0, for a data to be transmitted. For example, for very short latency transmissions or very high priority transmissions, the accessing resource sensing may be disabled to save time; for latency tolerant or low priority transmissions, the accessing resource sensing may be enabled to avoid colliding with short latency or high priority transmissions. Another way to decide sensing accessing resources or not without the explicit indication (e.g. Acc_Resource_En) is based on the latency budget (e.g., the time is very close to the data's transmission latency budget and no time for sensing, or the latency requirement is above a threshold for sensing), or based on the priority level (e.g., the priority is above a threshold of priority for sensing).

At step 6, the UE checks if it has reached the maximum number of LBT (e.g., max-LBT) based accessing resource sensing or if it is timed out by maximum LBT timer (e.g., time-LBT) for LBT based accessing resource sensing. If the UE has reached the maximum number of LBT based accessing resource sensing or if the UE is timed out for LBT based accessing resource sensing, move to step 7 for pre-emption decision; otherwise move to step 8 to conduct LBT based accessing resource sensing over the selected resources for its transmission. If max-LBT=0, or time-LBT=0, a UE doesn't need to conduct the accessing resource sensing, e.g. another way to disable the accessing resource sensing.

At step 7, the UE checks if pre-emption is enabled (e.g., parameter pre-emption is "1") from higher layer for higher priority transmissions, or checks the priority level (e.g., parameter priority) from the higher layer which allows to pre-empt the other lower priority data traffic, or checks the latency requirement (e.g., parameter latency_allowed or latency_max) from the higher layer which permits pre-emption for avoiding delay. Then the UE may decide if it canpre-empt the resources, scheduled or reserved by other UE(s) with higher latency, lower priority, or lower reliability, for its high priority or low latency transmission. The UE may also checks the SL-RSRP, SL-RSRQ, or SL-RSSI to decide if the resources scheduled or reserved by other UE(s) can be pre-empted for its transmission. If the UE is able to pre-empt other UE's scheduled or reserved resource for its emergency data transmission as an example, moves to step 13 for a pre-emption transmission; otherwise, moves to step 17 for transmission drop with an error report if out of the latency budget or moves to step 5 (not shown in the figure) to reselect candidate resources from the available resource set. The UE may explicitly indicate that the selected resource(s) is pre-empted from the other UE's resource(s) in its SA SCI or SCI associated to its data transmission, e.g., pre-empted=1 or implicitly indicate the pre-emption in its SA SCI or SCI associated to its data transmission using a reserved priority value, e.g., priority="111" or "000" for a 3-bit priority field in a SCI.

At step 8, the UE conduct accessing resource sensing, e.g., LBT based sensing over the selected resources for accessing the resources.

For different V2X services with different QoS requirement, LBT based accessing resource sensing may be implemented in multiple ways. For example, priority based (e.g., higher priority, lower back-off or no back-off time), adaptive based (e.g., decreasing the back-off time each time failed LBT), random based (e.g., by randomly selecting a value within a back-off range), the transmitter-receiver hand shaking based (e.g., to avoid the hidden node), and so on.

At step 9, if the resource is sensed available over the selected resources, move to step 12 to transmit the data; otherwise, move to step 10 for back off.

At step 10, the UE may wait for a back-off time, which may be randomly generated, or priority based, or decreased each time after the UE fails a LBT based resource sensing, where the back-off parameters of different back-off schemes may be configured and indicated by the higher layer.

At step 11, UE checks if the back-off time expires or not. If expires, move to step 6 to check timed out or not and then conduct LBT based resource sensing again at step 8 if not timed out; otherwise keep waiting at step 10.

At step 12, the UE may reserve the selected resource for its transmission or access the selected resource for transmitting the data, as well as reserving resources for repetition if enabled and retransmission if enabled for an aperiodic V2X message (e.g. event triggered message), or reserving resources for repetition if enabled, retransmission if enabled and a few new transmissions (e.g., defined by trans-count) for a periodic V2X messages.

If the data transmission is periodic, the periodic transmission counter is reduced by 1, e.g., trans-count=trans-count−1, after a successful transmission.

At step 13 for pre-emption transmission, the UE may select the reserved resources to be pre-empted, based on TB size, latency requirement, priority level, periodic or event triggered, impact to the pre-empted UE, interference, congestion, etc., and transmit the data over the pre-empted resources. The UE must broadcast the pre-emption indication (e.g., in a new format SCI for pre-emption announcement or with the pre-emption flag set "1" in an SA SCI or with a preserved priority value "111" or "000" in an SA SCI) with the pre-empted other UE's reserved resources or include the pre-emption in the SCI sent together with the data transmission to the receiver(s). Data transmission over the pre-empted resources may be LBT sensing based depending on the urgency and priority of the data to be transmitted.

At step 14, the UE checks if there is any reserved transmission, e.g., repetition, retransmission or a new transmission for periodic data. If not, move to step 18 to stop sensing or to step 1 to start over sensing again (not shown in the figure) depending on the operation mode indicated by the higher layer; otherwise, move to step 15 to check if the reserved resources are pre-empted or not.

At step 15, the UE checks if there is any pre-emption indication (e.g., broadcasted by a UE, who has pre-empted the reserved resources, at the pre-emption monitoring occasions as configured via RRC or Slk-RRC. If there is no pre-emption indication, e.g. indicated by a SCI at a pre-emption monitoring occasion or scheduling monitoring occasion, the UE moves to step 16 to check if any reservation has been made; otherwise with the reserved resource pre-empted, the UE moves to step 3 to re-sense the available resources with its sensing window. If the UE is enabled with pre-emption for a high priority data, the UE may jump to step 7 (not shown in FIG. 16) for a new transmission using pre-emption as described for step 7.

At step 16, the UE checks if the trans-count is above a threshold value defined by the higher layer for periodic data transmissions with resources reserved, or checks if it's a repetiotion or re-transmission with resource reserved. If no with the resource reserved for a new periodic transmission or for a repetiotion or for a retransmission, move to step 3 for window based sensing for finding candidate resources again; otherwise, move to step 4 for repetition, retransmission or a new data for periodic data transmissions with resources reserved.

At step 17, the UE drops the transmission and reports to higher layer with resource accessing error, and then moves to step 18 or back to step 5 for reselecting candidate resources (not shown in the figure) or back to step 3 for sensing again (not shown in the figure).

At step 18, the sensing procedure may be finished.

Resource Selection and Reselection

Figure 26A:
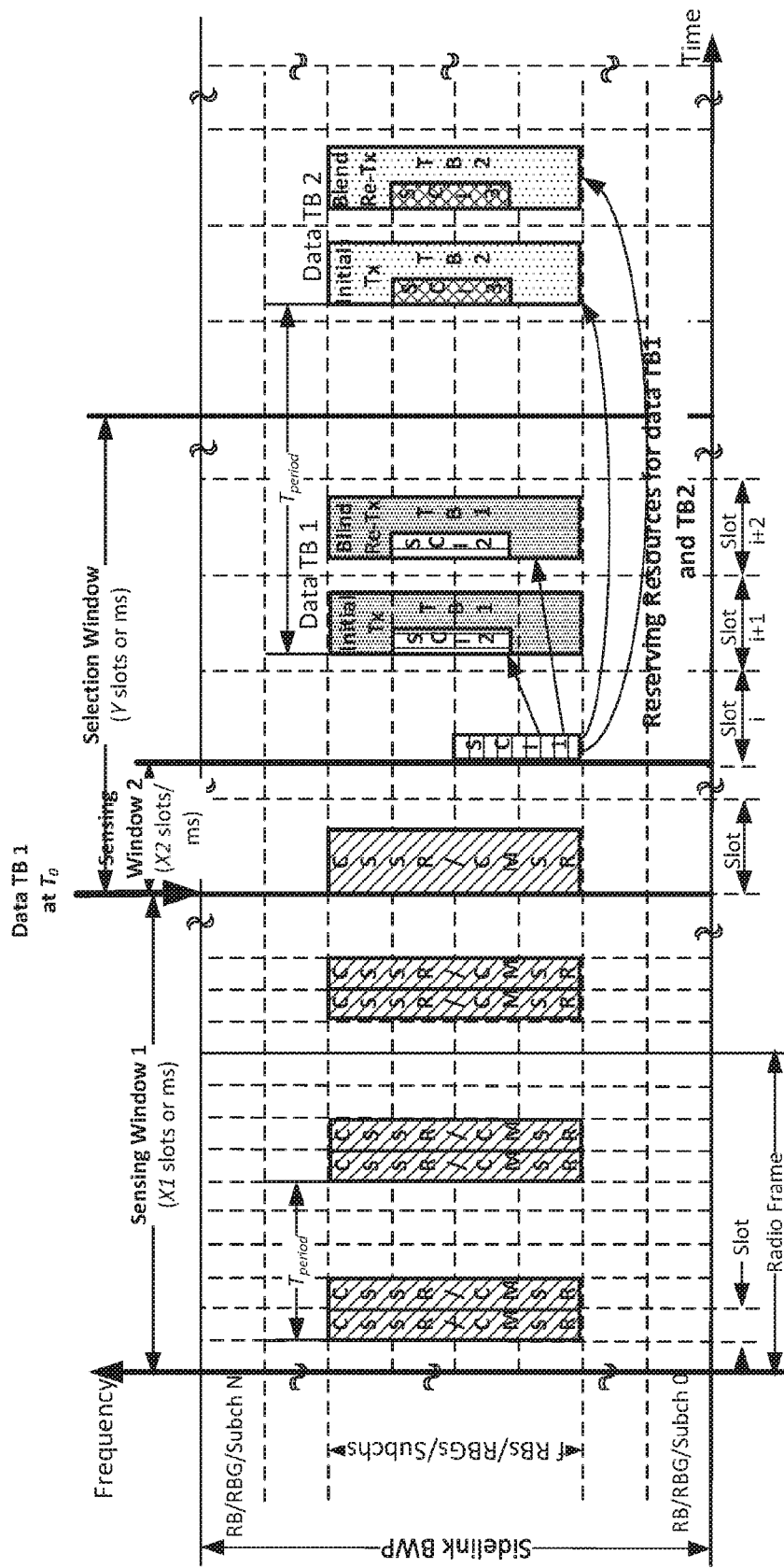
FIGS. 26A, 26B and 26C show examples of sensing based resource selection.
Figure 26B:
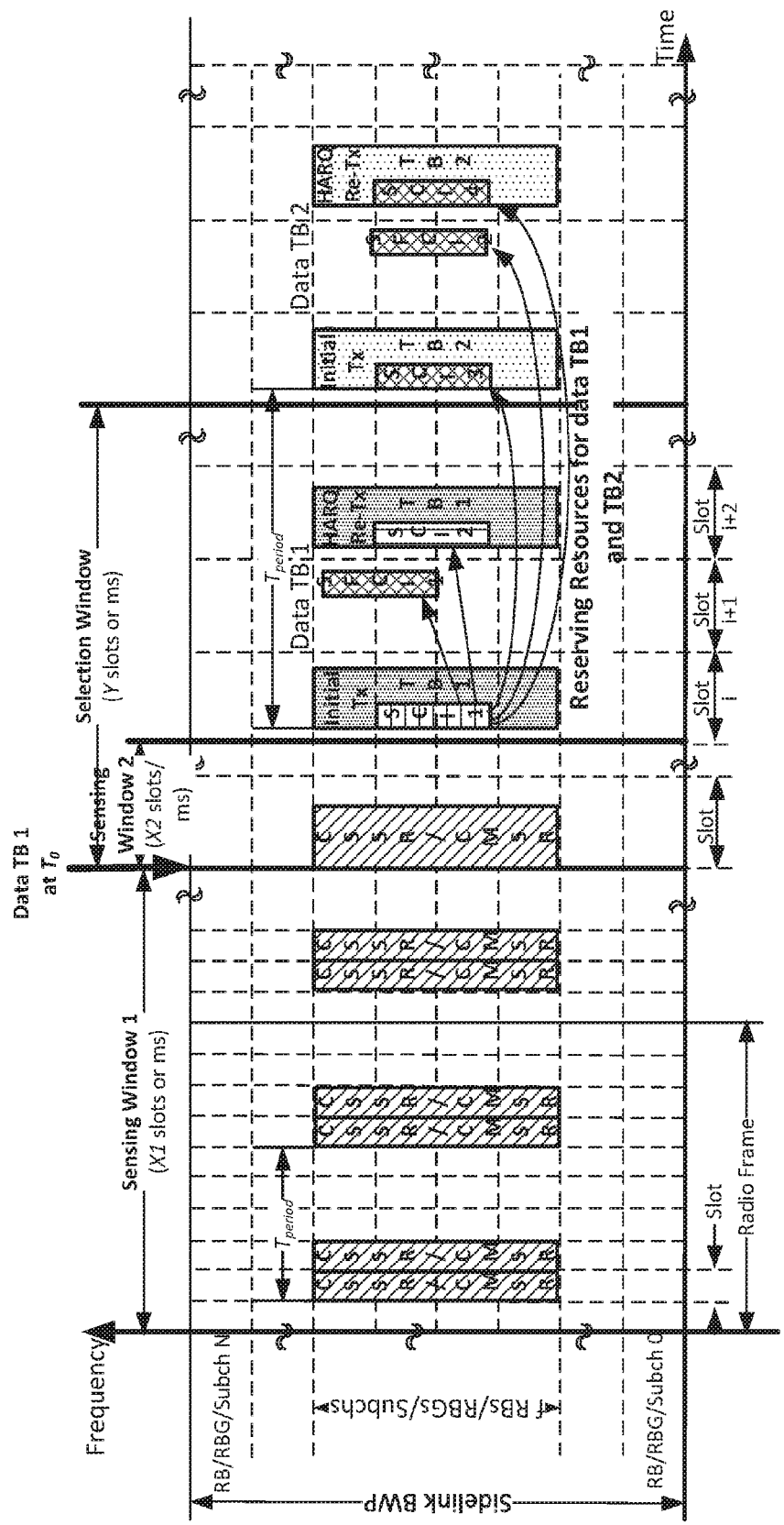
Figure 26C:
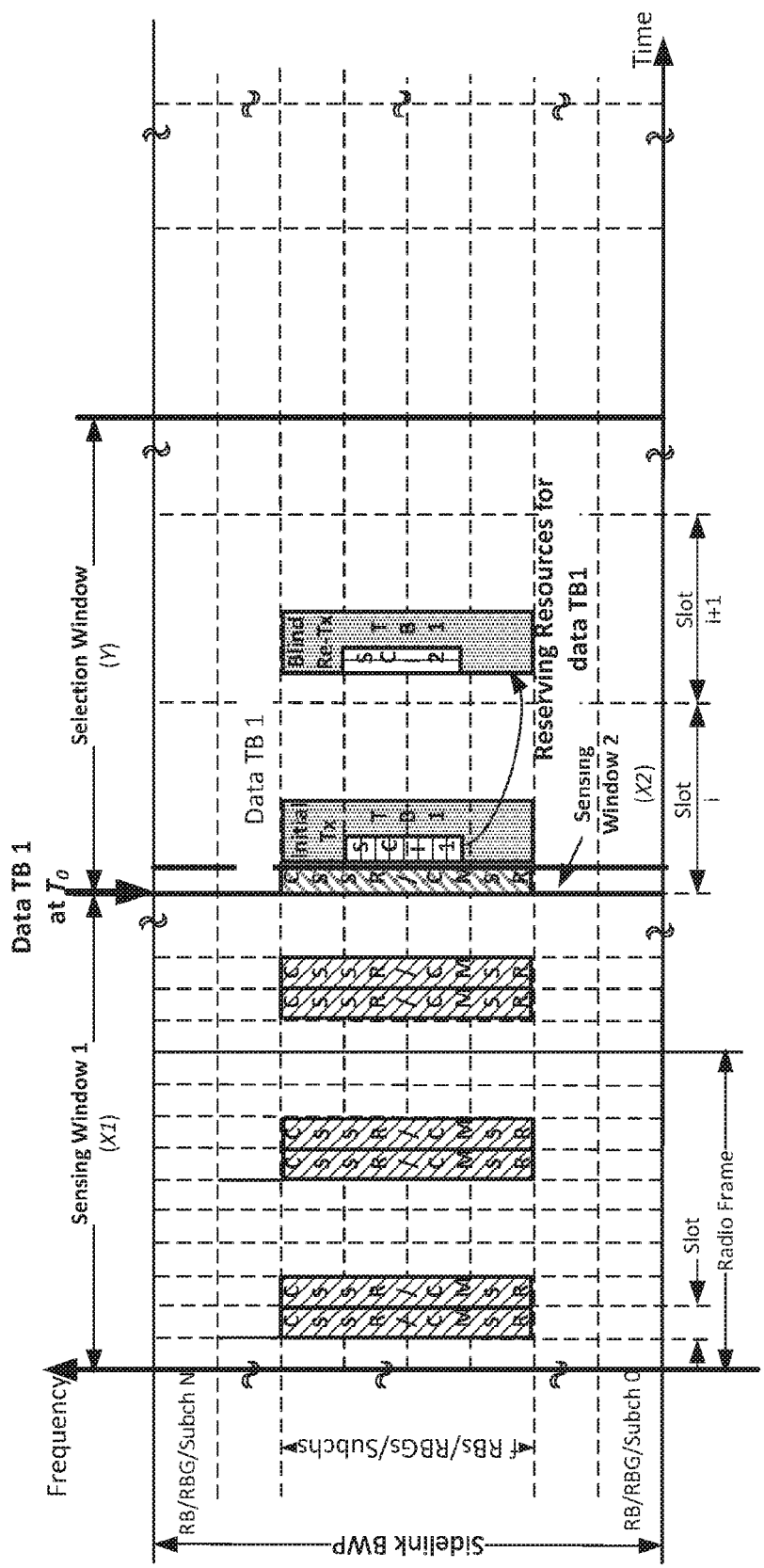

As illustrated in FIG. 26A, FIG. 26B and FIG. 26C, a UE may conduct channel sensing in a long time interval "Sensing Window 1" (e.g., with a length of X1 slots or X1 ms) and a short time interval "Sensing Window 2" (e.g., with a length of X2 slots or X2 symbols or X2 ms). The UE may select the resources for data transmissions in the time interval "Selection Window" (e.g., with a length of Y slots or Y ms).

An SA SCI indicated (e.g., SCI1 at slot i) resource reservation for initial transmission (e.g. TB1 at slot i+1), blind retransmission (e.g., repetition for TB1 at slot i+2) and new transmission (e.g., for TB2) for periodic traffic is illustrated in FIG. 26A.

An SCI (e.g., SCI1 with the initial transmission at slot i) indicated resource reservation for HARQ feedback (e.g. SFCI1 at slot i+1) for the initial transmission (e.g., for TB1), HARQ retransmission (e.g., retransmission for TB1 at slot i+2) and new transmission (e.g., for TB2) for periodic traffic is illustrated in FIG. 26B.

An SCI (e.g., SCI1 with the initial transmission at slot i) indicated resource reservation for blind retransmission (e.g., repetition for TB1 at slot i+1) is illustrated in FIG. 26C for low latency aperiodic traffic, e.g. an event triggered transmission.

Figure 27:
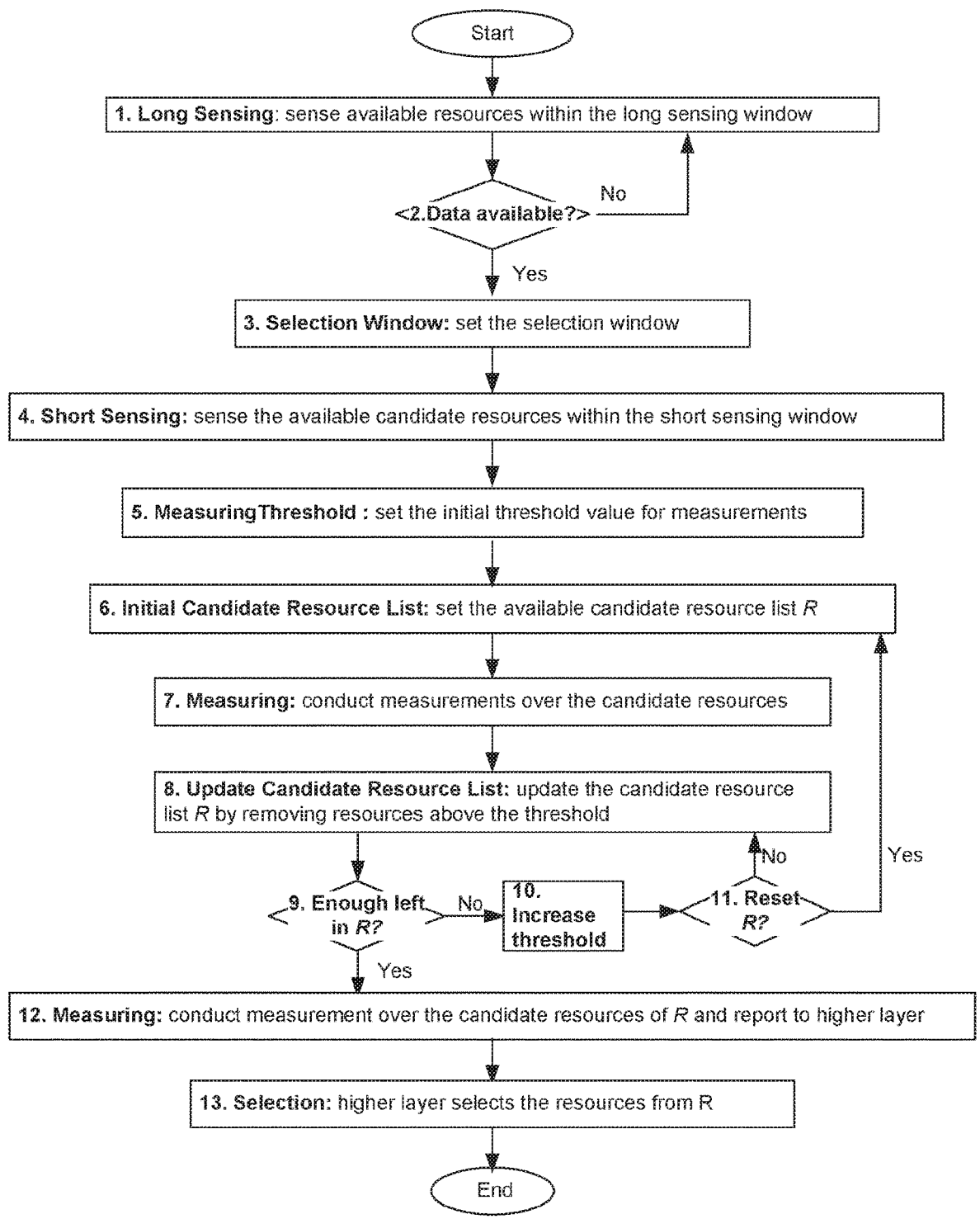
FIG. 27 shows an example of call flow for sensing based resource selection.

As shown in FIG. 27, a UE may conduct the following steps for selecting a resource or resources for transmitting a data, e.g., a Transport Block (TB).

At step 1 (Long Sensing for available resources), the UE may sense available resources within the long sensing window by decoding the scheduling or resource reserving SCIs carried on NR-PSCCH and measuring the Side Link Reference Signal Received Power (SL-RSRP) such as SL-RSRP of the PSCCH DMRS and/or the SL-RSRP of the PSSCH over the scheduled or reserved resources. Resources meeting the following conditions may be excluded:

The resources indicated by another UE with scheduling SCI or reserving SCI. These resource are allocated at the same time that the UE will need it to transmit any of its next data TB;

The resources is pre-empted by another UE with pre-emption indicated in SCI; and The UE measures an average SL-RSRP of the DMRS of the NR-PSCCH and/or NR-PSSCH over the Subchannels or RBs or Physical Resource Blocks (PRBs) utilized to transmit the TB associated to the scheduling SCI or reserving SCI or pre-emption SCI and the measurement is higher than a given threshold $M_{th}$. (e.g. cannot share the same resource—collision reduction).

At step 2 (Data Available), determine if a new data TB is ready at time $T_0$ for transmission from the higher layer. If yes, move to Step 3 for setting the Selection Window; otherwise to Step 1 to continue Long Sensing.

At step 3 (Selection Window), set the Selection Window based on the QoS requirements such as latency, priority, reliability, as well as period for periodic traffic. The ending of the Selection Window may be defined by the maximum latency requirement for a data TB transmission.

At step 4 (Short Sensing for candidate resources), sense the available candidate resources within the short sensing window with finer granularity, especially for the short latency data traffics. The measurement may be SL-RSRP of NR-PSCCH DMRS and/or NR-PSSCH DMRS or Side Link Received Signal Strength Indicator (SL-RSSI) as an energy based measurement. For very short latency resource selection, this short sensing may be similar to accessing resource sensing, e.g. Listen-before-Talk (LBT) based. A candidate resource may be a single-slot resource, such as a Candidate Single-Slot Resource (CSSR), or a multiple symbol (e.g. one or more than one) resource, such as a Candidate Multi-Symbol Resource (CMSR). The resource may consist of one up to S contiguous Subchannels or RBs or RBGs in a slot, depending on the message size. The UE may select a set of CSSRs or CMSRs within the Selection Window that spans a number of slots or symbols, e.g. X2 slots or symbols.

At step 5 (MeasuringThreshold), set the initial threshold value Min for measurements. The value of Min may be configured by the higher layer based on QoS requirements such as priority, latency, reliability, communication range or zone, interference measurement, e.g., SIdelink SINR (SL-SINR), congestion measurement, etc.

At step 6 (Initial Candidate Resource List) set the initial available candidate resource list R with all available CSSRs or CMSRs from sensing. The resources that have not been monitored by the UE in the Sensing Windows are not included in list R.

At step 7 (Measuring), conduct measurements over the candidate resources, e.g., CSSRs or CMSRs of R. The measurement may be SL-RSSI or SL-RSRP or SL-SINR of NR-PSCCH and/or NR-PSSCH over the candidate resources.

At step 8 (Update Candidate Resource List), update the candidate resource list R by removing CSSRs or CMSRs with the measured SL-RSSI or SL-RSRP or SL-SINR value above the threshold $M_{Th}$.

At step 9 (Enough left in R?), check if the candidate resources left in list R are more than p % of the total resources, where p is configured by higher layer based on the QoS requirements such as priority, latency, reliability, communication range or zone, etc., as well as the interference and congestion level. If yes, move to Step 12 to measurement for reporting; otherwise to Step 10 to adjust the measurement threshold.

At step 10 (Increase threshold), increase the threshold by $Th_{Inc}$ dB (e.g. $M_{th}=M_{th}+Th_{Inc}$), where $Th_{Inc}$ is configured by higher layer based on the QoS requirements such as priority, latency, reliability, communication range or zone, etc., as well as interference and congestion level. Return to Step 11 to check if need to reset the candidate resource list R with the CSSRs or CMSRs collected from the sensing.

At step 11 (Reset R?), Check if reset the candidate resource set R. If yes, move to Step 6 to reset the candidate resource list with the CSSRs or CMSRs collected from the sensing; otherwise to Step 8 to update the candidate resource list with the adjusted threshold.

At step 12 (Measuring), conduct measurement over the updated candidate resources of R and report to higher layer. The measurement may be a linear average of SL-RSSI or SL-RSRP or SL-SINR of NR-PSCCH and/or NR-PSSCH over the CSSRs or CMSRs of R. Select the CSSRs or CMSRs with smallest average of S-RSSI or SL-RSRP or SL-SINR and report them to higher layer.

At step 14 (Selection), the higher layer selects a resource from the reported candidate resource CSSRs or CMSRs based on TB size, QoS requirements such as priority, latency, reliability, communication range or zone, and measurement of interference, congestion, etc., or selects randomly a candidate resource for the initial transmission. If blind retransmission (e.g., repetition) is enabled, the candidate resource corresponding to the blind retransmission instance (e.g., starting symbol) may also be selected. If the HARQ feedback is enabled, the candidate resource corresponding to the HARQ feedback instance, e.g., the starting symbol for Sidelink Feedback Control Information (SFCI) based on HARQ processing time line may also be selected, and for number of HARQ process h, the candidate resources corresponding to HARQ retransmissions, e.g., for the set of selected initial transmission opportunities $T_0+T_k$, where k=0, 1, ..., K is the index of TBs, and another set of HARQ retransmission opportunities $T_0+T_k+Th$, may also be selected where $T_h \neq 0$ and $T_h \leq x$, where x is based on UE's HARQ processing time budget. For Semi-Persistent Scheduling (SPS), e.g., for periodic transmissions, the candidate resource corresponding to the next packet transmissions, e.g., defined by ResourceCounter (RC), where RC may be selected randomly within a range configured by the higher layer or selected based on priority, period, latency, communication range or zone, packet size, blind retransmission, HARQ retransmission, interference, congestion level, etc.

Congestion Control

Figure 28:
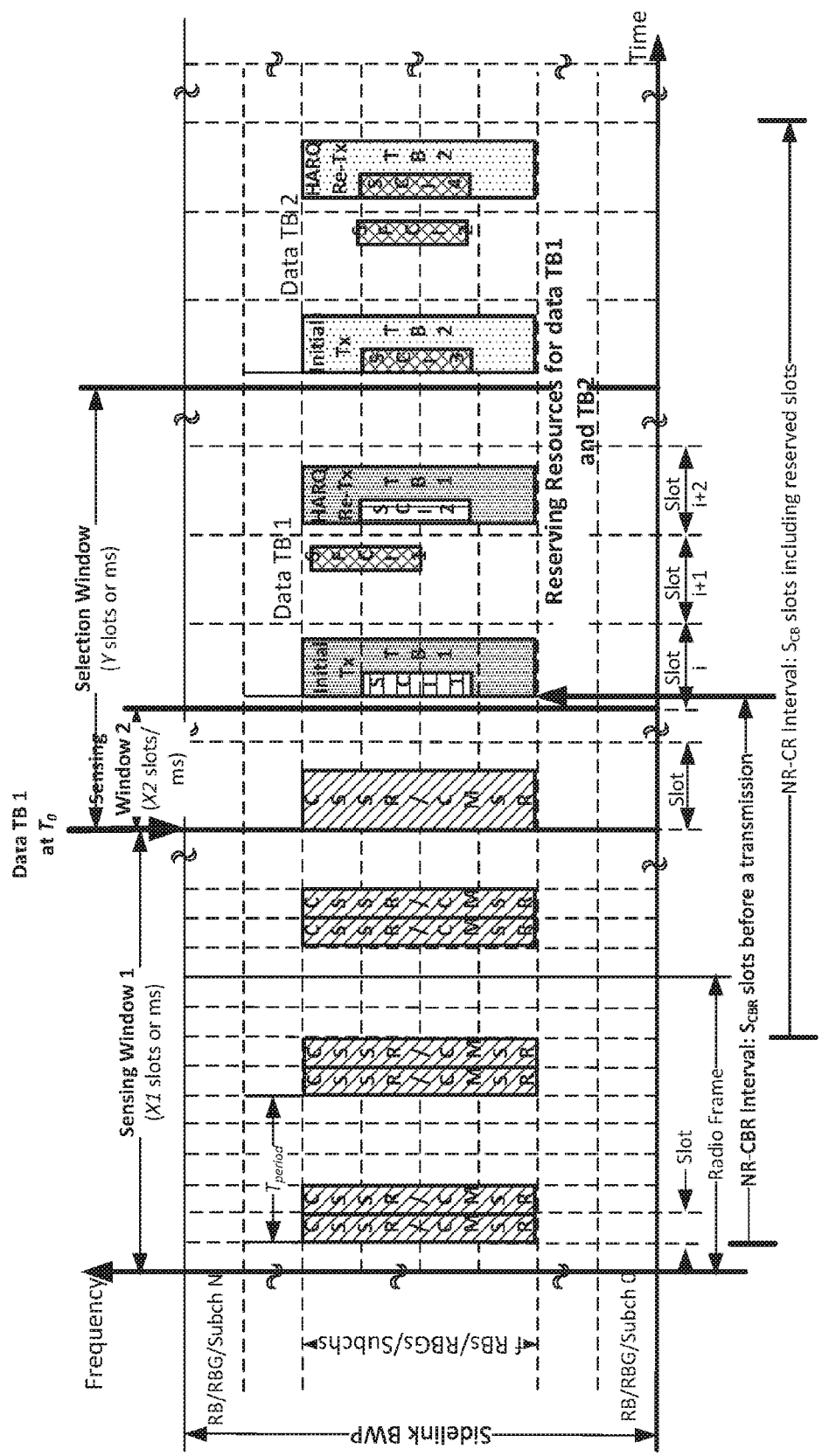
FIG. 28 shows an example of congestion measurements.

For sidelink congestion control, a UE may estimate the New Radio Channel Busy Ratio (NR-CBR) and New Radio Channel occupancy Ratio (NR-CR) before reserving a resource or transmitting or retransmitting a packet. The NR-CBR may provide an indication of a channel congestion level, and may be calculated as the amount of sub-channels or PRBs in the previous $S_{CBR}$ slots which have an average SL-RSRP or SL-SINR or SL-RSSI higher than a CBR threshold $M_{CBR}$. The NR-CR indicates the channel occupancy made by a transmitting UE. It may be calculated as the amount of sub-channels or PRBs that a transmitting UE occupies during a period of $S_{CB}$ slots. This time interval can include past and future $S_x$ slots if resources have been reserved by a transmitting UE. NR-CBR interval and NR-CB interval are exemplified in FIG. 28. NR-CBR interval and NR-CB interval may be configured differently by higher layer for different QoS requirements, e.g. latency, priority, reliability, communication range or zone, etc., as well as the traffic characteristics and congestion level in the system.

For congestion control, a channel occupancy threshold $CR_{th}$ may be defined for a UE to manage its resource reservation and transmissions. For different QoS requirements, a different $CR_{th}$ threshold may be configured or signaled by the higher layer. For example, priority, latency, reliability, communication range or zone, etc. may be used for defining the value of $CR_{th}$ for a data packet. A transmitting UE may be configured or signaled by the higher layer with Inter$_{CBR}$ CBR intervals, and for each of CBR intervals, the transmitting UE cannot exceed a maximum $CR_{th}$ with certain CBR level. The value of $CR_{th}$ for each CBR interval may vary with the QoS requirement of the packet, e.g. priority, latency, reliability, communication range or zone, etc.

When a transmitting UE reserves resources for blind retransmissions or HARQ retransmissions, it measures NR-CBR and check if its NR-CR meets its $CR_{th}$ requirement, so that the UE may reserve resources for retransmissions properly without exceeding the $CR_{th}$.

When a UE transmits or retransmits a packet, it measures NR-CBR and check if its NR-CR meets its $CR_{th}$ requirement. If its NR-CR is higher than the value of $CR_{th}$, it may reduce its CR below $CR_{th}$, with the following examples based on UE's capability, data packet size and the data packet QoS requirements such as reliability, latency, priority, communication range or zone, etc.:

Dropping a transmission: a UE may reduce its NR-CR by dropping a certain data packet transmission, based on its QoS requirements such as priority, latency, reliability, communication range or zone, etc. For example, drop a data packet transmission with a low priority or with long latency or low reliability or out of the required communication range or zone;

Reducing the number of retransmissions. The UE may reduce its CR by reducing blind retransmitting or HARQ retransmission of a packet with low priority or low reliability or long latency requirement;

Adjusting the Modulation and Coding Scheme (MCS): The UE may reduce the CR by adjusting the MCS. For example, a UE may increase the MCS of a data packet to save the Subchannels or PRBs and/or symbols used for the transmission; and/or Reducing the Transmit Power (TP): The UE may reduce its transmit power per the minimum communication range requirement to lower the over all NR-CBR measurement, and therefore to meet its $CR_{th}$ requirements.

Similarly, a receiving UE may decide to drop a HARQ feedback or a CSI report base on NR-CBR and/or $CR_{th}$ requirement. For example, a receiver UE may drop an NACK feedback for a HARQ ACK/NACK feedback; a receiver UE may drop a CSI report if the channel variance is low.

Figure 29:
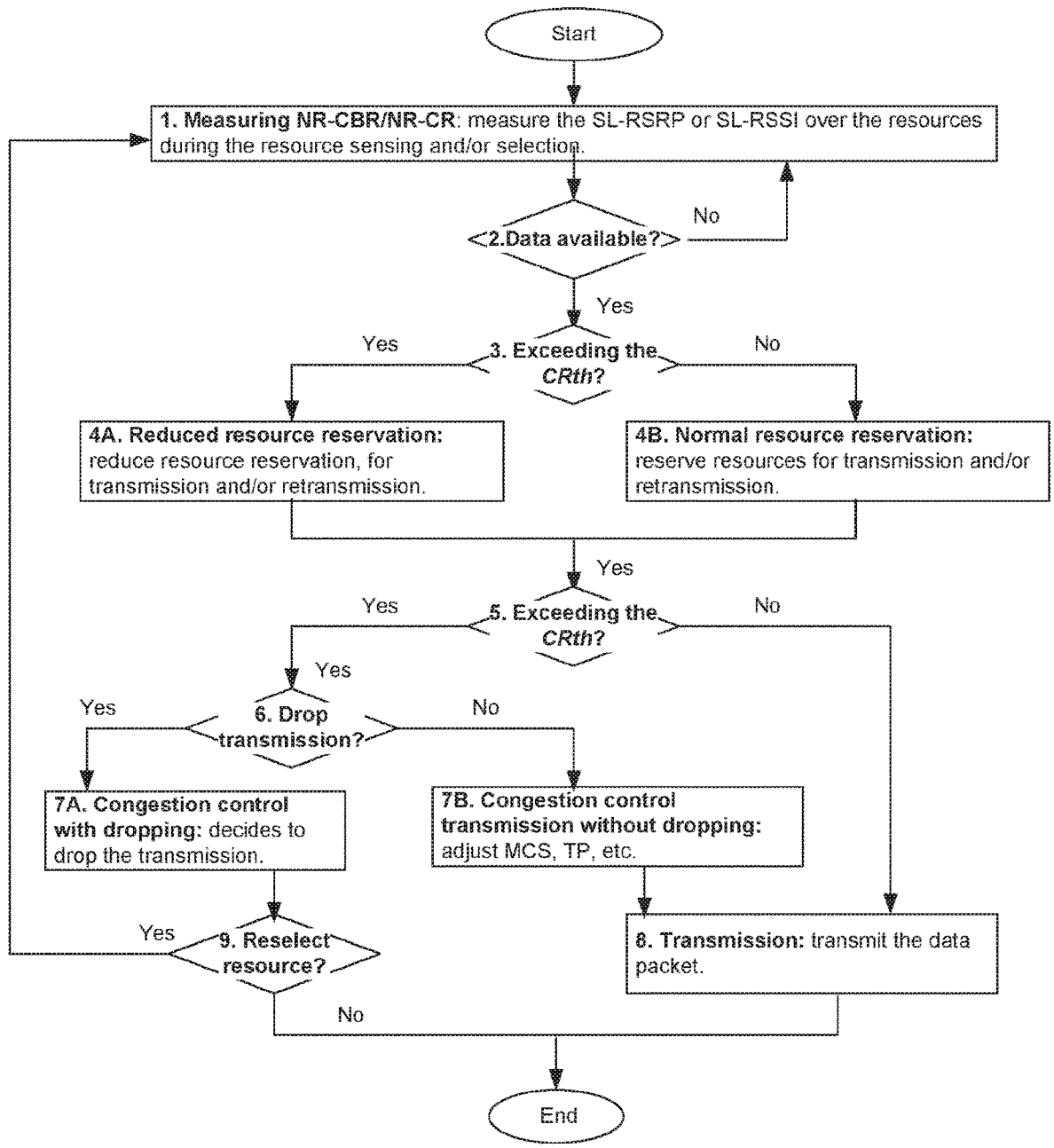
FIG. 29 shows an example of call flow for a congestion control based transmission.

An example of congestion control is illustrated in FIG. 29, which contains the following steps.

At step 1, (Measuring NR-CBR/NR-CR), measure the SL-RSRP or SL-RSSI of NR-PSCCH and/or NR-PSSCH over the resources during the resource sensing and/or selection.

At step 2 (Data available?), if a new data packet is available, move to Step 3 to check its CRth requirements; otherwise, go to Step 1 for continuing NR-CBR/NR-CR measurements.

At step 3 (Exceeding the $CR_{th}$?), if the measured CR is exceeding the maximum $CR_{th}$, move to Step 4A for reduced resource reservation; otherwise move to Step 4B for normal resource reservation.

At step 4A (Reduced resource reservation), reduce resource reservation for transmission and/or retransmission. For example, reduce the resources by increasing MCS, reduce the number of blind retransmissions, and/or HARQ retransmissions, based on the QoS requirements such as priority, latency, reliability, communication range or zone, as well as the data packet size and current congestion level.

At step 4B (Normal resource reservation), reserve the resources based on the QoS requirements such as priority, latency, reliability, communication range or zone, as well as the data packet size.

At step 5 (Exceeding the $CR_{th}$?), check if exceeding the CRth before transmission or retransmission. If yes, move to Step 6 for dropping transmission; otherwise move to Step 8 for the transmission or retransmission.

At step 6 (Drop transmission?), check if dropping transmission or retransmission is allowed. If yes, move to Step 7A for congestion control with dropping; otherwise, move to Step 7B for congestion control without dropping.

At step 7A (Congestion control with dropping), decides to drop the transmission. Move to Step 9.

At step 7B (Congestion control transmission without dropping), make adjustments such as increasing MCS, decreasing TP, etc.

At step 8 (Transmission), transmit or retransmit the data packet with the adjusted MCS and/or TP.

At step 9 (Reselect resource?), check if need to cancel and reselect the resources previously reserved for retransmission or for periodic transmissions. If yes, reset the Reselection Counter ('R and move to Step 1.

For Mode 1, the gNB can request each UE to periodically (e.g., the gNB determines the period), or on-demand, report its measured CBR for sidelink congestion control.

It is understood that any or all of the apparatuses, systems, methods and processes described herein may be embodied in the form of computer executable instructions (e.g., program code) stored on a computer-readable storage medium which instructions, when executed by a processor, such as processors 118 or 91, cause the processor to perform and/or implement the systems, methods and processes described herein. Specifically, any of the steps, operations or functions described herein may be implemented in the form of such computer executable instructions, executing on the processor of an apparatus or computing system configured for wireless and/or wired network communications. Computer readable storage media include volatile and nonvolatile, removable and non-removable media implemented in any non-transitory (e.g., tangible or physical) method or technology for storage of information, but such computer readable storage media do not include signals. Computer readable storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible or physical medium which may be used to store the desired information and which may be accessed by a computing system.

The following is a list of acronyms relating to service layer technologies that may appear in the above description. Unless otherwise specified, the acronyms used herein refer to the corresponding term listed below:

ACK ACKnowledgement
BSM Basic Safety Message
CAM Common Awareness Messages
CE Control Element
DFN Direct Frame Number
EtrA Emergency Trajectory Alignment
HARQ Hybrid Automatic Repeat Request
LoA Level of Automation
LTE Long Term Evolution
MAC Medium Access Control
MIB Master Information Block
NACK Negative ACKnowledgement
NR New Radio
PLMN Public Land Mobile Network
NR-PSCCH NR Physical Sidelink Control Channel
NR-PSDCH NR Physical Sidelink Discovery Channel
NR-PSSCH NR Physical Sidelink Shared Channel
NR-PSSS NR Primary Sidelink Synchronization Signal
RAN Radio Access Network
RNTI Radio Network Temporary Identifier
RRC Radio Resource Control
SA Sensing Assistant
SCI Sidelink Control Information
SI System Information
NR-SSSS Secondary Sidelink Synchronization Signal
UE User Equipment
V2V Vehicle-to-Vehicle
V2X Vehicle-to-everything

What is claimed is:

1. A method comprising:
    receiving a radio resource control (RRC) message comprising a configuration associated with a resource pool located in a sidelink bandwidth part on a sidelink shared channel;
    determining a resource usage and one or more available resources in the resource pool,
        wherein determining the one or more available resources in the resource pool comprises:
            setting a time interval for a sensing window, wherein the time interval for the sensing window is used for evaluating resources for transmission of a sidelink shared channel transmission that is a periodic transmission or an aperiodic transmission, wherein the time interval for the sensing window is determined based on RRC signaling,
            performing sidelink-reference signal received power (SL-RSRP) measurements on one or more resources within the resource pool, and
            determining the one or more available resources in the resource pool based on a priority associated with the sidelink shared channel transmission and the SL-RSRP measurements;
    selecting one or more resources from the one or more available resources in the resource pool for the sidelink shared channel transmission;
    sending a scheduling assignment (SA) sidelink control information (SCI) on a sidelink control channel,
        wherein the SA SCI indicates the one or more resources from the one or more available resources in the resource pool for the sidelink shared channel transmission,
        wherein the SA SCI indicates one or more resources that can be used for hybrid automatic repeat request (HARQ) retransmission of the sidelink shared channel transmission, and
        wherein the SA SCI includes a three-bit indication of the priority associated with the sidelink shared channel transmission; and
    sending the sidelink shared channel transmission including a second SCI using the selected one or more resources.

2. The method of claim 1, wherein determining the one or more available resources in the resource pool comprises at least one of:
    sensing a resource usage by decoding a SCI for scheduling an initial transmission, pre-empting a scheduled or reserved resource, or reserving at least one of one or more repetitions or one or more retransmissions per HARQ feedback;
    measuring at least one of a sidelink received signal strength indicator (SL-RSSI), a channel busy ratio, or a channel occupancy ratio; and determining an available resource based on:
a resource that is not scheduled, not reserved, and not pre-empted;
a resource that is in a communication range or zone;
or a determination that at least one of an SL-RSRP measurement of the resource or an SL-RSSI measurement of the resource is below a threshold.

3. The method of claim 1, wherein selecting the one or more resources comprises determining a time interval for a resource selection, wherein the time interval for the resource selection is determined based on at least one of:
one or more of a latency, or a reliability of a data packet to be transmitted; and
one or more of a repetition, a retransmission per HARQ feedback, or a next data packet transmission for a periodic traffic.

4. The method of claim 1, wherein selecting the one or more resources comprises at least one of:
selecting one or more resources based on at least one of a latency, a reliability, or a communication range or zone of a data packet to be transmitted, or the measurement of interference or congestion; and
selecting one or more resources for at least one of scheduling or reserving SCI, initial transmission, repetitions, HARQ feedback, retransmissions per HARQ feedback, or a next data packet of a periodic traffic.

5. The method of claim 1, wherein sending the sidelink shared channel transmission comprises:
determining, based on a measured congestion level, whether a congestion threshold has been exceeded, wherein the congestion threshold is based on at least one of a latency, a reliability, or a communication range or zone of a data packet to be transmitted; and
based on determining that the congestion threshold has not been exceeded:
sending the data packet.

6. An apparatus comprising a processor and a memory, the processor and memory configured to:
receive a radio resource control (RRC) message comprising a configuration associated with a resource pool located in a sidelink bandwidth part associated with a sidelink shared channel;
determine a resource usage and one or more available resources in the resource pool, wherein determining the one or more available resources in the resource pool comprises:
setting a time interval for a sensing window, wherein the time interval for the sensing window is used for evaluating resources for transmission of a sidelink shared channel transmission that is a periodic transmission or an aperiodic transmission, wherein the time interval for the sensing window is determined based on RRC signaling,
performing sidelink-reference signal received power (SL-RSRP) measurements on one or more resources within the resource pool, and
determining the one or more available resources in the resource pool based on a priority associated with the sidelink shared channel transmission and the SL-RSRP measurements;
select one or more resources from the one or more available resources in the resource pool for the sidelink shared channel transmission;
send a scheduling assignment (SA) sidelink control information (SCI) on a sidelink control channel, wherein the SA SCI indicates the one or more resources from the one or more available resources in the resource pool for the sidelink shared channel transmission, wherein the SA SCI indicates one or more resources that can be used for hybrid automatic repeat request (HARQ) retransmission of the sidelink shared channel transmission, and wherein the SA SCI includes a three-bit indication of the priority associated with the sidelink shared channel transmission; and
send the sidelink shared channel transmission including a second SCI using the selected one or more resources.

7. The apparatus of claim 6, wherein determining the one or more available resources in the resource pool comprises at least one of:
sensing a resource usage by decoding a SCI for scheduling an initial transmission, pre-empting a scheduled or reserved resource, or reserving at least one of one or more repetitions or one or more retransmissions per HARQ feedback;
measuring at least one of a sidelink received signal strength indicator (SL-RSSI), a channel busy ratio, or a channel occupancy ratio; and
determining an available resource based on:
a resource that is not scheduled, not reserved, and not pre-empted;
a resource that is in a communication range or zone;
or a determination that at least one of an SL-RSRP measurement of the resource or an SL-RSSI measurement of the resource is below a threshold.

8. The apparatus of claim 6, wherein selecting the one or more resources comprises determining a time interval for a resource selection, wherein the time interval for the resource selection is determined based on at least one of:
one or more of a latency, or a reliability of a data packet to be transmitted; and
one or more of a repetition, a retransmission per HARQ feedback, or a next data packet transmission for a periodic traffic.

9. The apparatus of claim 6, wherein selecting the one or more resources comprises at least one of:
selecting one or more resources based on at least one of a latency, a reliability, or a communication range or zone of a data packet to be transmitted, or the measurement of interference or congestion; and
selecting one or more resources for at least one of scheduling or reserving SCI, initial transmission, repetitions, HARQ feedback, retransmissions per HARQ feedback, or a next data packet of a periodic traffic.

10. The apparatus of claim 6, wherein sending the sidelink shared channel transmission comprises:
determining, based on a measured congestion level, whether a congestion threshold has been exceeded, wherein the congestion threshold is based on at least one of a latency, a reliability, or a communication range or zone of a data packet to be transmitted; and
based on determining that the congestion threshold has not been exceeded:
sending the data packet.

11. A non-transitory computer-readable storage medium storing instructions which, when executed by a processor, cause an apparatus to perform operations comprising:
receiving a radio resource control (RRC) message comprising a configuration associated with a resource pool located in a sidelink bandwidth part associated with a sidelink shared channel;
determining a resource usage and one or more available resources in the resource pool, wherein determining the one or more available resources in the resource pool comprises:

setting a time interval for a sensing window, wherein the time interval for the sensing window is used for evaluating resources for transmission of a sidelink shared channel transmission is a periodic transmission or an aperiodic transmission, wherein the time interval for the sensing window is determined based on RRC signaling, performing sidelink-reference signal received power (SL-RSRP) measurements on one or more resources within the resource pool, and determining the one or more available resources in the resource pool based on a priority associated with the sidelink shared channel transmission and the SL-RSRP measurements;

selecting one or more resources from the one or more available resources in the resource pool for the sidelink shared channel transmission;

sending a scheduling assignment (SA) sidelink control information (SCI) on a sidelink control channel, wherein the SA SCI indicates the one or more resources from the one or more available resources in the resource pool for the sidelink shared channel transmission, wherein the SA SCI indicates one or more resources that can be used for hybrid automatic repeat request (HARQ) retransmission of the sidelink shared channel transmission, and wherein the SA SCI includes a three-bit indication of the priority associated with the sidelink shared channel transmission; and sending the sidelink shared channel transmission including a second SCI using the selected one or more resources.

12. The non-transitory computer-readable storage medium of claim 11, wherein determining the one or more available resources in the resource pool comprises at least one of:

sensing a resource usage by decoding a SCI for scheduling an initial transmission, pre-empting a scheduled or reserved resource, or reserving at least one of one or more repetitions or one or more retransmissions per HARQ feedback;

measuring at least one of a sidelink received signal strength indicator (SL-RSSI), a channel busy ratio, or a channel occupancy ratio; and determining an available resource based on:

a resource that is not scheduled, not reserved, and not pre-empted;

a resource that is in a communication range or zone; or a determination that at least one of an SL-RSRP measurement of the resource or an SL-RSSI measurement of the resource is below a threshold.

13. The non-transitory computer-readable storage medium of claim 11, wherein selecting the one or more resources comprises determining a time interval for a resource selection, wherein the time interval for the resource selection is determined based on at least one of:

one or more of a latency, or a reliability of a data packet to be transmitted; and one or more of a repetition, a retransmission per HARQ feedback, or a next data packet transmission for a periodic traffic.

14. The non-transitory computer-readable storage medium of claim 11, wherein selecting the one or more resources comprises at least one of:

selecting one or more resources based on at least one of a latency, a reliability, or a communication range or zone of a data packet to be transmitted, or the measurement of interference or congestion; and selecting one or more resources for at least one of scheduling or reserving SCI, initial transmission, repetitions, HARQ feedback, retransmissions per HARQ feedback, or a next data packet of a periodic traffic.

* * * * *